United States Patent
Kondo et al.

(10) Patent No.: US 6,195,464 B1
(45) Date of Patent: Feb. 27, 2001

(54) PICTURE CODING APPARATUS AND METHOD THEREOF

(75) Inventors: Tetsujiro Kondo; Yasuhiro Fujimori; Kunio Kawaguchi, all of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/313,392

(22) Filed: May 18, 1999

Related U.S. Application Data

(63) Continuation of application No. 08/428,067, filed on Jul. 20, 1995, now Pat. No. 5,930,394.

(30) Foreign Application Priority Data

| Aug. 30, 1993 | (JP) | 5-238822 |
| Aug. 30, 1993 | (JP) | 5-238823 |
| Aug. 30, 1993 | (JP) | 5-238824 |
| Oct. 4, 1993 | (JP) | 5-273112 |
| Oct. 4, 1993 | (JP) | 5-273205 |
| Oct. 4, 1993 | (JP) | 5-273206 |
| Oct. 4, 1993 | (JP) | 5-273207 |
| Dec. 28, 1993 | (JP) | 5-349555 |

(51) Int. Cl.$^7$ ............................................. G06K 9/36
(52) U.S. Cl. ............................................. 382/240
(58) Field of Search ................. 382/232, 236, 382/238, 239, 240; 348/400, 414, 416, 420, 421, 424, 699

(56) References Cited

U.S. PATENT DOCUMENTS

| 5,317,397 | * | 5/1994 | Odaka et al. | 382/232 |
| 5,333,012 | * | 7/1994 | Singhal et al. | 382/232 |
| 5,598,214 | * | 1/1997 | Kondo et al. | 382/232 |
| 5,610,658 | * | 3/1997 | Uchida et al. | 382/232 |
| 5,629,737 | * | 5/1997 | Menez et al. | 382/232 |
| 5,631,977 | * | 5/1997 | Koshi et al. | 382/232 |
| 5,650,860 | * | 7/1997 | Uz | 382/232 |
| 5,663,764 | * | 9/1997 | Kondo et al. | 382/232 |
| 5,687,256 | * | 11/1997 | Kimura et al. | 382/243 |
| 5,930,394 | * | 7/1999 | Kondo et al. | 382/232 |

* cited by examiner

*Primary Examiner*—Jose L. Couso
(74) *Attorney, Agent, or Firm*—Frommer Lawrence & Haug, LLP.; William S. Frommer; Dennis M. Smid

(57) ABSTRACT

In a picture coding apparatus and a picture coding method, when a picture data is hierarchically coded, compression efficiency can be improved, and the deterioration of picture quality can be reduced. When a picture data is hierarchically coded by utilizing a recursive hierarchical representation, adaptive division of block is performed corresponding to the characteristic of the picture data and then coding is performed, and thus obtained hierarchical coded data is transmitted, so that the block of the lower hierarchy can be adaptively divided, thereby the information quantity such as a plane portion of picture can be reduced.

53 Claims, 49 Drawing Sheets

| STANDARD PICTURES | DIVISION INHIBITING CONDITION TO LOWER HIERARCHY (MAXIMUM DIFFERENCE DATA ≤ THRESHOLD VALUE) | | | | | |
|---|---|---|---|---|---|---|
| | ERROR≤1 | ERROR≤2 | ERROR≤3 | ERROR≤4 | ERROR≤5 | ERROR≤6 |
| SKIN-COLOR CHART | 0.56 | 0.29 | 0.21 | 0.19 | 0.17 | 0.15 |
| YACHT HARBOR | 0.86 | 0.74 | 0.65 | 0.59 | 0.53 | 0.48 |
| SWEATER AND BAG | 0.81 | 0.59 | 0.44 | 0.35 | 0.29 | 0.24 |
| EIFFEL TOWER | 0.59 | 0.38 | 0.30 | 0.26 | 0.24 | 0.22 |
| HAT SHOP | 0.82 | 0.65 | 0.53 | 0.45 | 0.40 | 0.35 |
| LOVERS IN SNOW | 0.65 | 0.35 | 0.23 | 0.18 | 0.14 | 0.12 |
| INFORMATION BOARD FOR TOURIST | 0.75 | 0.60 | 0.53 | 0.47 | 0.43 | 0.40 |
| TULIP GARDEN | 0.91 | 0.87 | 0.83 | 0.79 | 0.75 | 0.72 |
| CHROMAKEY CHART | 0.50 | 0.30 | 0.25 | 0.22 | 0.20 | 0.18 |
| AVERAGE | 0.72 | 0.53 | 0.44 | 0.39 | 0.35 | 0.32 |

FIG.4

| STANDARD PICTURES | ORIGINAL SIGNAL | FIRST HIERARCHY | SECOND HIERARCHY | THIRD HIERARCHY | FOURTH HIERARCHY | FIFTH HIERARCHY |
|---|---|---|---|---|---|---|
| SKIN-COLOR CHART | 30 | 4 | 5 | 5 | 7 | 30 |
| YACHT HARBOR | 58 | 13 | 15 | 16 | 17 | 49 |
| SWEATER AND BAG | 56 | 6 | 7 | 8 | 11 | 53 |
| EIFFEL TOWER | 52 | 8 | 9 | 9 | 10 | 49 |
| HAT SHOP | 56 | 8 | 12 | 15 | 18 | 49 |
| LOVERS IN SNOW | 56 | 4 | 6 | 8 | 10 | 54 |
| INFORMATION BOARD FOR TOURIST | 68 | 11 | 15 | 18 | 19 | 61 |
| TULIP GARDEN | 52 | 17 | 17 | 17 | 16 | 39 |
| CHROMAKEY CHART | 55 | 8 | 9 | 9 | 10 | 52 |
| AVERAGE | 54 | 9 | 11 | 12 | 13 | 48 |

FIG.5

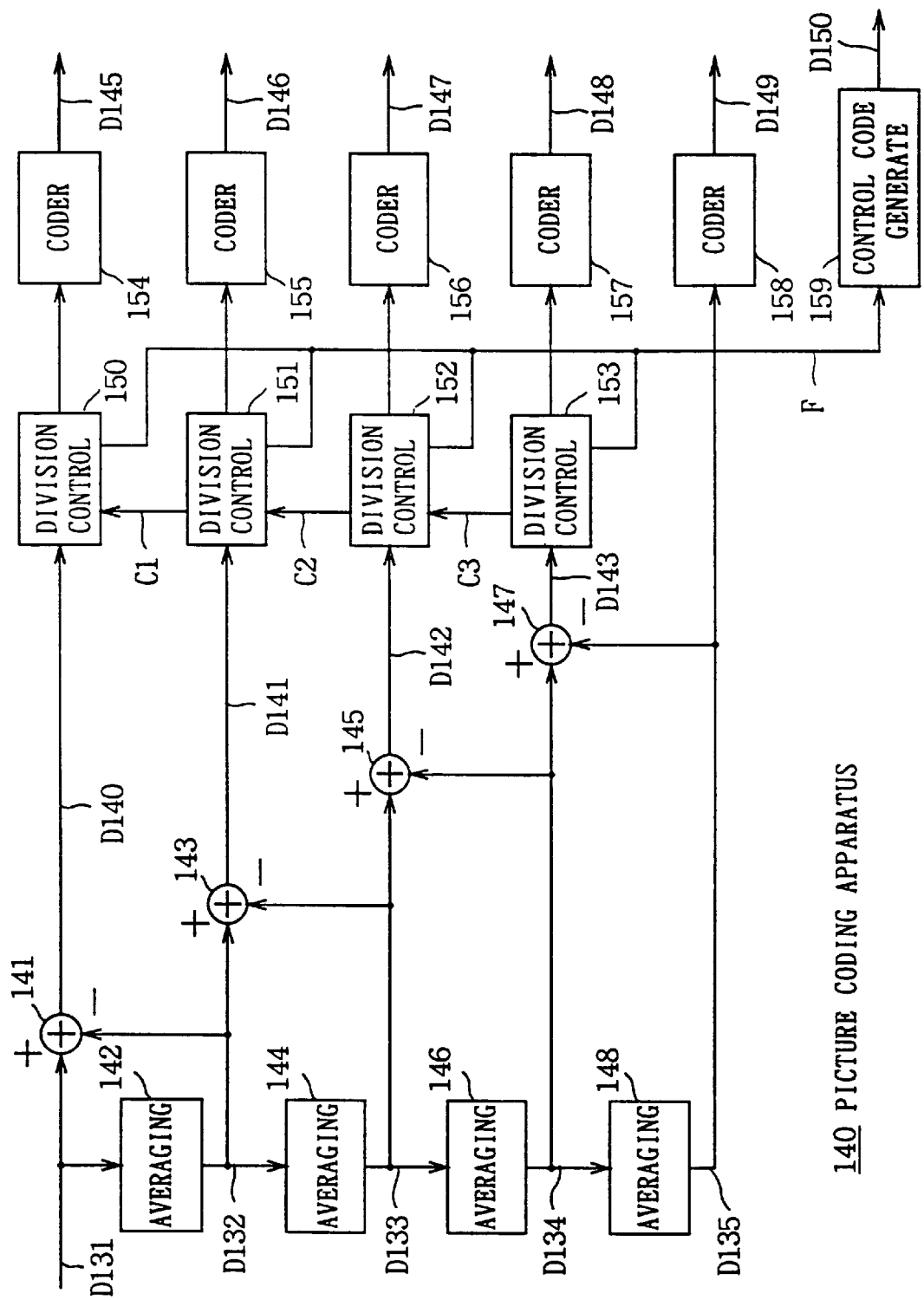

180 PICTURE CODING APPARATUS

190 PICTURE CODING APPARATUS

|  | TH1 | TH2 | TH3 | TH4 |
|---|---|---|---|---|
| $Q_{N01}$ | 1 | 2 | 3 | 4 |
| $Q_{N02}$ | 2 | 3 | 4 | 5 |
| $Q_{N03}$ | 3 | 4 | 5 | 6 |
| $Q_{N04}$ | 4 | 5 | 6 | 7 |
| $Q_{N05}$ | | | | |
| $Q_{N06}$ | | | | |
| $Q_{N07}$ | | | | |
| $Q_{N08}$ | | | | |
| $Q_{N09}$ | | | | |
| $Q_{N010}$ | | | | |
| $Q_{N011}$ | | | | |
| $Q_{N012}$ | | | | |
| $Q_{N013}$ | | | | |
| $Q_{N014}$ | | | | |
| $Q_{N015}$ | | | | |
| $Q_{N016}$ | | | | |

FIG. 18

FIFTH HIERARCHY FREQUENCY TABLE

FOURTH HIERARCHY FREQUENCY TABLE

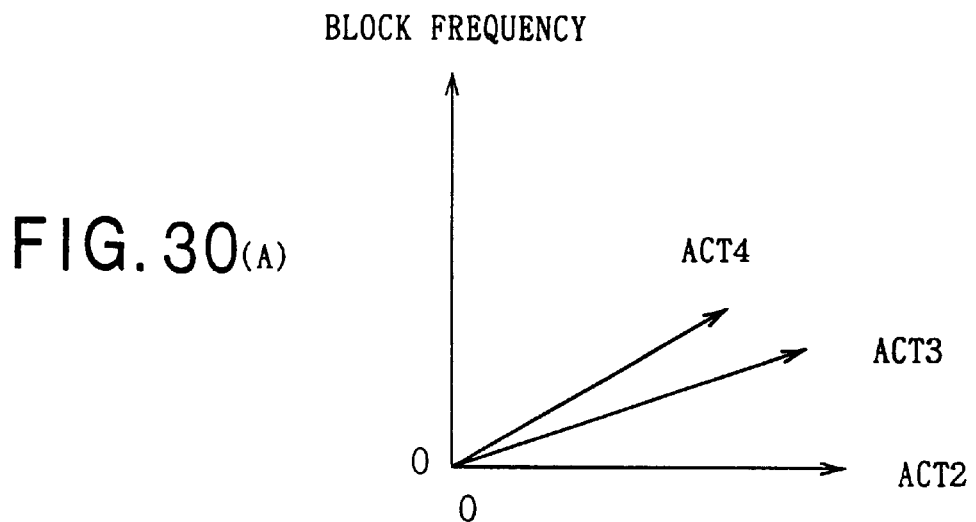
SECOND HIERARCHY FREQUENCY TABLE
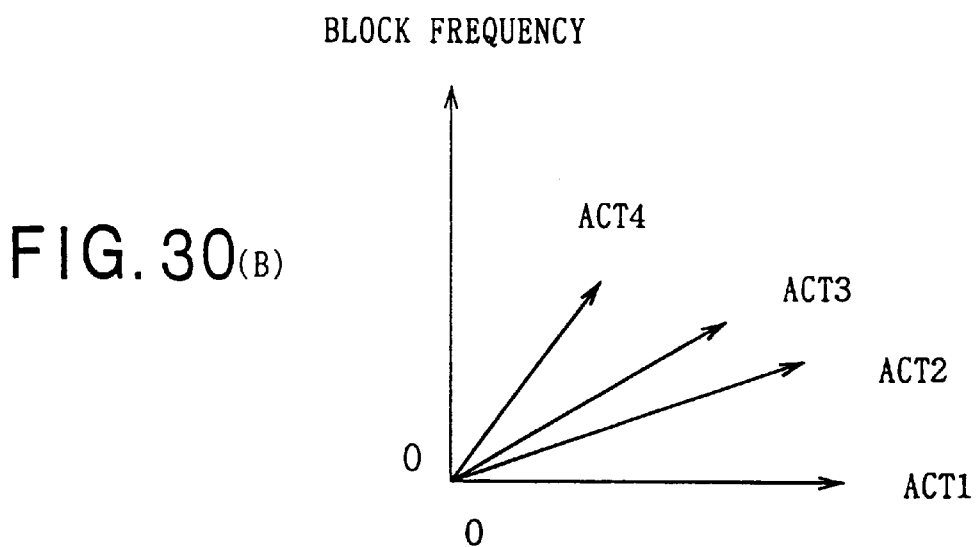
FIRST HIERARCHY FREQUENCY TABLE
FIG. 30

FIFTH HIERARCHY FREQUENCY TABLE

FIRST HIERARCHY FREQUENCY TABLE

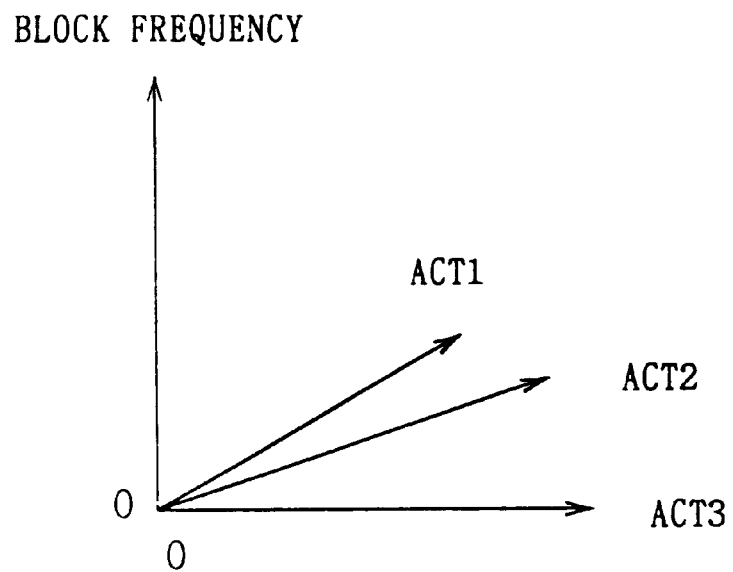
THIRD HIERARCHY FREQUENCY TABLE
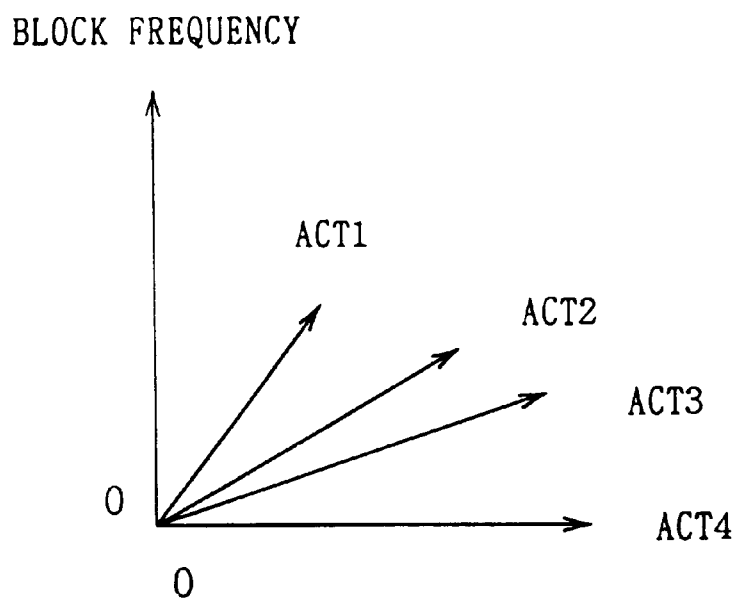
FOURTH HIERARCHY FREQUENCY TABLE

PICTURE CODING APPARATUS AND METHOD THEREOF

The present application is a continuation of U.S. application Ser. No. 08/428,067 filed on Jul. 20, 1995, now U.S. Pat. No. 5,930,394.

TECHNICAL FIELD

The present invention relates to a picture coding apparatus and the method, and is suitably applicable to, for example, a picture coding apparatus that divides and codes the predetermined picture data into the plural picture data composed of different resolutions.

BACKGROUND ART

Heretofore, as this sort of picture coding apparatus, there is such a device that hierarchically codes an input picture data using a hierarchical coding scheme such as the pyramidal coding scheme (Japanese Patent Publication No. 142836/1993). In this picture coding apparatus, the high resolution input picture data is treated as the first hierarchy data, and the second hierarchy data which has a lower resolution than the first hierarchy data, the third hierarchy data which has a lower resolution than the second hierarchy data, . . . are formed sequentially and recursively, and these plural hierarchy data are transmitted through a transmission line which is composed of one communication channel or a recording/reproducing path.

A picture decoding device which decodes the plural hierarchy data is able to decode all of the plural hierarchy data, and also is able to select and decode the desired one out of the hierarchy data, based on the resolution of a corresponding television monitor and the like. By decoding only the desired hierarchy data out of thus hierarchized plural hierarchy data, the desired picture data can be obtained, with the irreducible minimum of transmitting data quantity.

As shown in FIG. 1, the picture coding apparatus which realizes this hierarchical coding such as a four hierarchy coding has decimating filters 2, 3, 4 and interpolating filters 5, 6, 7 both for three stages, and progressively forms the compacted picture data D2, D3, D4 of which the resolutions are low by the decimating filters 2, 3, 4 of each stage with respect to the input picture data D1, and returns the resolutions of the compacted picture data D2, D3, D4 to the former resolution prior to the compaction by the use of the interpolating filters 5, 6, 7.

The output D2 to D4 of respective decimating filters 2 to 4 and the output D5 to D7 of the respective interpolating filters 5 to 7 are inputted into the difference circuit 8, 9, 10 respectively, hereby the difference data D8, D9, D10 is generated. As a result, in the picture coding apparatus 1, the data quantity of the hierarchical data is reduced and the signal power is reduced. The sizes of the difference data D8, D9, D10 and the compacted picture data D4 are 1, ¼, ¹⁄₁₆, and ¹⁄₆₄ times the size of the input picture data D1 in area, respectively.

The difference data D8 to D10 which are obtained from the respective difference circuit 8 to 10 and the compacted picture data D4 which is obtained from the decimating filter 4 are compressed by respective coders 11, 12, 13, 14. As a result, the first, the second, the third, and the fourth hierarchy data D11, D12, D13, and D14 which have different resolutions are sent out, in the stated order, from the respective coders 11, 12, 13, 14 to the transmission line.

The first to the fourth hierarchy data D11 to D14 which are transmitted in this manner are decoded by a picture decoding apparatus shown in FIG. 2. The first to the fourth hierarchy data D11 to D14 are decoded by decoders 21, 22, 23, 24 respectively. As a result, the fourth hierarchy data D24 is outputted from the decoder 24 first.

At the adding circuit 29, the output of the decoder 23 is added to the interpolated data of the fourth hierarchy data D24 which is obtained from the interpolating filter 26, hereby the third hierarchy data D23 is restored. Similarly, at the adding circuit 30, the output of the decoder 22 is added to the interpolated data of the third hierarchy data D23 which is obtained from the interpolating filter 27, hereby the second hierarchy data D22 is restored. Furthermore, at the adding circuit 31, the output of the decoder 21 is added to the interpolated data of the second hierarchy data D22 which is obtained from the interpolating filter 28, hereby the first hierarchy data D21 is restored.

In the picture coding device which realizes such a hierarchical coding method, the input picture data is divided into the plural hierarchy data and coded, therefore the data quantity is inevitably increased by the amount of the hierarchy component. Consequently, there is a problem that the compression efficiency is lowered for the amount of the increasing, in comparison with a high efficiency coding method which does not utilize the hierarchical coding. Besides, there is a problem that in the case where the improvement of the compression efficiency is aimed, the deterioration of picture quality is induced, due to the quantizer which is applied between each hierarchy data.

DISCLOSURE OF INVENTION

Considering the above points, the present invention provides a picture coding method and a picture coding apparatus which is able to improve the compression efficiency and is also able to reduce the deterioration of picture quality when hierarchically coding the picture data.

To solve the above problems, in the present invention, a picture coding apparatus for coding inputted picture signal, to recursively generate plural hierarchy data each having a different resolution, comprises: determining and dividing means for determining the way of adaptive division of block which corresponds to the characteristic of the picture data; and transmitting means for transmitting the hierarchically coded data which is obtained from the determining and dividing means. Therefore, the picture data can be divided adaptively into blocks.

Further, in the present invention, a picture coding apparatus for coding inputted picture signal, to sequentially and recursively generate plural hierarchy data each having a different resolution, comprises: determination controlling means for detecting a block activity value of a predetermined block of each hierarchy data excepting the uppermost hierarchy data having the lowest resolution, for generating the division determination flag for determining the way of division of a block on the basis of the block activity value, and when the determined result showing that the block activity value is smaller than the predetermined threshold value is obtained, for generating the division stop flag for stopping the division of the plurality of lower blocks which correspond to the block, and then generating the control signal for stopping the determination of the block activity value of the plurality of lower blocks and the transmission of hierarchy data of the plurality of lower blocks; and transmitting means for transmitting the determination flag of each block along with each coded hierarchy data. Therefore, the decision flag is transmitted along with the picture data which has been divided into blocks.

Further, in the present invention, a picture coding apparatus for coding inputted picture signal, to sequentially and recursively generate plural hierarchy data each having a different resolution, comprises: determination controlling means for detecting the block activity value of a predetermined block of each hierarchy data excepting the uppermost hierarchy data having the lowest resolution, for generating the division determination flag for determining the division of a block based on the block activity value, and when the determined result showing that the block activity value is smaller than the predetermined threshold value is obtained, for temporarily generating the division stop flag for stopping the division of a plurality of lower blocks which correspond to the block, and when the determined result showing that the block activity value of at least one of the plurality of lower blocks is greater than or equal to the predetermined threshold value is obtained, for changing the division stop flag to the division continue flag for continuing the division; and transmitting means for transmitting the determination flag of each block along with each coded hierarchy data. Therefore, the division decision flag for deciding the way of division of block can be confirmed.

Further, in the present invention, a picture coding apparatus for coding inputted picture signal, to sequentially and recursively generate plural hierarchy data each having a different resolution, comprises: determination controlling means for detecting the block activity value of all of the blocks of respective hierarchy data excepting the uppermost hierarchy data having the lowest resolution, for generating the division determination flag for determining the division of the each block based on the block activity value, and when the determined result showing that the block activity value is smaller than the predetermined threshold value is obtained, for generating the division stop flag for stopping the division of the block, and when the determined result showing that the block activity value is greater than or equal to the predetermined threshold value is obtained, for generating the division continue flag for continuing the division of the block; and transmitting means for transmitting the determination flag of each block along with each coded hierarchy data. Therefore, the way of division of block can be decided independently.

Further, in the present invention, a picture coding apparatus for coding inputted picture signal being a plurality of picture forming signals, which have a correlation each other to form a picture, in order to sequentially and recursively generate plural hierarchy data each having a different resolution, comprises determination controlling means for detecting the block activity value which corresponds to the first signal out of a plurality of picture forming signals as to a predetermined block of each hierarchy data excepting the uppermost hierarchy data having the lowest resolution, for generating the division determination flag for determining the division of the block or the division of a lower block which corresponds to the block, and when the determined result showing that the block activity value is smaller than the predetermined threshold value is obtained, for generating the division stop flag for stopping the division of the block or the division of the lower block which corresponds to the block, and when the determined result showing that the block activity value is greater than or equal to the predetermined threshold value is obtained, for generating the division continue flag for continuing the division of the block or the division of the lower block which corresponds to the block, and then for determining the threshold value on the basis of the second signal out of the plurality of picture forming signals. Therefore, the threshold value is set by the first signal such as the luminance signal, and the division of the second signal such as the color signal can be performed.

Further, in the present invention, a picture coding apparatus for coding inputted picture signal which is utilized to sequentially and recursively generate plural hierarchy data each having a different resolution, comprises: threshold value detecting means for detecting a threshold value being a standard of determination of block activity based on the block activity value of all of the blocks of each hierarchy data, to control generated information quantity so as to attain to the target value; determining and dividing means for detecting the block activity of a predetermined block of each hierarchy data excepting the uppermost hierarchy data having the lowest resolution, and for determining the way of division of the block or division of a lower block which corresponds to the block based on the comparison result of the block activity and the threshold value and performing the division; and transmitting means for transmitting the hierarchical coded data which is obtained from the determining and dividing means. Therefore, when the block activity value become less than the predetermined value, (that is when the change of picture become small), the generated information quantity by division processing of the lower hierarchy is controlled.

Furthermore, in the present invention, a picture coding apparatus for coding inputted picture signal, to recursively generate plural hierarchy data each having a different resolution, comprises: determining and dividing means for determining the way of adaptive division of a block which corresponds to the characteristic of the picture data, and for dividing the picture data on the basis of the determined result; and transmitting means for transmitting variable-length data after transmitted the hierarchical coded data obtained from the determining means as fixed-length data. Thereby, transmitting efficiency of data can be improved.

BRIEF DESCRIPTION OF DRAWINGS

FIG. 4 is a table showing a result of an adaptive division of the HD standard picture obtained by the use of the hierarchical coding principle of FIG. 3;

FIG. 5 is a table showing a standard deviation of the signal level, of each hierarchy, of the HD standard picture obtained by the use of the hierarchical coding principle of FIG. 3;

FIG. 6 is a block diagram showing the picture coding apparatus of the first embodiment according to the present invention;

FIG. 18 is a table showing a combination of threshold values obtained for each hierarchy;

FIGS. 28(A), 28(B), 29, 30(A), 30(B), and 31 are characteristic curvilinear diagrams illustrating an example of the frequency table;

FIGS. 41(A), 41(B), 42, 43(A), 43(B), and 44 are characteristic curvilinear diagrams illustrating an example of the frequency table;

BEST MODE FOR CARRYING OUT THE INVENTION

An embodiment of the present invention will be described in detail with reference to the drawings.

[1] Principle of the Hierarchical Coding

Figure 1:
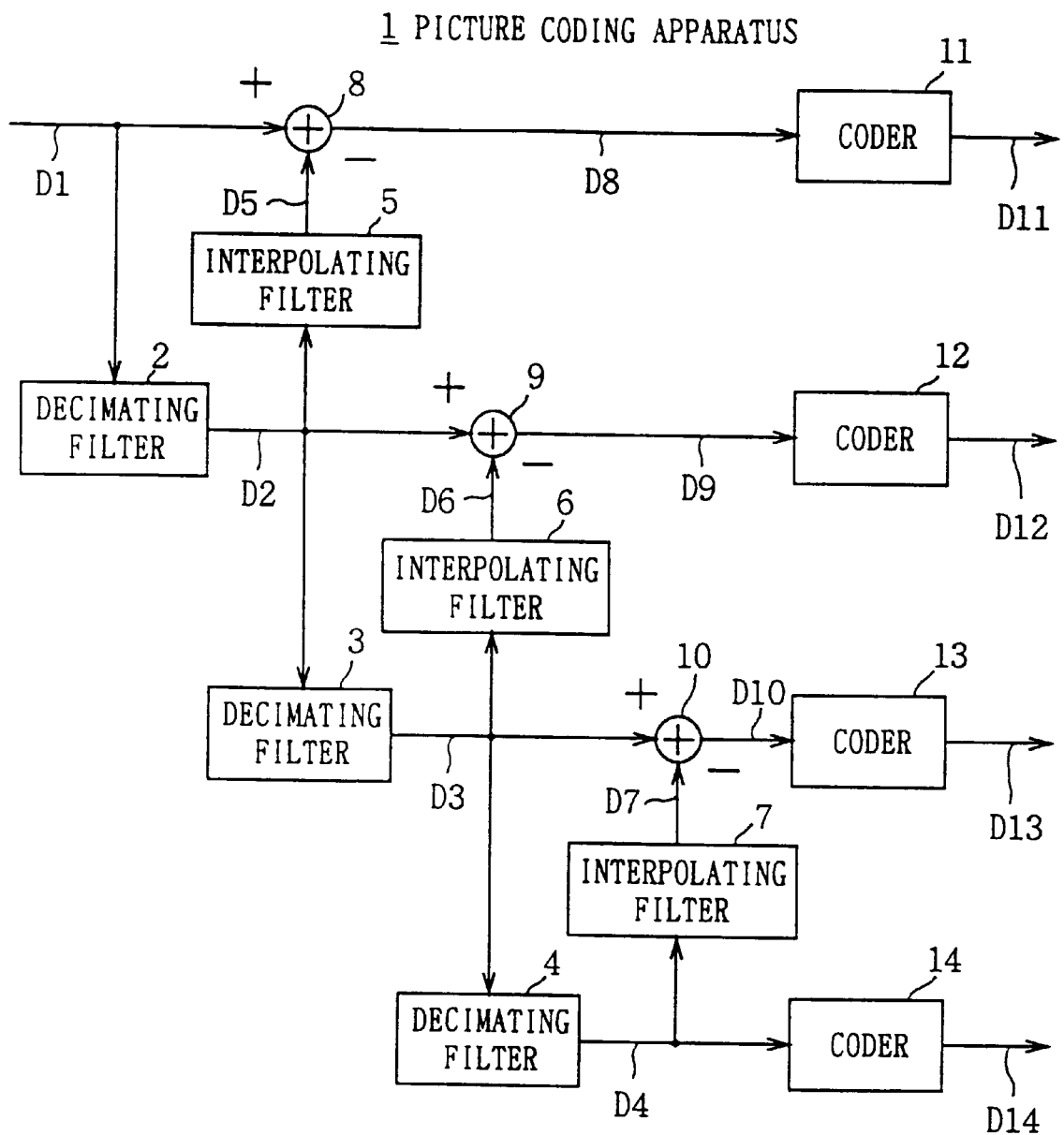
FIG. 1 is a block diagram showing a picture coding apparatus using a conventional pyramidal coding method.
Figure 2:
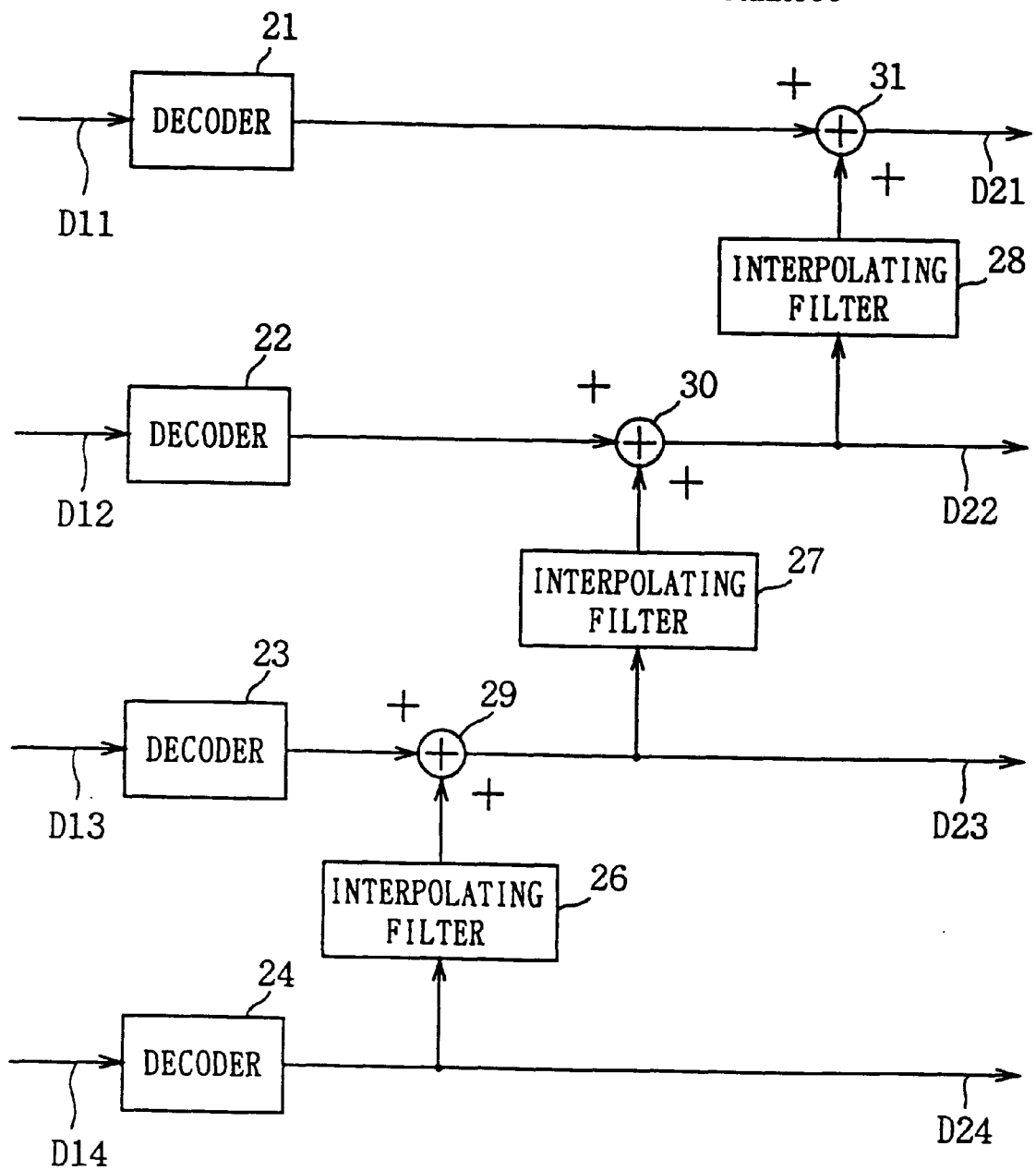
FIG. 2 is a block diagram showing a picture decoding apparatus which corresponds to the picture coding apparatus of FIG. 1.
Figure 3:
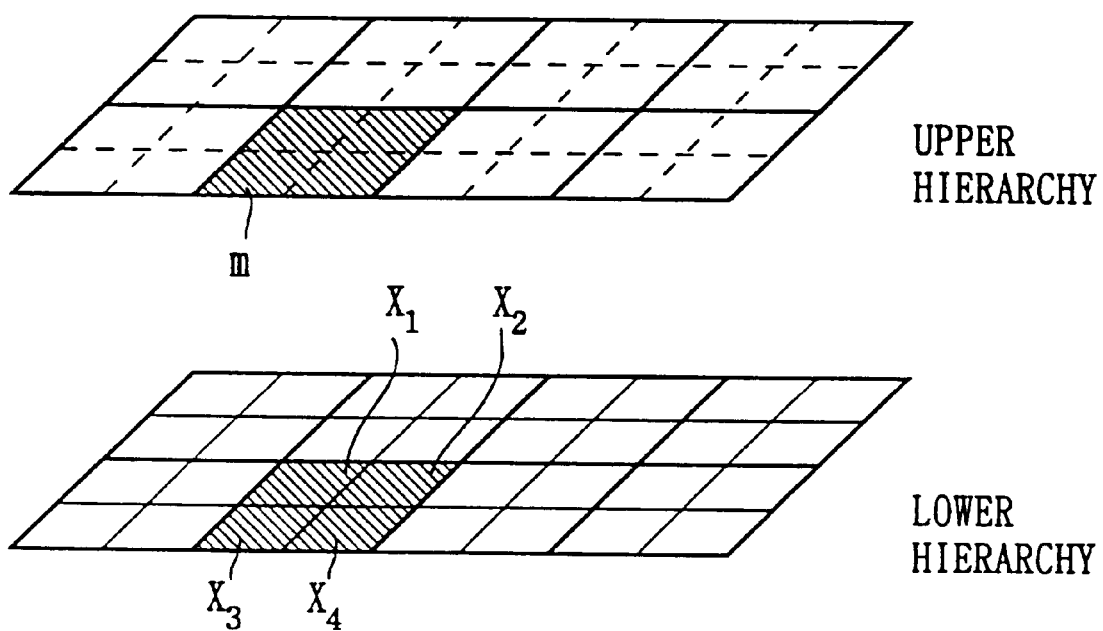
FIG. 3 is a schematic diagram explaining the principle of the hierarchical encoding according to the present invention.

FIG. 3 generally shows the case where, for example, a static picture of the high definition television signal and the like is hierarchically coded and compressed, as the principle of the hierarchical coding according to the present invention. In this hierarchical coding, the upper hierarchy data is produced by a simple arithmetic mean of the lower hierarchy data in order to reduce the lower hierarchy data to be transmitted, hereby a hierarchical structure is realized which does not accompany any increasing of the information quantity. As to decoding from the upper hierarchy data to the lower hierarchy data, division is adaptively controlled based on the activity value of each block, so that the information quantity of a plane portion is reduced.

Here, the block activity is a correlation value which is represented by a maximum value, a mean value, a sum of absolute values, a standard deviation, or an n-th power sum, of the inter-hierarchy difference data D41 to D44 in the specific block in the case where the lower hierarchy data area corresponding to the upper hierarchy data is defined as "block". That is, when the activity value is lower, it may safely be said that this block is a plane block.

Further, in the coding of inter-hierarchy difference data which is performed for the sake of the lower hierarchy data, an increase of the efficiency is realized by switching the quantization characteristics for each block without any additional code based on the activity value of the upper hierarchy data.

That is, in the hierarchical structure of this hierarchical coding, an inputted high definition television signal is selected as the lowermost hierarchy data first, and the arithmetic mean of the four pixels $X_1$ to $X_4$ in the small block of 2 lines×2 pixels of this lowermost hierarchy data is obtained by the following equation:

$$m = (X_1 + X_2 + X_3 + X_4)/4 \tag{1}$$

and the value "m" is set to the value of the upper hierarchy data. In this lower hierarchy data, as shown in the following equation:

$$\Delta X_i = X_i - m \text{ (where i=1 to 3)} \tag{2}$$

the inter-hierarchy difference data to the upper hierarchy data is prepared for only three pixels, so that the hierarchical structure is formed with the same information quantity as the original four-pixel data.

Meanwhile, in decoding of the lower hierarchy data, as to three pixels $X_1$ to $X_3$, the mean value "m" of the upper hierarchy data is added to the respective inter-hierarchy difference data $\Delta X_i$ as shown in the following equation:

$$E[X_i]=\Delta X_i+m \text{ (where } i=1 \text{ to } 3) \tag{3}$$

hereby the decoded values $E[X_i]$ is given. Then, the three decoded values of the lower hierarchy data are subtracted from the mean value "m" of the upper hierarchy data as shown in the following equation:

$$E[X_4]=m\times 4-E[X_1]-E[X_2]-E[X_3] \tag{4}$$

hereby the decoded value $E[X_4]$ of the remaining one pixel is determined. Where E[ ] denotes a decoded value.

Here, in this hierarchical coding, the resolution and the data quantity are quadruplicated per hierarchy from an upper hierarchy to a lower hierarchy, however, this division is inhibited on a plane portion so that the redundancy is decreased. A single bit flag for indicating whether this division is there or not is prepared for each block. The necessity of division at the lower hierarchy is determined based on the maximum value of the inter-hierarchy difference data and so on, as a local activity value.

As an example of this hierarchical coding, FIG. 4 shows a result of an adaptive division in which the HD standard picture (Y signal) of the ITE is utilized and divided into five-hierarchy and coded. It shows a ratio of a number of pixels of each hierarchy when a threshold value with respect to the maximum inter-hierarchy difference data is changed, to a number of original pixels, hereby a circumstances of redundancy decreasing based on a spatial correlation can be seen. A decreasing efficiency changes depends on pictures. When the threshold value with respect to the maximum inter-hierarchy difference data is changed from 1 to 6, the mean decreasing rate becomes 28 to 69[%].

In practice, the resolution of the upper hierarchy data is quadrupled so as to produce the lower hierarchy data, hence the inter-hierarchy difference data from the upper hierarchy data is coded, so that the signal level width can be effectively decreased in the lower hierarchy data. FIG. 5 shows a case of five hierarchies which are given by the hierarchical coding mentioned above with respect to FIG. 4, wherein the hierarchies are defined as the first to the fifth hierarchies in the order which begins from the lowest one. It is seen that the signal level width is reduced in comparison with the 8 bit PCM data of the original picture. Because the first to the fourth hierarchies which have many pixels are inter-hierarchy difference data, a substantial reduction can be attained, therefore the efficiency is improved in the subsequent quantization. As may be seen from FIG. 5, its reduction efficiency shows little dependency to patterns, and it is effective to all pictures.

Further, because the upper hierarchy data is produced from a mean value of the lower hierarchy data, error propagation can be restricted within its block, while the lower hierarchy data is transformed to the differences from the mean value of the upper hierarchy data, thereby an excellent efficiency can also be obtained. In practice, on a hierarchical coding, there is correlation in the activities of the same spatial positions among the hierarchies. A quantization characteristics of the lower hierarchy data is determined from the result of quantization of the upper hierarchy data, hereby an adaptive quantizer can be realized which does not require to transmit quantization information used at the sending side (encoding side) to the receiving side (decoding side) (excepting the initial value).

In practice, a picture is hierarchically coded based on the abovementioned 5-stage hierarchical structure and is represented by multi-resolution, and an adaptive division and an adaptive quantization which utilizes a hierarchical structure are performed, so that various kinds of HD standard pictures ($Y/P_B/P_R$ of 8 bits) can be compressed into about ⅛. Further, an additive code for each block which is prepared for adaptive division, is subjected to a run-length coding at each hierarchy to improve the compression efficiency. In this manner, a picture having sufficient picture quality can be obtained at each hierarchy, and the final lowermost hierarchy can also obtains a satisfactory picture without a visual degradation.

[2] First Embodiment (1) Picture Coding Apparatus of the First Embodiment

Referring to FIG. 6, reference numeral 140 generally shows a picture coding apparatus according to the present invention, in which an input picture data D131 being a static picture, for example, of the high-definition television signal etc. is divided into five hierarchies by means of the above-described hierarchical coding method, and thus obtained lowermost hierarchy data and inter-hierarchy difference data for four hierarchies are coded. In practice, in the picture coding apparatus 140, the input picture data D131 is inputted to the first difference circuit 141 and the first averaging circuit 142.

Figure 7:
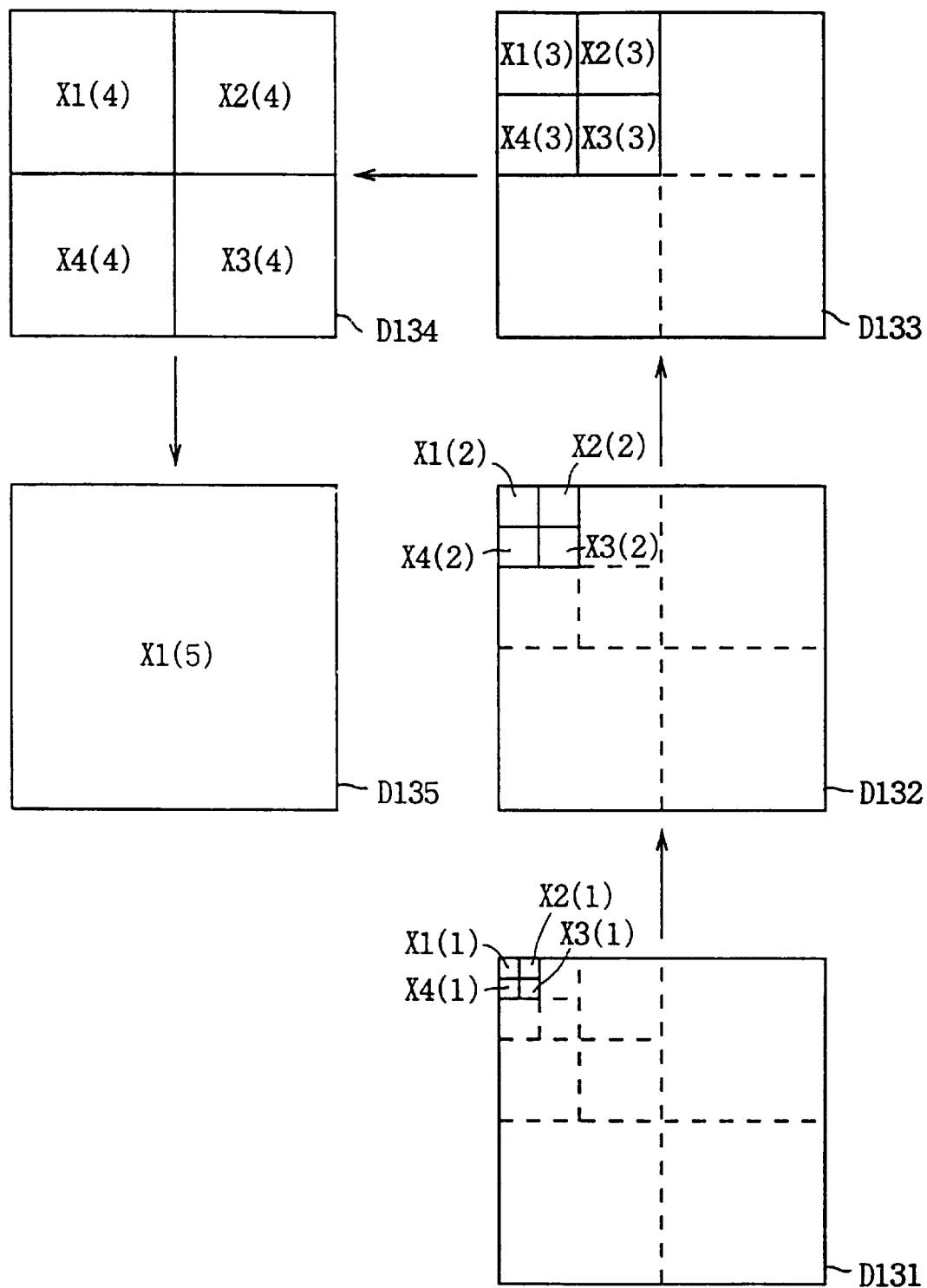
FIG. 7 is a schematic diagram illustrating a construction of hierarchy data in hierarchical coding.

As shown in FIG. 7, the first averaging circuit 142 generates a pixel X1(2) of the second hierarchy data D132 from the four pixels X1(1)–X4(1) of the input picture data D131 which is composed of the first hierarchy data being the lowermost hierarchy. In the same manner, pixels X2(2)–X4(2) adjacent to the pixel X1(2) of the second hierarchy data D132 are generated by the average of the four pixels of the first hierarchy data D131. The second hierarchy data D132 is inputted to the second difference circuit 143 and the second averaging circuit 144. The second averaging circuit 144 generates a pixel X1(3) of the third hierarchy data D133 by the average of the four pixels of the pixels X1(2)–X4(2) of the second hierarchy data D132. Similarly, pixels X2(3)–X4(3) adjacent to the pixel X1(3) of the third hierarchy data D133 are generated by the average of the four pixels of the second hierarchy data D132.

Further, the third hierarchy data D133 is inputted to the third difference circuit 145 and the third averaging circuit 146. The third averaging circuit 146 generates pixels X1(4)–X4(4) of the fourth hierarchy data D134 by the average of the four pixels X1(3)–X4(3) of the third hierarchy data D133 in the same manner as the above. This fourth hierarchy data D134 is inputted to the fourth difference circuit 147 and the fourth averaging circuit 148. The fourth averaging circuit 148 generates the fifth hierarchy data D135 which is the uppermost hierarchy by the average of the four pixels X1(4)–X4(4) of the fourth hierarchy data D134 similarly to the above.

In practice, regarding the block sizes of the first to the fifth hierarchy data D131 to D135, when the block size of the first hierarchy data D131 being the lowermost hierarchy is 1×1, the second hierarchy data D132 is ½×½, the third hierarchy data D133 is ¼×¼, the fourth hierarchy data D134 is ⅛×⅛, and the fifth hierarchy data D135 being the uppermost hierarchy data is 1/16×1/16.

In this manner, the first to the fourth hierarchy data, which are other than the fifth hierarchy data D135 of the uppermost hierarchy among five hierarchy data D131 to D135, are difference-calculated each other, at the first, the second, the third, and the forth difference circuits 141, 143, 145, and 147 as described above accompanying with Equation (2), to generate inter-hierarchy difference data D140, D141, D142, and D143.

In practice, first, the fifth hierarchy data D135 and the fourth hierarchy data D134 are calculated the difference at the fourth difference circuit 147 to generate the inter-hierarchy difference data D143 of the fourth hierarchy. Secondly, the fourth hierarchy data D134 and the third hierarchy data D133 are calculated the difference at the third difference circuit 145 to generate the inter-hierarchy difference data D142 of the third hierarchy. Thirdly, the third hierarchy data D133 and the second hierarchy data D132 are calculated the difference at the second difference circuit 143 to generate the inter-hierarchy difference data D141 of the second hierarchy. Lastly, the second hierarchy data D132 and the first hierarchy data D131 are calculated the difference at the first difference circuit 141 to generate the inter-hierarchy difference data D140 of the first hierarchy.

As the above, in the picture coding apparatus 140 of this embodiment, the fifth hierarchy data D135 and the inter-hierarchy difference data D143 to D140 of the fourth to the first hierarchies are sequentially generated in this order. At this time, in the picture coding apparatus 140, the lower hierarchy data is generated in association with the upper hierarchy data so that one pixel is reduced from four pixels of the lower hierarchy corresponding to the one pixel of the upper hierarchy by coders 154 to 157, thereby, the lowering of the compression efficiency can be avoided even if a picture data is divided into a plurality of hierarchies and coded.

These inter-hierarchy difference data D140 to D143 are inputted respectively to division control circuits 150, 151, 152, and 153. This division control circuits 150 to 153 perform the determination between the threshold value Tha and the block activity which represents whether or not the specified block in the inter-hierarchy difference data D140 to D143 is a plane portion, every time in the order from the inter-hierarchy difference data D143 to D140 of the upper hierarchy, and determine whether or not to transmit the following inter-hierarchy difference data D142 to D140. For example, assuming that the activity value in the block of the inter-hierarchy difference data D143 of the fourth hierarchy is "A", when satisfying the following equation:

$$A < Tha \quad (5)$$

the picture data is determined as a plane portion and a block in which the deterioration is hardly occurred, and then the determination flag F representing no transmission is set. In this manner, the division control circuits 150 to 153 perform the determination between the threshold value Tha and the block activity every time, with respect to all of the blocks of the inter-hierarchy difference data D140 to D143 of each hierarchy, and as a result, the determination flag F representing whether or not to transmit the corresponding block is outputted to a control code generating circuit 159.

At the same time, the division control circuit 153 outputs the control signal C3 to the division control circuit 152 of the third hierarchy. As a result, the division control circuit 152 of the third hierarchy stops unconditionally the transmission of the inter-hierarchy difference data D142. The division control circuit 152 of the third hierarchy and the division control circuit 153 of the second hierarchy receive the control signals C3 and C2 which represent unconditioned stop of transmission, and output this as it is to the lower division control circuits 151, 150 as the control signals C2, C1 respectively. Thereby, transmission of the inter-hierarchy difference data D142 to D140 of all of the lower hierarchies are stopped unconditionally by the control of the division control circuits 153 to 150.

In this manner, the inter-hierarchy difference data D140 to D143 of each hierarchy which are outputted from the division control circuits 150 to 153, are outputted to the coders 154 to 157. On the other hand, the fifth hierarchy data D135 of the uppermost hierarchy is outputted to the coder 158 as it is. The coders 154 to 157 compress and code the inter-hierarchy difference data D140 to D143 by means of the non-linear coding method which applies to the coding of difference data, so that the first to the fourth hierarchy compression-coded data D145 to D148 are generated. On the other hand, the coder 158 compression-codes the fifth hierarchy data D135 by means of the linear coding method which applies to the coding of picture data being mean value data, so that the fifth hierarchy compression-coded data D149 is generated.

The determination flag F outputted from the respective division control circuits 150 to 153 is inputted to the control code generating circuit 159. Then, the control code generating circuit 159 generates the control code D150 which is composed of the determination flags F of each hierarchy and each block. The control code D150 and the first to the fifth hierarchy compression-coded data D145 to D149 are, after coded by means of the run-length coding and so on, divided into frames by predetermined transmission data forming unit (not shown), and then these are transmitted to the transmission lines.

Figure 8:
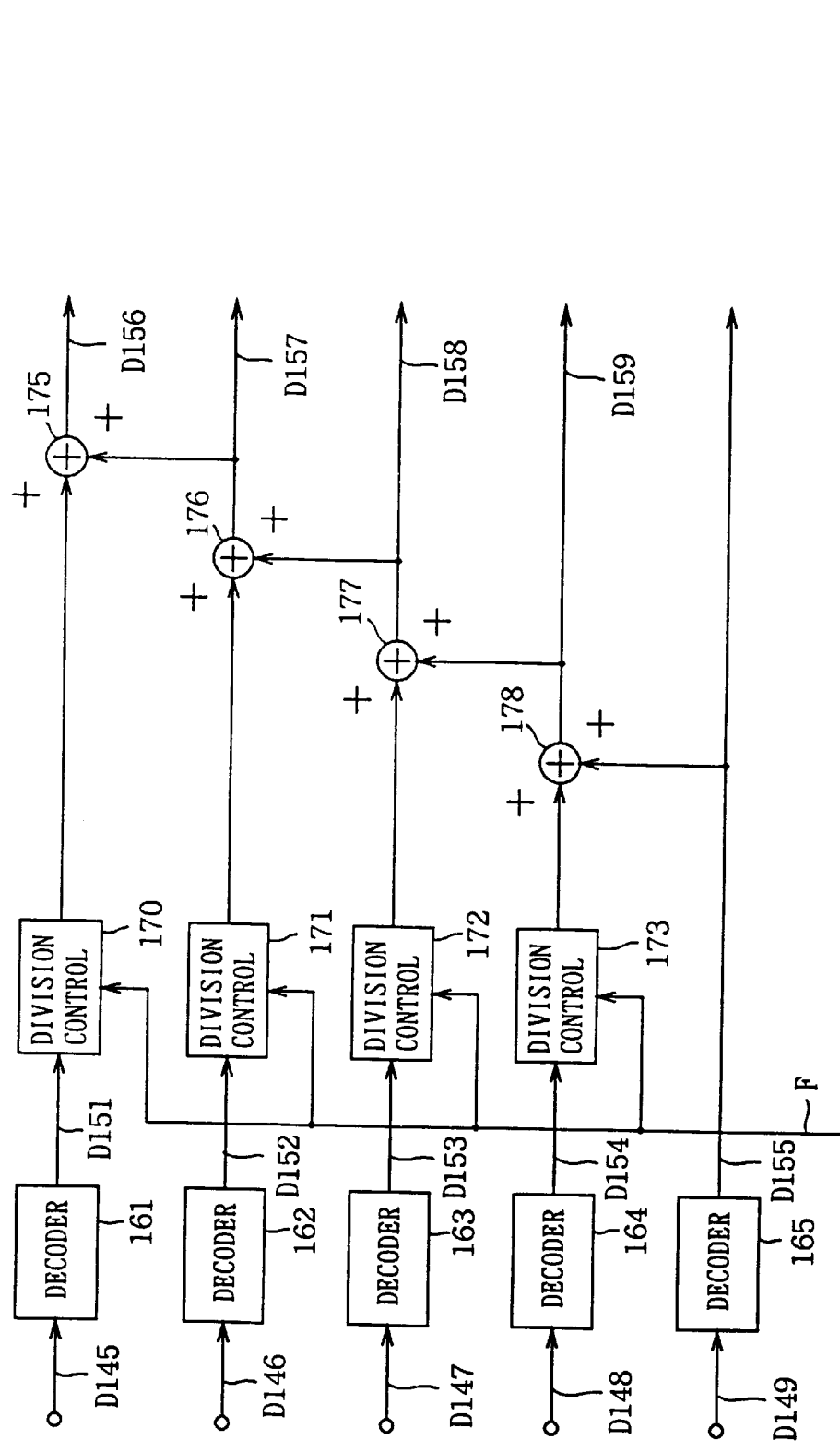
FIG. 8 is a block diagram showing the picture decoding apparatus of the first embodiment.

Thus transmitted the first to the fifth hierarchy compression-coded data D145 to D149 and the control code D150 are decoded by the picture decoding apparatus 160 shown in FIG. 8. More specifically, the first to the fifth hierarchy compression-coded data D145 to D149 are inputted to the decoders 161 to 165 which have the decoding technique inverse to the coding of the coders 154 to 158. As a result, the inter-hierarchy difference data D151 to D154 of the first to the fourth hierarchies which are decoded by the decoders 161 to 164, are inputted respectively via the division control circuits 170 to 173 of the first to the fourth hierarchies to the first to the fourth adding circuits 175 to 178.

On the other hand, the fifth hierarchy compression-coded data D149 is decoded at the decoder 165. Thus obtained fifth hierarchy data D155 is outputted as it is to the fourth adding circuit 178. The fourth adding circuit 178 adds the fifth hierarchy data D155 and the inter-hierarchy difference data D154 of the fourth hierarchy to restore the fourth hierarchy data D159, and outputs it to the third adding circuit 177.

Similarly, the third adding circuit 177 adds the restored fourth hierarchy data D159 and the inter-hierarchy difference data D153 of the third hierarchy to restore the third hierarchy data D158, and outputs it to the second adding circuit 176. In the same manner, the second hierarchy data D157 and the first hierarchy data D156 are restored from the second adding circuit 176 and the first adding circuit 175, and similarly, the first to the fourth, and the fifth hierarchy data D156 to D159, and D155 are outputted.

The control code D150 is inputted to the control code analyzing circuit 166. The control code analyzing circuit 166 analyzes that if the transmission stop of the inter-hierarchy difference data has occurred, based on the inputted control code D150, and outputs the analysis result to the division control circuits 170 to 173 as the transmission stop flag F. If it is detected that the transmission stop of the inter-hierarchy difference data has occurred, based on the inputted transmission stop flag F, the division control circuits 170 to 173 generate the inter-hierarchy difference data of the value "0", for example as a dummy data, instead of the inter-hierarchy difference data, and output it to the adding circuits 175 to 178.

As the above, in the picture coding apparatus 140, only control data representing transmission stop is transmitted in accordance with the block activity of the inter-hierarchy difference data, without transmitting the inter-hierarchy difference data of unnecessary block, so that the hierarchy data can be certainly restored based on the control data in the picture decoding apparatus 160.

According to the above construction, the block activity of the specified block of the inter-hierarchy difference data of each hierarchy excepting the uppermost hierarchy is determined, and when the block activity is less than the specified threshold value, the division stop flag is set as the determination flag of a plurality of lower blocks corresponding to the block in the inter-hierarchy difference data of adjacent lower hierarchies, and at the same time, determination of the block activity of the plurality of lower blocks and transmission of the plurality of lower blocks are stopped, and then the determination flag for each block is transmitted along with the coded code, so that the coded data in unnecessary block can not be transmitted in accordance with the block activity of the inter-hierarchy difference data. Thereby, a picture coding method and a picture coding apparatus in which the quantity of codes can be reduced and the compression efficiency of the coded data can be improved, can be realized.

Figure 9:
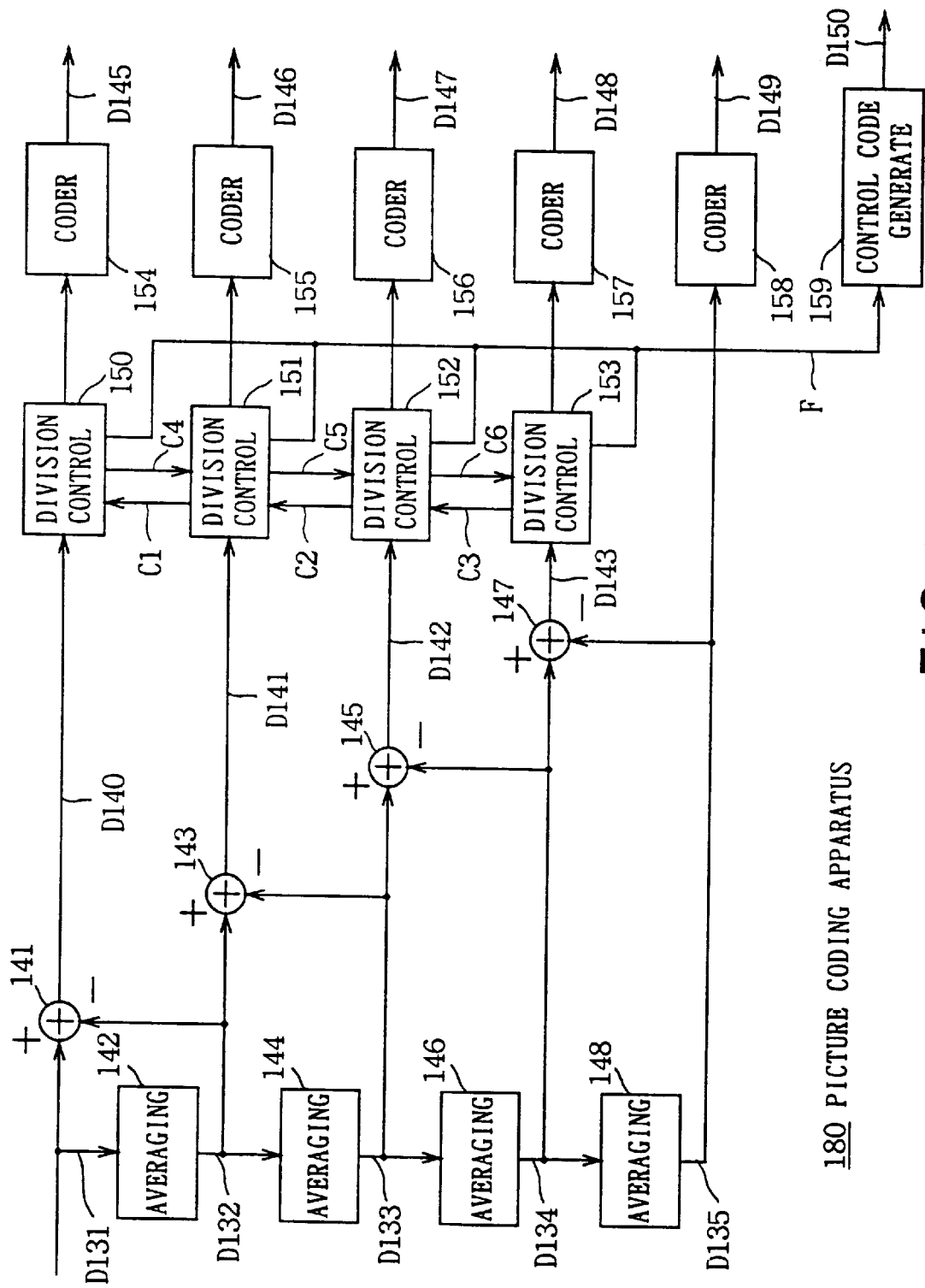
FIG. 9 is a block diagram showing another embodiment of the first embodiment.

(2) Other Embodiments of First Embodiment (2-1) In the embodiment described above, such a case is described that the transmission is stopped by which, the block activity value is determined in the block of the inter-hierarchy difference, and when the block activity is less than the specified threshold value, the control signals C1, C2, and C3 which designate the division stop for the lower hierarchy, and at the same time, the division stop flag is set as the determination flag of the plurality of lower blocks which correspond to the block in the lower inter-hierarchy difference data. However, the present invention is not only limited to this, but as shown in FIG. 9, when the block activity value is less than the specified threshold value, the control signals C1, C2, and C3 which designate the division stop is output for the lower hierarchy, and the division stop flag is temporarily set as the determination flag of the plurality of lower blocks which correspond to the block in the lower inter-hierarchy difference data; when the block activity of any one of the plurality of blocks is the specified threshold value or more, the control signals C4, C5, and C6 which divide again are outputted to the division control circuits 51, 52, or 53 of the upper hierarchy, and the division stop flag can be changed to the division continue flag and then the determination flag for each block can be transmitted along with the coded code.

In this connection, to accomplish this, in the picture coding apparatus described above accompanying with FIG. 6, determination of the block activity value is performed with respect to all of the inter-hierarchy difference data at the division control circuit. If it is detected that the block activity value is the threshold value or more, it is needed that the designation for changing the transmission stop command to transmission continue command is outputted from the lower division control circuit to the upper division control circuit, even if the control data of transmission stop is inputted from the upper division control circuit.

(2-2) In the embodiments described above, such a case is described that a picture data is sequentially and recursively divided into plural hierarchy data having a plurality of resolutions different from each other, and the uppermost hierarchy data having the lowest resolution and inter-hierarchy difference data for a plurality of hierarchies which is composed of the difference value between respective hierarchy data excepting the uppermost hierarchy data and the adjacent upper hierarchy data, are coded. However, the present invention is not only limited to this, but may be applied to the case where a picture data is sequentially and recursively divided into plural hierarchy data having a plurality of resolutions different from each other and coded. In this case, the same effects as the embodiments described above can be realized by determination of the block activity value is also performed with respect to the block of the hierarchy data instead of the inter-hierarchy difference data.

(2-3) Further, in the embodiments described above, such a case is described that the determination between the maximum value and the threshold value in the block is performed as the block activity. However, the present invention is not only limited to this, but the determination between the threshold, and a mean value, a sum of absolute values, a standard deviation, an n-th power sum, can be performed as the block activity. Further, the same effects as the embodiments described above can be realized by using the data frequency over the specified threshold value in the block.

(2-4) Further, in the embodiments described above, such a case is described that when a picture data is divided into plural hierarchy data, the adjacent upper hierarchy data is sequentially and recursively formed by averaging the calculation result for each specified block of the picture data or adjacent lower hierarchy data. However, the present invention is not only limited to this, but adjacent upper hierarchy data can be recursively formed by averaging the weighting such as taking the average by prescribed weighting. Further, the present invention is also applicable to the case where the upper hierarchy data is recursively formed by means of the other method such as the decimating.

(2-5) Further, in the embodiments described above, such a case is described that the block activity value in the block is determined to stop the transmission of the lower hierarchy data. However, whether or not to stop the transmission is not only limited to use the block activity value, but can use the other characteristic of the picture data. In this manner, by the division of the adaptive block is performed corresponding to the characteristic of the picture data, the coding efficiency can be improved.

(3) As described above, according to the present invention, when a picture data represented by using a recursive hierarchical representation is hierarchically coded, the picture data is divided into the blocks adaptively corresponding to the characteristic of the picture data and is coded, and the hierarchical coded data obtained as a result of the division is transmitted in order to perform the division of the lower blocks adaptively. Thereby, a picture coding method and a picture coding apparatus in which the information quantity of plane portion of a picture can be reduced, can be realized.

The block activity value of the specified block of the hierarchy data excepting the uppermost hierarchy data having the lowest resolution is determined, and when the block activity value is less than the specified threshold value, a division stop flag is set as a determination flag of a plurality of lower blocks corresponding to the block in the adjacent lower hierarchy data, and at this time, the determination of the block activity value of the plurality of lower blocks and transmission of the plurality of lower blocks are stopped and the determination flag for each block is transmitted along with the coded code, so as not to transmit the coded data of unnecessary block in accordance with the block activity value of the hierarchy data. Thereby, the picture coding method and the picture coding apparatus in which the quantity of codes can be reduced and the compression efficiency of the coded data can be improved, can be realized.

Further, the block activity of the specified block of the inter-hierarchy difference data of the respective hierarchies excepting the uppermost hierarchy is determined, and when the block activity is less than the specified threshold value, a division stop flag is set as a determination flag of a plurality of lower blocks corresponding to the block in the inter-hierarchy difference data of adjacent lower hierarchy data, and at this time, the determination of the block activity value of the plurality of lower blocks and transmission of the plurality of lower blocks are stopped and the determination flag for each block is transmitted along with the coded code, so as not to transmit the coded data of unnecessary block in accordance with the block activity value of the inter-hierarchy difference data. Thereby, the picture coding method and the picture coding apparatus in which the quantity of codes can be reduced and the compression efficiency of coded data can be improved, can be realized.

Further, the block activity value of the specified block in the hierarchy data excepting the uppermost hierarchy data having the lowest resolution is determined, and when the block activity value is less than the specified threshold value, a division stop flag is temporarily set as a determination flag of the plurality of lower blocks corresponding to the block in adjacent lower hierarchy data. When the block activity value of any one of the plurality of lower blocks is the specified value or more, the division stop flag is changed to division continue flag and the determination flag for each block is transmitted along with the coded code, so as not to transmit unnecessary coded data by determining the necessity of the block in accordance with the block activity of the hierarchy data with avoiding the deterioration of the picture quality previously. Thereby, the picture coding method and the picture coding apparatus in which the quantity of codes can be reduced and the compression efficiency of the coded data can be improved, can be realized.

Further, the block activity value of the specified block of the inter-hierarchy difference data of the respective hierarchies excepting the uppermost hierarchy are determined, and when the block activity value is less than the specified threshold value, the division stop flag is temporarily set as a determination flag of the plurality of lower blocks corresponding to the block in the adjacent lower hierarchy data. When the block activity value of any plurality of lower blocks is the specified threshold value or more, the division stop flag is changed to division continue flag and the determination flag for each block is transmitted along with the coded code, so as to determine the necessity of the block in accordance with the block activity of the inter-hierarchy difference data with avoiding the deterioration of picture quality previously and not to transmit unnecessary coded data. Thereby, the picture coding method and the picture coding apparatus in which the quantity of codes can be reduced and the compression efficiency of the coded data can be improved, can be realized.

[3] Second Embodiment (1) Picture Coding Apparatus of the Second Embodiment

Figure 10:
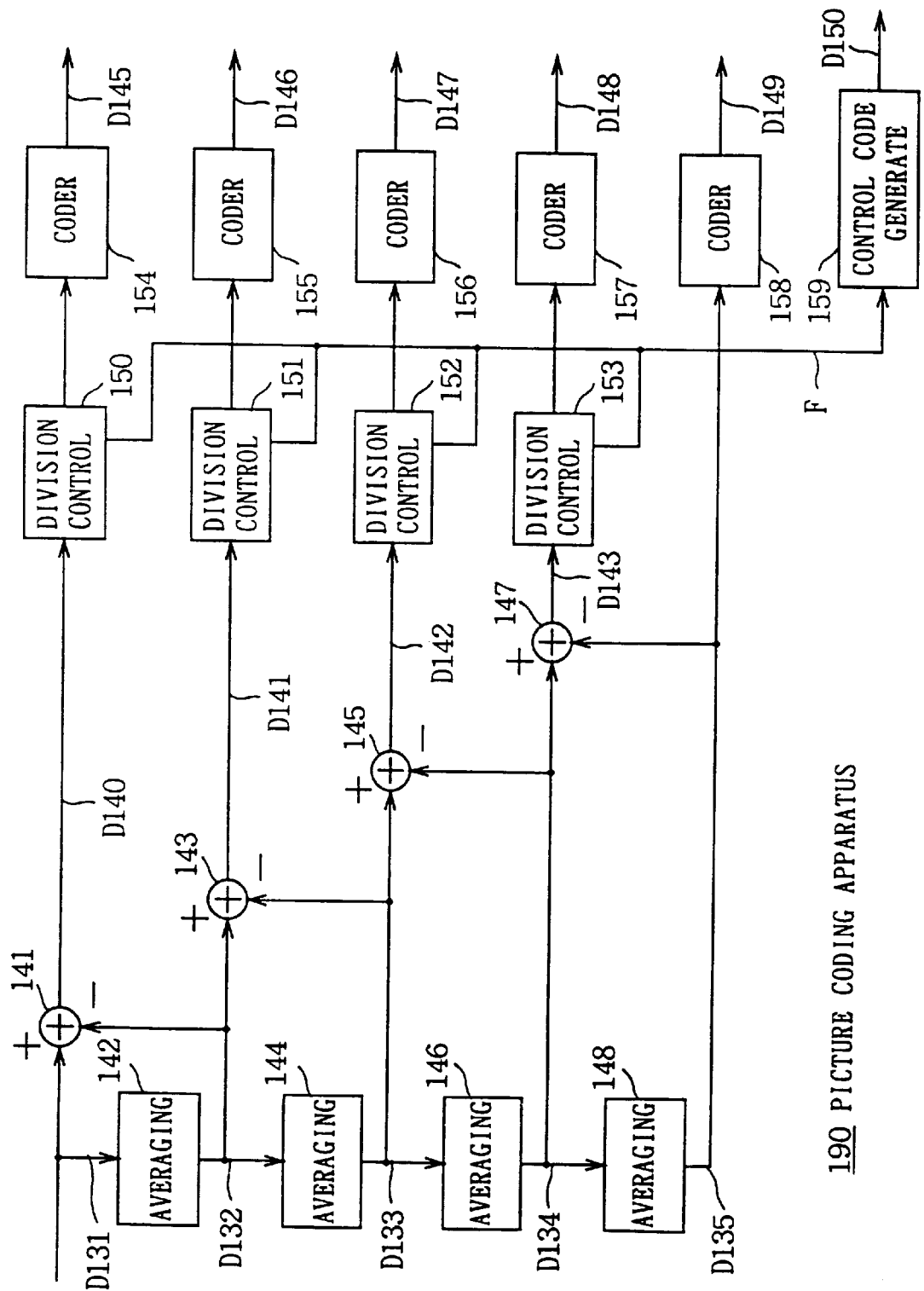
FIG. 10 is a block diagram showing the picture encoding apparatus of the second embodiment according to the present invention.

FIG. 10 shows the second embodiment in which the corresponding part to FIG. 6 is attached the same numeral. In this case, the division control circuits 150 to 153 of the picture coding apparatus 90 perform a determination between the threshold value Tha and the block activity which represents if the predetermined block in the inter-hierarchy difference data D140 to D143 is a plane portion, every time for the respective block of the inter-hierarchy difference data D140 to D143 of each hierarchy, to determine the processing whether or not to transmit the corresponding block of the above inter-hierarchy difference data D140 to D143.

For example, assuming the activity in the block of the inter-hierarchy difference data D143 of the fourth hierarchy as "A", when satisfying the following equation:

$$A < Tha \qquad (6)$$

the picture data is determined as a plane portion and a block in which the deterioration is hardly occurred. Then the determination flag F representing that the block is not transmitted is set. In this manner, the division control circuits 150 to 153 perform the determination between the threshold value Tha and the block activity every time, with respect to all of the blocks of the inter-hierarchy difference data D140 to D143 of each hierarchy, and output the determination flag F representing that whether or not to transmit the corresponding block, to the control code generating circuit 159.

The inter-hierarchy difference data D140 to D143 of each hierarchy which are outputted from the division control circuits 150 to 153 in this manner, are also outputted to the coders 154, 155, 156, and 157. The fifth hierarchy data D135 of the uppermost hierarchy is outputted to the coder 158 as it is. The coders 154, 155, 156, and 157 compression-code the inter-hierarchy difference data D140 to D143 by means of the non-linear coding method which applies to the coding of difference data, so that the first to the fourth hierarchy compression-coded data D145 to D148 are generated. Further, the coder 158 compression-codes the fifth hierarchy data D135 by means of the non-linear coding method which applies to the coding of the picture data being mean value data, so that the fifth hierarchy compression-coded data D149 is generated. The first to the fifth hierarchy compression-coded data D145 to D149 and the control codes are divided into frames by a predetermined transmission data forming unit (not shown) and outputted to the transmission line.

In this manner, by determining the block activity of the inter-hierarchy difference data in the picture coding apparatus 190, only control data representing the transmission stop is transmitted without transmitting unnecessary block, so that the hierarchy data can be certainly restored based on the control data by the picture decoding apparatus 160 (FIG. 8).

According to the above construction, the block activity is determined every time as to all of the blocks of the inter-hierarchy difference data of each hierarchy excepting the uppermost hierarchy, and the processing of the inter-hierarchy difference data in the block is selected based on the determined result, so that the generated information quantity in the block can be reduced by controlling separately. Thereby, the compression efficiency when the picture data is hierarchically coded, can be improved.

(2) Other Embodiments of Second Embodiment (2-1) In the embodiment described above, such a case is described that a picture data is sequentially and recursively divided into plural hierarchy data having a plurality of resolutions different from each other, and the uppermost hierarchy data having the lowest resolution, and the inter-hierarchy difference data for a plurality of hierarchies which is composed of the difference value between the respective hierarchy data excepting the uppermost hierarchy data and the adjacent upper hierarchy data, are coded. However, the present invention is not only limited to this, but can be applied to the case where a picture data is sequentially and recursively divided into plural hierarchy data having a plurality of resolutions different from each other and coded. In this case, the same effects as the embodiments described above can be realized by the determination of the block activity is also performed with respect to the block of the hierarchy data, instead of the inter-hierarchy difference data.

(2-2) In the embodiments described above, such a case is described that the determination between the maximum value and the threshold value in a block is performed as the block activity. However, the present invention is not only limited to this, but the determination between a threshold value, and a mean value, a sum of absolute values, a standard deviation, an n-th power sum can be performed as the block activity. Further, the same effects as the embodiments described above can be realized even if the data frequency over the specified threshold value in the block is used.

(2-3) In the embodiments described above, such a case is described that when a picture data is divided into plural hierarchy data, adjacent upper hierarchy data is sequentially and recursively formed by averaging the calculation result for each specified block of the picture data or the adjacent lower hierarchy data. However, the present invention is not only limited to this, but the adjacent upper hierarchy data can be recursively formed by averaging the weighting such as taking the average by prescribed weighting. Further, the present invention is also applicable to the case where the upper hierarchy data is recursively formed by means of the decimating or the like.

(3) As described above, according to the present invention, the block activity value is determined every time as to all of the blocks of the hierarchy data excepting the uppermost hierarchy data having the lowest resolution, and the processing of the hierarchy data in the block is selected based on the determined result, so that the generated information quantity in the block can be reduced by separately controlling. Thereby, the picture coding method and the picture coding apparatus in which the compression efficiency when the picture data is hierarchically coded, can be realized.

The block activity value is determined every time as to all of the blocks of the inter-hierarchy difference data of the respective hierarchies excepting the uppermost hierarchy, and the processing of the inter-hierarchy difference data in the block is selected in accordance with the above determined result, so that the generated information quantity in the block can be reduced by separately controlling. Thereby, the picture coding method and the picture coding apparatus in which the compression efficiency when the picture data is hierarchically coded can be improved, can be realized.

[4] Third Embodiment (1) Picture Coding Apparatus of the Third Embodiment

Figure 11:
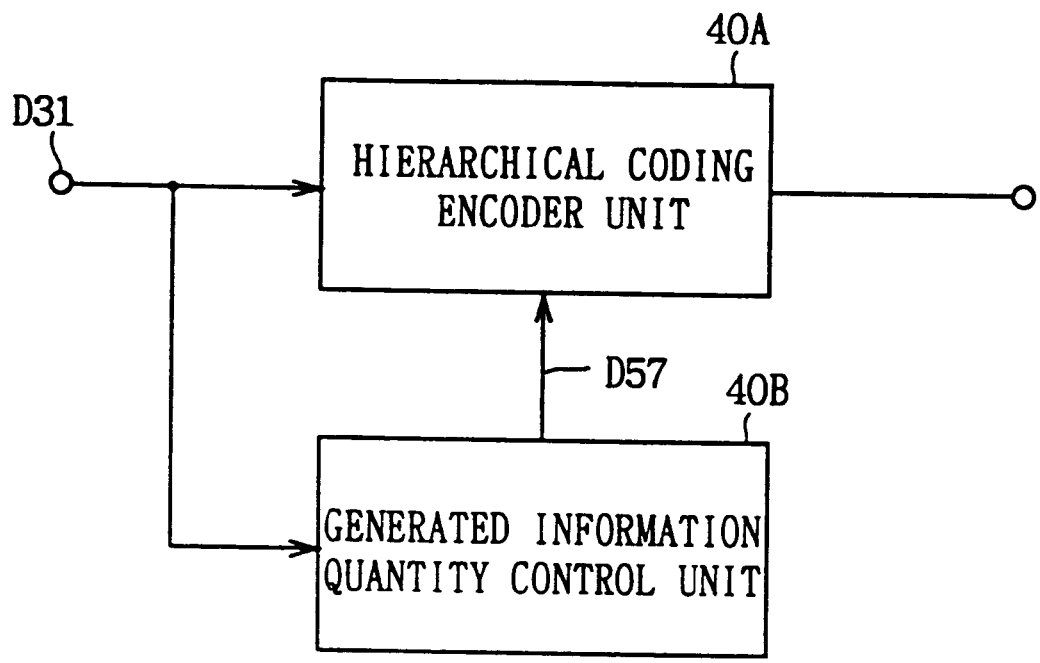
FIG. 11 is a block diagram showing the picture coding apparatus of the third embodiment according to the present invention.

FIG. 11 shows the picture coding apparatus 40 of the third embodiment, which is composed of a hierarchical coding encoder unit 40A for hierarchically coding an input picture data D31 and outputting it, and a generated information quantity control unit 40B for controlling the generated information quantity in the hierarchical coding encoder unit 40A so as to attain the target value.

The hierarchical coding encoder unit 40A is composed of a data delaying memory (not shown) and an encoder. The memory is provided in the inputting stage in order that the data can be delayed, so that the encoding processing will not be performed until an optimal control value is determined in the generated information quantity control unit 40B.

Meanwhile, the generated information quantity control unit 40B inputs an input picture data and then determines a threshold value TH which is accommodated to the data to be processed, and also transmits the optimal control value, which is determined so that the inputted picture data will be efficiently coded in the hierarchical coding encoder unit 40A, to the encoder. It has a construction of a so-called feed-forward type buffering. By virtue of this construction, the generated information quantity can be controlled separately, and a time delay generated by the feed-forward type buffering can be eliminated.

(2) Hierarchical Coding Encoder Unit 40A (2-1) Structure of Block

Figure 12:
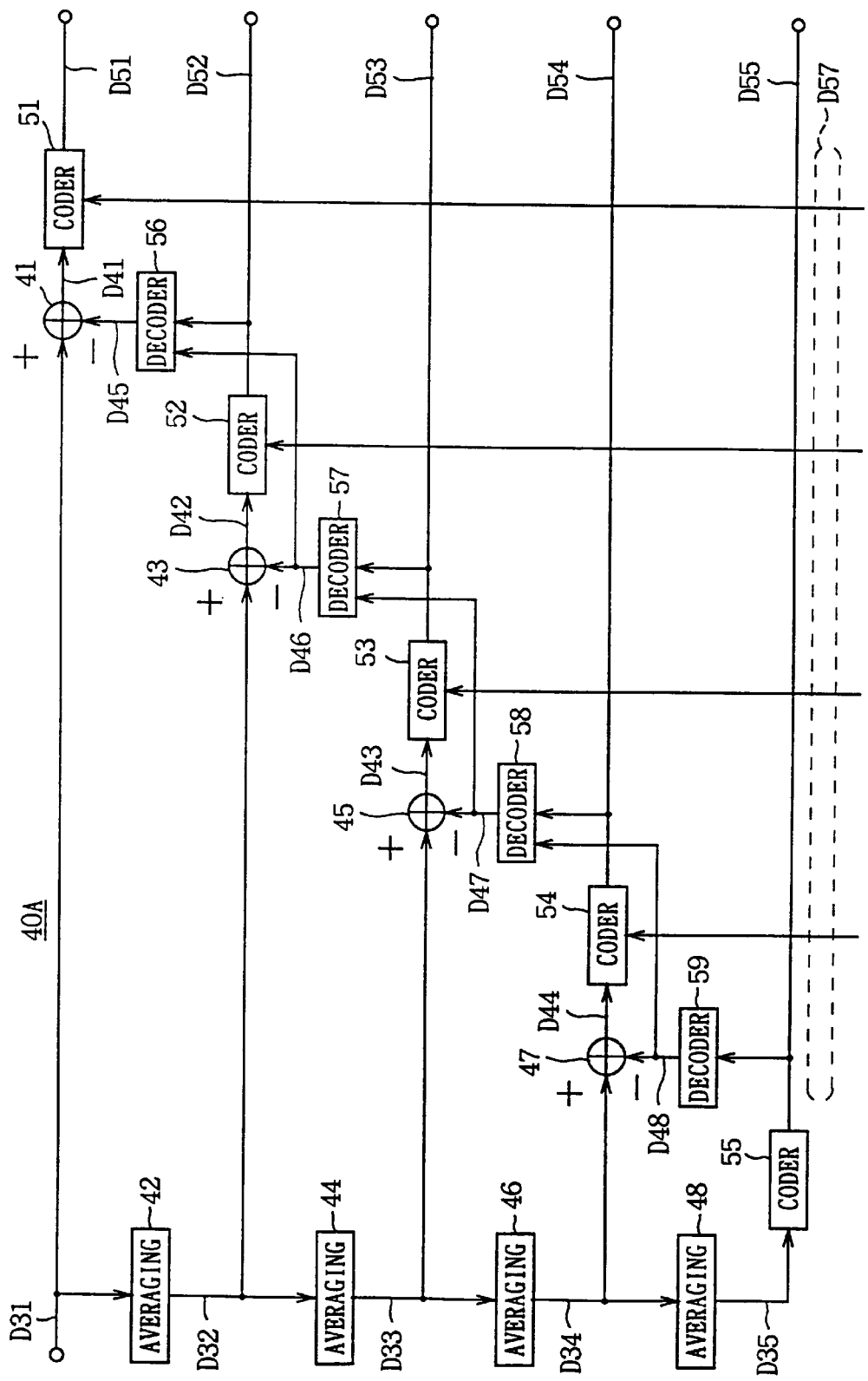
FIG. 12 is a block diagram showing the hierarchical coding encoder unit of FIG. 11.

The hierarchical coding encoder unit 40A has the construction shown in FIG. 12, and in the case of this example, processes by dividing into five hierarchies.

Figure 15A:
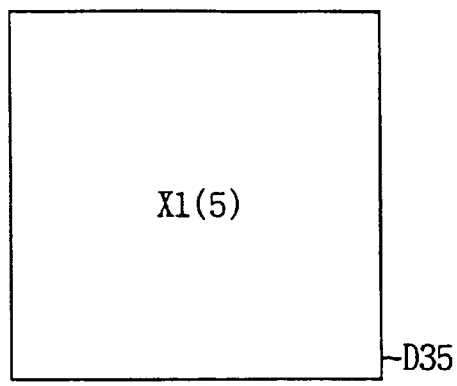
FIGS. 15(A) to 15(E) are schematic diagrams explaining a hierarchical structure.
Figure 15D:
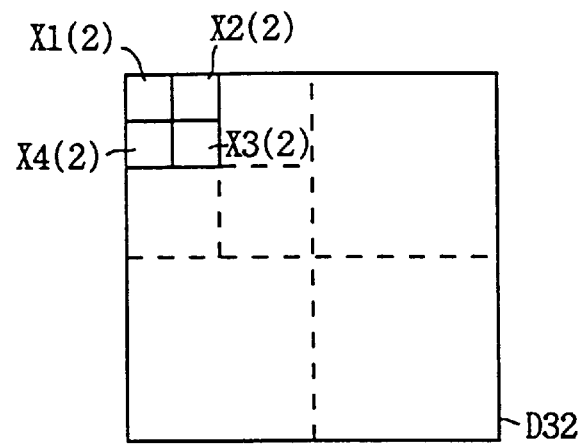
Figure 15B:
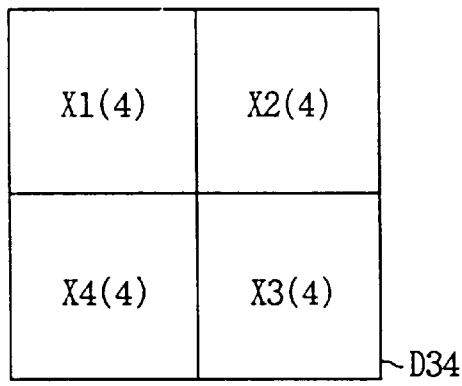
Figure 15E:
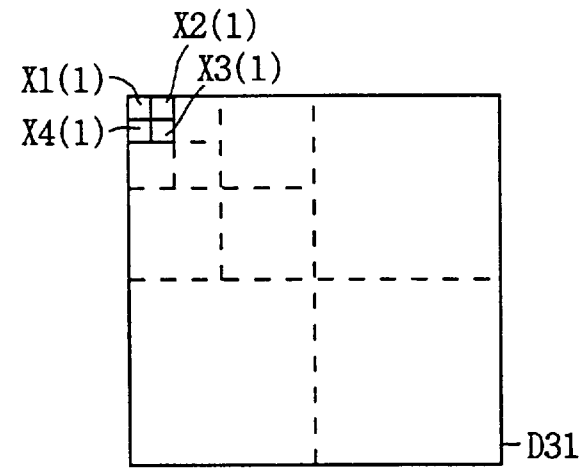

At first, an input picture data D31 is inputted to the first difference circuit 41 and the first averaging circuit 42. The first averaging circuit 42 generates the second hierarchy data D32, by averaging the four pixels of the input picture data D31 (that is, the first hierarchy data (the lowest hierarchy data)). In the case of this embodiment, the first averaging circuit 42 generates a pixel X1(2) of the second hierarchy data D2, from the four pixels X1(1)–X4(1) of the input picture data D31, as shown in FIGS. 15(D) and 15(E).

In the same manner, the pixels X2(2)–X4(2), which are adjacent to the pixel X1(2) of the second hierarchy data D32, are generated by averaging the four pixels of the first hierarchy data D31.

Figure 15C:
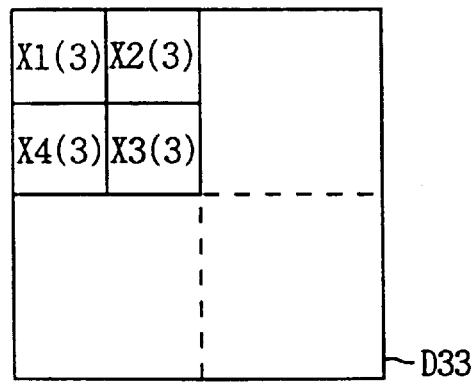

The second hierarchy data D32 is inputted to the second difference circuit 43 and the second averaging circuit 44. The second averaging circuit 44 generates the third hierarchy data D33, by averaging the four pixels of the second hierarchy data D32. For instance, the pixel X1(3) of the third hierarchy data D33 which is shown in FIG. 15(C) is generated by the pixels X1(2)–X4(2) of the second hierarchy data D32 which is shown in FIG. 15(D). The pixels X2(3)–X4(3) which are adjacent to the pixel X1(3) are similarly generated by averaging the four pixels of the second hierarchy data D32.

The third hierarchy data D33 is inputted to the third difference circuit 45 and the third averaging circuit 46. As shown in FIGS. 15(B) and 15(C), the third averaging circuit 46 generates the fourth hierarchy data D34 which is composed of the pixels X1(4)–X4(4), by averaging the four pixels of the third hierarchy data D33 in the same manner as the foregoing.

The fourth hierarchy data D34 is inputted to the fourth difference circuit 47 and the fourth averaging circuit 48. The fourth averaging circuit 48 generates the fifth hierarchy data D35 which is the uppermost hierarchy, by averaging the four pixels of the fourth hierarchy data D34. That is to say, the pixel X1(5) of the fifth hierarchy data D35 is generated by averaging the four pixels X1(4)–X4(4) of the fourth hierarchy data D34, as shown in FIGS. 15(A) and 15(B).

With regard to the block sizes of the first to the fifth hierarchy data D31 to D35, assuming that the block size of the data D31 of the first hierarchy which is the lowest hierarchy, is 1 line×1 pixel, then the block size of the second hierarchy data D32 appears as ½ line×½ pixel, the block size of the third hierarchy data D33 appears as ½ line×¼ pixel, the block size of the fourth hierarchy data D34 appears as ⅛ line×⅛ pixel, and the block size of the fifth hierarchy data D35 which is the uppermost hierarchy data appears as ¹⁄₁₆ line×¹⁄₁₆ pixel.

The hierarchical coding encoder unit 40A repeats a recursive process with respect to the first to the fifth hierarchy data D31 to D35 by turns in the manner that starts with the uppermost hierarchy data (that is, the fifth hierarchy data D35), and obtains the difference between the adjacent two hierarchy data at the difference circuits 41, 43, 45, and 47. Then, only the difference data is subjected to compression coding by the coders 51 to 55. Thus, the quantity of the information which is sent to the transmission line is compressed by the hierarchical coding encoder unit 40A. Further, the hierarchical coding encoder unit 40A reduces one pixel among the four pixels of the lower hierarchy corresponding to the one pixel of the upper hierarchy by the coders 51 to 54 to reduce the transmitting data quantity.

In order to maintain such a compression condition optimally, the hierarchical coding encoder unit 40A decodes the transmission data D51 to D55 which has been obtained for each hierarchy by decoders 56 to 59.

The decoder 59 which corresponds to the uppermost hierarchy decodes the transmission data D55 so as to obtain the decoded data D48, which corresponds to the fifth hierarchy data D35 which has been compression-coded at the coder 55, and outputs the decoded data D48 to the difference circuit 47 of the fourth hierarchy.

Meanwhile, the other decoders 56 to 59 switch their decoding operations respectively, based on a flag which indicates whether the division/non-division processing is being performed or not. In the case where a division operation is being performed, the difference data which is to be transmitted as the transmission data D52 to D54 is decoded by the decoding processing, so that the upper hierarchy data (that is to say, the fourth, the third, and the second hierarchy data) is generated and outputted to the difference circuit 45 of the third hierarchy, the difference circuit 43 of the second hierarchy, or the first hierarchy data 41, respectively.

Hereby, the difference data D41, D42, D43, D44 with respect to the adjacent hierarchies is obtained from the difference circuits 41, 43, 45, 47 respectively.

Figure 13:
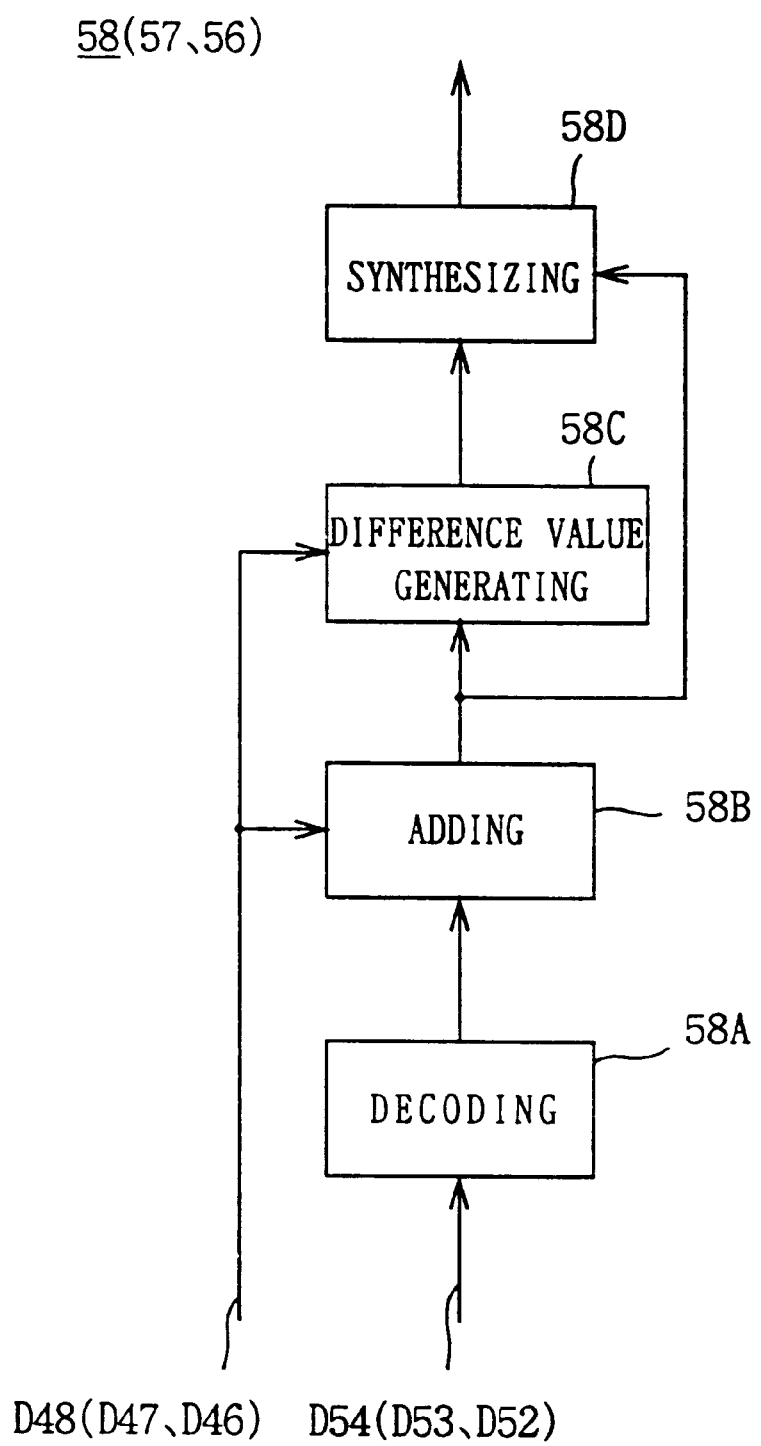
FIG. 13 is a block diagram showing the decoder of FIG. 12.

In practice, the decoders 58, 57, 56 are constructed as shown in FIG. 13. Here, it will be described as to the decoder 58 for simplification. The decoder 58 receives the fourth hierarchy compression-coded data D54 at the decoding circuit 58A to decode it. As a result, the output values, for example, of X1(4)–X1(5), X2(4)–X1(5), X3(4)–X1(5) are obtained that is shown in FIGS. 15(A) to 15(E). These output values are added to the restored data D48 at the succeeding adding circuit 58B to obtain the output values of the X1(4), X2(4), X3(4). The difference value generating circuit 58C generates a non-transmission pixel X4(4) using X1(4), X2(4), X3(4), and X1(5) by performing the calculation based on Equation (4). Accordingly, the fourth hierarchy data X1(4), X2(4), X3(4), X4(4) before obtaining the difference are generated from the following synthesizing circuit 58D, and these are given to the difference circuit 45.

The coders 51 to 54 which corresponds to each hierarchy is inputted the difference data D41, D42, D43, D44, or the fifth hierarchy data D35, which is obtained by the difference circuit 41, 43, 45, 47, or the averaging circuit 48, and performs a determination between a threshold value and an activity value which is given for each block, and a division selecting processing.

In the case that the processed object is a block to be divided, the coders 51 to 54 compression-codes the difference data which has been obtained between hierarchies as it is, and at the same time, transmits it along with a determination flag denoting the division of each block.

On the other hand, in the case that the processed object is a block not to be divided, the coders 51 to 54 determine that this block can be switched by an upper hierarchy data on the receiving side, and except this block from the coding objects. By the way, a determination flag denoting the division of each block is attached and transmitted in this case also.

The first to the fifth hierarchy compression-coded data D51 to D55 which are outputted from these five sets of coders 51 to 55 are divided into frames by the predetermined transmission data forming unit (not shown) and sent out to the predetermined transmission lines.

Figure 14:
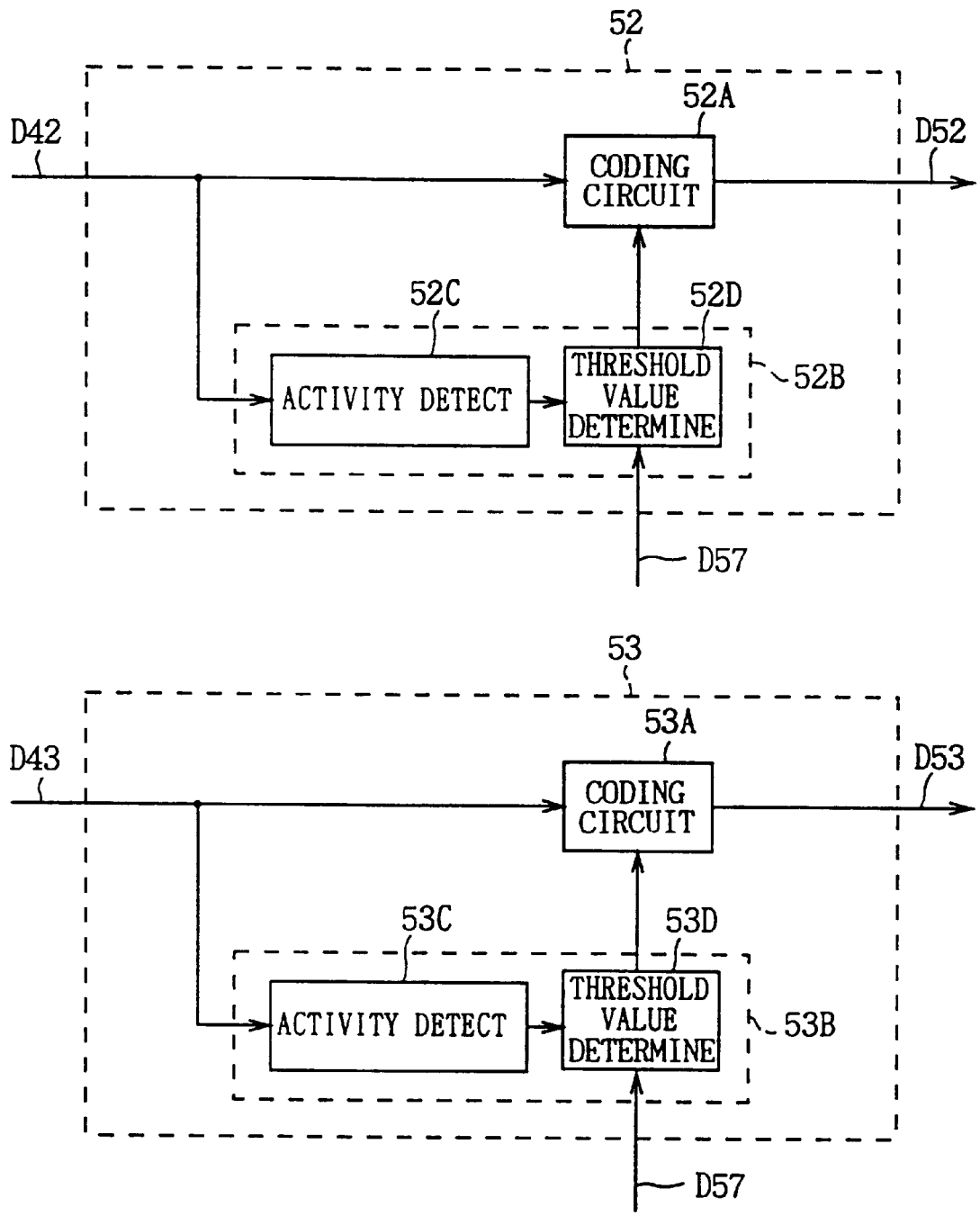
FIG. 14 is a block diagram showing the coder of FIG. 12.

Here, the coders 51, 52, 53, and 54 are constructed as shown in FIG. 14. FIG. 14 shows the structure of the coders 52 and 53 for simplification.

The difference data D42, D43 are inputted to the coding circuits 52A, 53A of the coders 52, 53 respectively. The difference data D42, D43 are inputted to the activity detecting circuits 52C, 53C of the division control units 52B, 53B respectively. The activity detecting circuits 52C, 53C detect the activity of each block of the difference data D42, D43, and thus obtained detected results are given to the following threshold value determining circuits 52D, 53D. The threshold values determining circuits 52D, 53D compare the result of activity detection for each block with the threshold value data D57 from the generated information quantity control unit 40B, and output thus obtained determined result to the coding circuits 52A, 53A. The coding circuits 52A, 53A compression-code for the block having higher activity and transmit it, and on the other hand, does not transmit for the block having lower activity.

(2-2) Processing

Next, a concrete signal processing by the hierarchical coding encoder unit 40A will be explained below.

At first, such a situation is considered that a process with respect to an inter-hierarchy difference value is selected by a block activity value which is based on the inter-hierarchy difference value. Each block is composed of 2 lines×2 pixels.

In this situation, the data value of each pixel is denoted by "X", and the hierarchy of the data value X is represented by attached characters. That is, when an upper hierarchy data is $X_{i+1}(0)$, the adjacent lower hierarchy data is $X_i(j)$ (j=0 to 3). The inter-hierarchy difference coded value is $\Delta X_i(j)$ (j=0 to 3), and the hierarchical coding encoder unit 40A compression-codes this difference coded value.

As to a compression coding process by the coders 51 to 55 at each hierarchy, a block activity value P which is obtained with respect to each block and a threshold value data D57 are compared, and then a process is selected based on the result of this comparison.

In the case that the block activity value P is the threshold value TH or more, a division process is sequentially performed with respect to the lower hierarchy. Meanwhile, in the case that the block activity value P is less than the threshold value TH, the division process with respect to the lower hierarchy is stopped.

Consequently, with respect to a region of which the block activity value P is low, only the upper hierarchy data is sent, so that the information quantity which is transmitted can be reduced.

In a region of which the block activity value is low, the picture data decoding device which receives these data across a transmission line, restores the lower hierarchy data from the upper hierarchy data, utilizing the upper hierarchy data out of the transmission data which is sent sequentially. On the other hand, in a region of which the block activity value is high, the inter-hierarchy difference decoded value and the upper hierarchy data are added so that the data is restored.

A determination flag of one bit has been introduced, toward this determined result of a division or a non-division. By virtue of this flag, the determined result of each block can be indicated.

This determination flag requires one bit per block of each hierarchy, but it is efficient in consideration of the picture quality.

Note that, in the hierarchical coding system of this embodiment, it is assumed that this determination flag is not reflected to the determination at the following lower hierarchies. Further, this determination flag is coded by means of the run-length coding or the like, and transmitted along with the coded code.

(3) Generated Information Quantity Control Unit 40B

(3-1) Structure of Block

Figure 16:
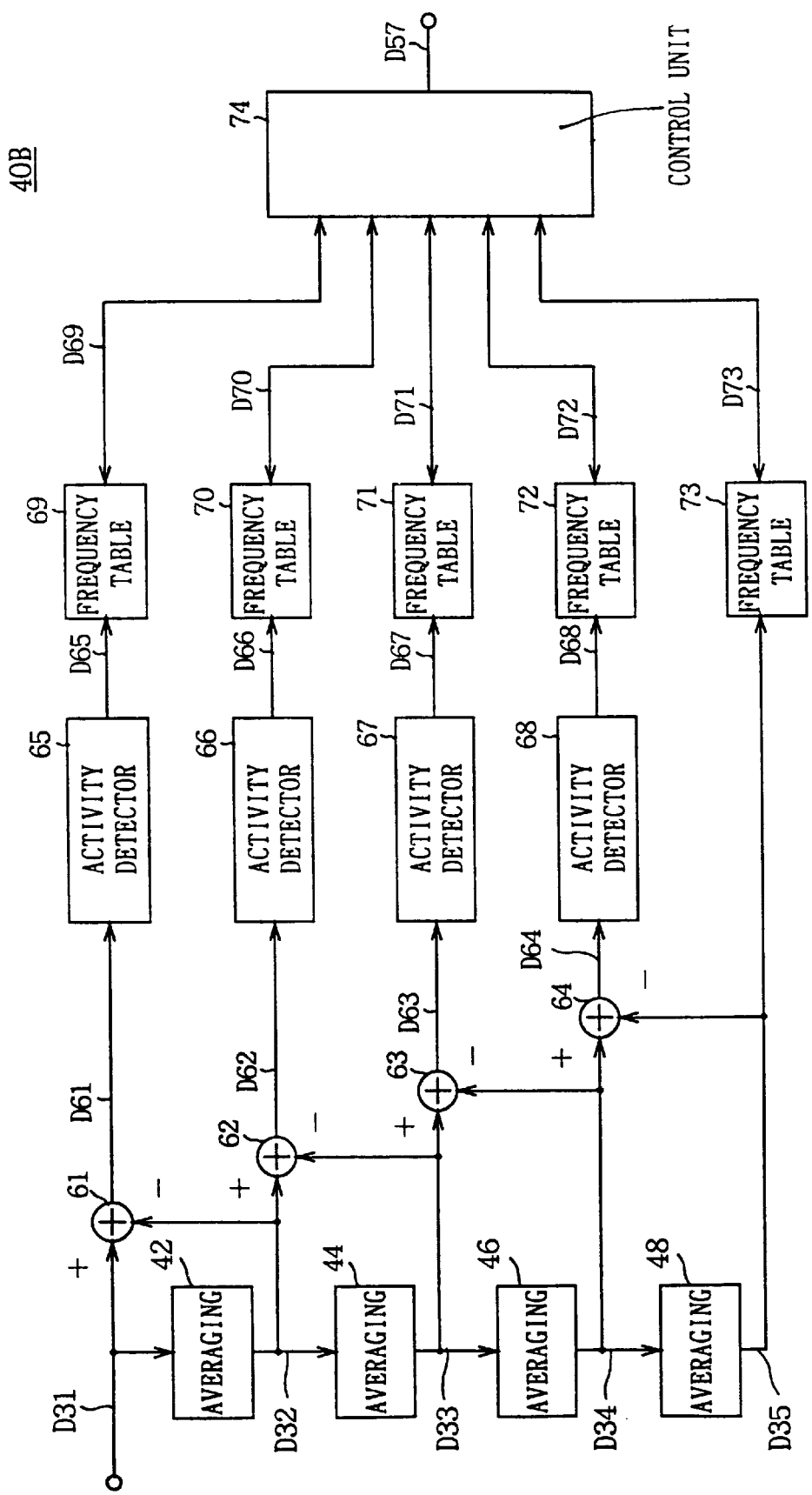
FIG. 16 is a block diagram showing a generated information quantity control unit.
Figure 17A:
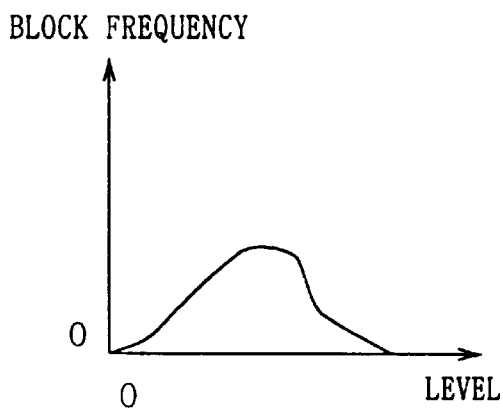
FIGS. 17(A) to 17(E) are characteristic curvilinear diagrams illustrating the frequency table of each hierarchy.
Figure 17B:
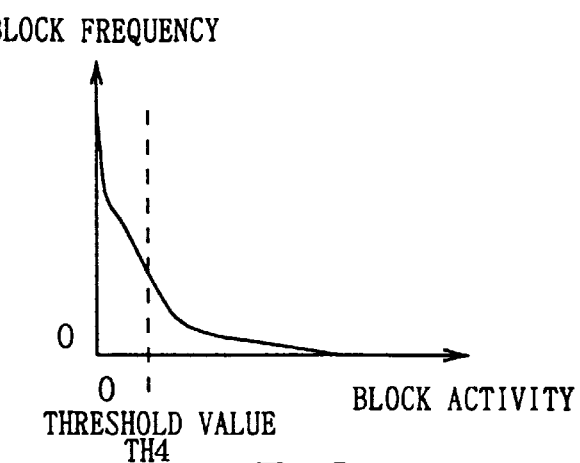
Figure 17C:
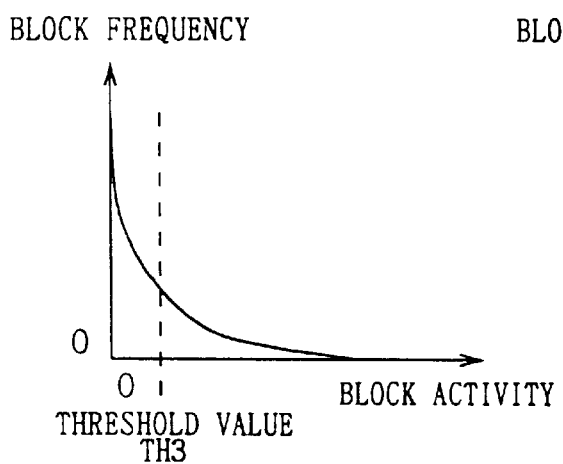
Figure 17D:
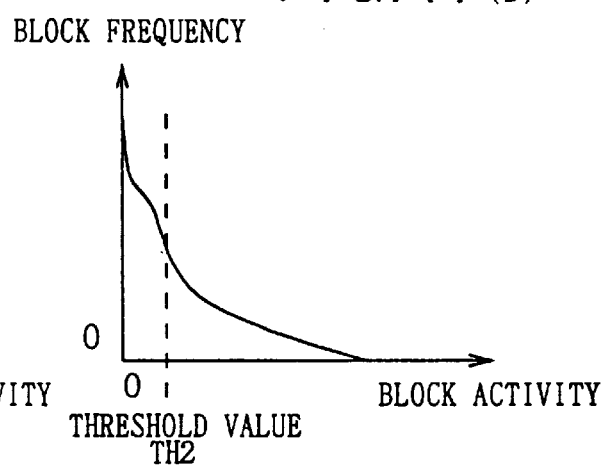
Figure 17E:
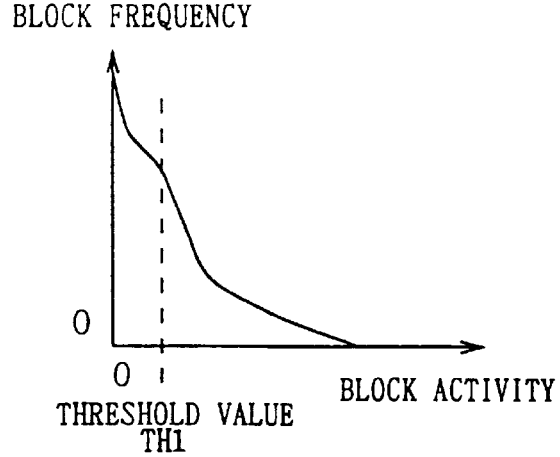

The generated information quantity control unit 40B is structured as shown in FIG. 16.

The generated information quantity control unit 40B sets the combination of threshold values TH1 to TH4 for each hierarchy which is reference on selection of division/non-division, and outputs this to the hierarchical coding encoder unit 40A as threshold value data D57, in order that the hierarchical coding encoder unit 40A can efficiently code the picture data without deteriorating the picture quality.

The generated information quantity control unit 40B generates picture data of five hierarchies having different resolutions from each other, by ¼-averaging the input picture data D31 sequentially through the averaging circuits 42, 44, 46, and 48.

Next, differences between the hierarchical picture data D32, D33, D34, D35 and the picture data D31, D32, D33, D34 of the respective hierarchies, the former hierarchy being upper than the latter by one hierarchy, are obtained at respective difference circuits 61, 62, 63, 64, to obtain the generated information quantity for each hierarchy of the picture data transmitted as a difference data.

These difference data outputted from respective difference circuits 61, 62, 63, 64 can be defined as a difference data of each hierarchy which is obtained by the hierarchical processing at the hierarchical coding encoder unit 40A.

The activity detecting circuits 65, 66, 67, 68 correspond to the picture data of the first to the fourth hierarchies respectively. The activity detecting circuit 65, 66, 67, 68 obtain the block activity of each block at the respective hierarchies and register it to the corresponding frequency tables 69 to 72.

In generating process of the frequency table, three pixels which are objects to be transmitted by the encoder practically, are used out of four pixels of a lower hierarchy corresponding to one pixel of the upper hierarchy, to grasp correctly the quantity of data to be transmitted of the encoder unit.

Since the picture data of the fifth hierarchy is the uppermost hierarchy data, which is transmitted directly not as difference data. Therefore, the dynamic range of each block is registered to the frequency table 73 as it is.

The control unit 74 and these five frequency tables 69 to 73 are connected via bidirectional signal channels. The control unit 74 stores combination of the threshold values TH1 to TH4 and the block activity which is a determination reference of the division/non-division of the lower hierarchy in the ROM.

The control unit 74 supplies these combinations to the frequency tables 69 to 73 to read out the generated information quantity which may be generated for the above threshold value for each hierarchy, and then the total generated information quantity is obtained based on all of the total generated information quantity as a whole. Then, the optimal threshold value is obtained until the total generated information quantity reaches the target value, and thus obtained threshold value is given to the hierarchical coding encoder unit 40A as a control data.

Further, the control unit 74 adjusts the control data to be supplied to the hierarchical coding encoder unit 40A for each hierarchy, considering the characteristic of picture signal data, the visual characteristics of human being, and the like, so that the optimum threshold value can be given. Thereby, the picture quality of the picture which is reproduced at the receiving side can be improved subjectively.

(3-2) Frequency Table

Here, it will be described about the frequency tables 69 to 73 for controlling information quantity.

FIGS. 17(A) to 17(E) show respectively a frequency table of the block activities which are obtained with respect to the uppermost hierarchy data (the fifth hierarchy data) to the lowermost hierarchy data (the first hierarchy data). Here, with respect to the frequency table of the fifth hierarchy shown in FIG. 17(A), a frequency table by dynamic range is generated because the object data is not difference data. For instance, when compression processing by the PCM coding is performed for the fifth hierarchy data D35, a dynamic range which is given with respect to each block is registered as a data, and when the ADRC (adaptive dynamic range coding (U.S. Pat. No. 4,703,352)) is applied as a compression processing method, "DR" of the ADRC block is registered.

Meanwhile, in the other frequency tables 69 to 72, the object data is difference data, therefore, a block having the block activity larger than the threshold values TH1, TH2, TH3, TH4 which are given with respect to each frequency table is to be a block to be divided.

Accordingly, the generated information quantity can be calculated by calculating the number of blocks having the block activity larger than the threshold value in each hierarchy.

Next, an example of calculation of the generated information quantity will be described below.

Here, assuming that the number of blocks in the first hierarchy as N1, the number of blocks to be divided of which the block activity is larger than the threshold value TH1 as N1', and the number of quantization bits at that time as Q1, then the generated information quantity I1 in the first hierarchy is given by the following equation:

$$I1 = 4*Q1*N1'*(\tfrac{3}{4}) + N1 \qquad (7)$$

In the first term of Equation (7), each number of bits is quadrupled, because in the case of this example, each block is divided into 2 lines×2 pixels. Further, in the first term, it is multiplied by ¾, because the characteristic is reflected that, in a structure that an upper hierarchy value is generated based on the mean value of lower hierarchy values, the fourth non-transmission pixel value of lower hierarchy can be restored by means of an arithmetic equation using the upper hierarchy value and three pixels of the lower hierarchy value.

By the way, in the second term, N1 is added to the number of blocks in the first hierarchy. It means that the respective block is transmitted with adding one bit as a division determination flag.

Similarly, as to the second, the third, the fourth hierarchy, assuming that the number of blocks in each hierarchy as N2, N3, N4, the number of blocks to be divided of which the block activity is larger than the threshold values TH2, TH3, TH4 as N2', N3', N4', and the number of quantization bits at that time as Q2, Q3, Q4, then the generated information quantity Ik (k=2, 3, 4) in each hierarchy is given by the following equation:

$$Ik = 4 \cdot Qk \cdot Nk' \cdot (¾) + Nk \quad (8)$$

By using the generated information quantities I1 to I4 of the first to the fourth hierarchies and the generated information quantity I5 of the fifth hierarchy, the total generated information quantity I which is generated by the coding processing of the hierarchical coding encoder unit 40A can be obtained as the sum of generated information quantities of each hierarchy as the following equation:

$$I = I1 + I2 + I3 + I4 + I5 \quad (9)$$

(3-3) Processing

The generated information quantity control unit 40B input an input picture data D31 similarly to the hierarchical coding encoder unit 40A, and a mean value is obtained for each 2 lines×2 pixels at the averaging circuit 42, to reduce the number of pixels into ¼ and lower the resolution. Similarly, with respect to the hierarchy data D32, the number of pixels is reduced into ¼ and lowered the resolution by sequentially passing the averaging circuits 43, 46, 48.

The generated information quantity control unit 40B gives the uppermost hierarchy data D35 (i.e., having the lowest resolution) to the frequency table 73 out of picture data having a plurality of resolutions, and the frequency of the block activtivity P of each block in the fifth hierarchy data D35 is registered. This is measurement of the frequency of data which corresponds to the compression processing performed at the above hierarchical coding encoder unit 40A. For instance, when the compression processing by the PCM coding is performed for the fifth hierarchy data D35, a dynamic range which is given for each block is registered as a data, and on the other hand, when the ADRC is applied as a compression processing, "DR" of the ADRC block is registered.

The difference data D64 can be obtained by the difference between the fourth hierarchy data D34 and the fifth hierarchy data D35. The activity detecting circuit 68 detects the activity with respect to the difference data D64, and nd registers it to the frequency table 72 as the activity data D68.

Similarly, the block activity P of each block which is obtained with respect to the respective lower hierarchy data D33, D32, D31 is sequentially registered to the frequency tables 71, 70, 69 as the activity data D67, D66, D65.

The control unit 74 sequentially reads out the combination with respect to the threshold values TH1, TH2, . . . TH4 for setting division/non-division which is set for each hierarchy from the ROM table shown in FIG. 18 in order from the group of youngest number ($Q_{NO1}$). Continuously, the block frequency having the block activity value P which is larger than respective threshold values TH1, TH2, . . . TH4 is read out from the frequency tables 69 to 73 for each hierarchy, to detect the generated information quantity for each threshold value with respect to each hierarchy.

The control unit 74 integrates the generated information quantity which is obtained with respect to the frequency tables 69 to 73 of each hierarchy, and calculates the total generated information quantity which will be generated by coding at the hierarchical coding encoder 40A. The control unit 74 compares this generated information quantity ay and the target value, and when the difference is large, it proceeds to the group of the threshold values TH1, TH2, . . . TH4 of the next number ($Q_{NO2}$) to obtain a combination of the threshold values which satisfies the target value.

Hereinafter, the above processing is repeated until achieving the total generated information quantity to the target value, and a group of the threshold values TH1, TH2, . . . TH4 in which the total generated information quantity nearest to the target value can be obtained is obtained, to output this to the hierarchical coding encoder 40A as the threshold value data D57.

According to the above structure, the coding of hierarchies having a plurality of resolutions can be easily realized. Further, the total generated information quantity of transmission picture data which is coded and outputted from the hierarchical coding encoder 40A can almost be equaled to the target value, thereby the coding in which the compression efficiency does not lower can be realized. Further, the hierarchical coding can be realized with less deterioration of the picture quality. Furthermore, the management of generated information quantity in the hierarchical coding can be more simplified comparing with the conventional one.

(4) Other Embodiments of Third Embodiment (4-1) In the embodiment described above, such a case is described that the block activity value P is determined based on the decoded data obtained for each block with respect to the upper hierarchy data and the maximum value of the difference value between the lower hierarchy data. However, the present invention is not only limited to this, but the determination can be performed based on an average error, an absolute value sum, a standard deviation, an n-th power sum, or a frequency of data which is a threshold value or more in a block.

(4-2) In the embodiments described above, such a case is described that the frequency table obtained for each hierarchy is used as it is. However, the present invention is not only limited to this, but can use an integrating frequency table which is produced based on the frequency table for calculation of the generated information quantity.

Figure 19:
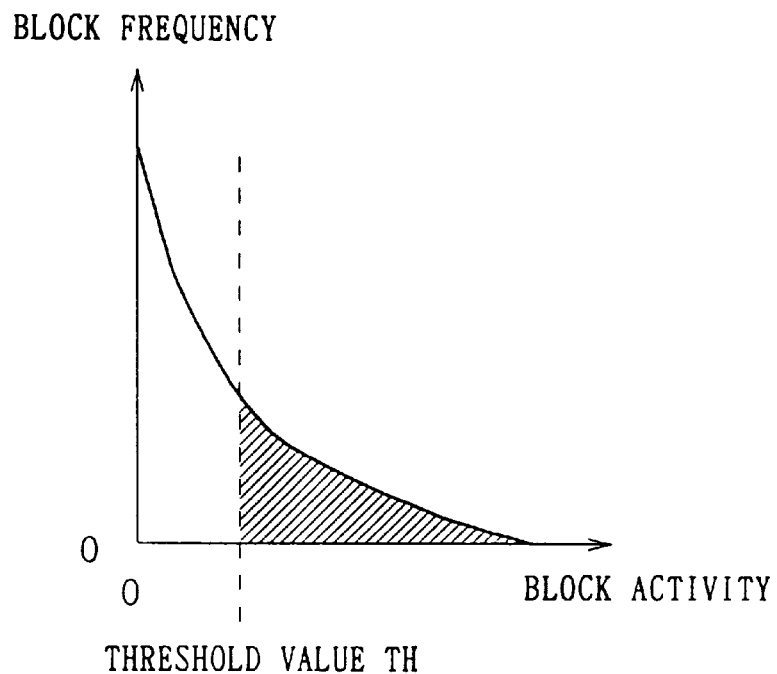
FIG. 19 is a characteristic curvilinear diagram illustrating an integrating frequency table.
Figure 20:
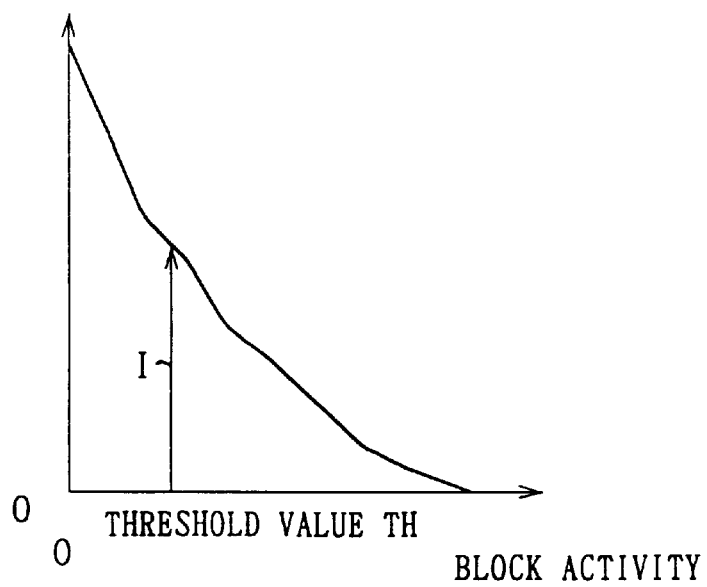
FIG. 20 is a characteristic curvilinear diagram illustrating an integrating frequency table.

More specifically, assuming that the frequency table as shown in FIG. 19 is obtained as a result of registering the block activity value, an integrating operation is performed on the values which is lower than the frequency corresponding to the maximum value of the block activity value, and the respective results are registered to the integrating frequency table as shown in FIG. 20.

Assuming the value of block activity (k=0 to the maximum value) as "k", and a block frequency in each block activity value as N(·), this processing is represented by the following equation:

$$N(k-1) = N(k-1) + N(k) \quad (10)$$

This equation means that the result, that the block frequency of address of a block activity value is read and added to the integrated value until the upper block activity value, is written into the address of the block activity value.

In the integrating frequency table (FIG. 20) thus obtained as a result, the sum of block frequencies of the hatched portion in FIG. 19 correspond to a threshold value TH coordinate data I in the hatched portion. By virtue of this integrating frequency table, it become unnecessary to calculate the sum of block frequencies of the hatched portion (FIG. 19) every time.

More specifically, an accumulated and added value is obtained with respect to block frequencies from the value upper than block activity value to the value of each block activity, and each accumulated and added value is written into the address which corresponds to the value of each block activity so as to produce an integrating frequency table, thereby a frequency corresponding to each block activity becomes an integrated value of the block frequency which has the value of the block activity or more.

Calculation of block frequency integrated value which corresponds to each threshold value is to be unnecessary, by producing an integrating frequency table previously as described above, and a block frequency integrated value can be calculated by only reading out a threshold address of memory. Thereby, a time requires for calculation can be widely shortened.

Here, in practical threshold value processing, it is difficult to use a large determination threshold value because picture quality deteriorates. Accordingly, a frequency table in which the block activity value is clipped can be formed.

Figure 21:
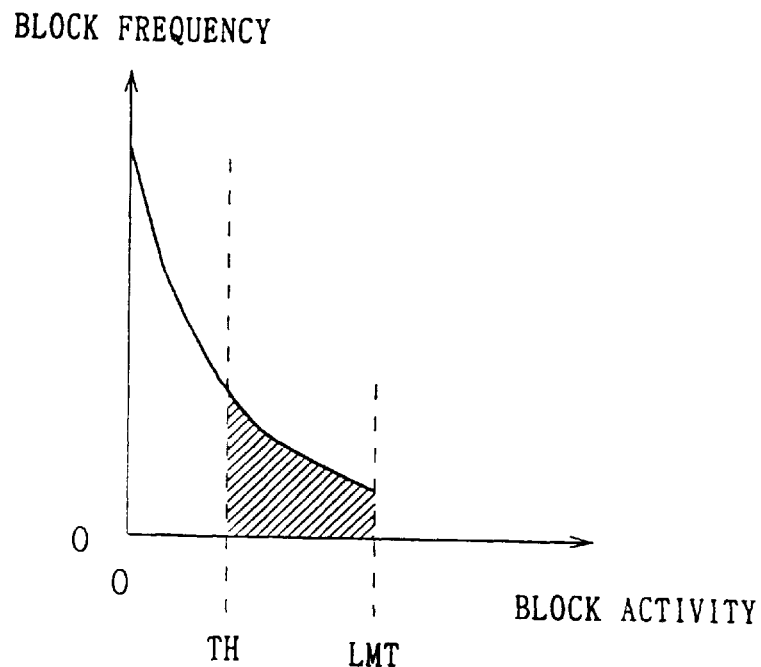
FIG. 21 is a characteristic curvilinear diagram illustrating a frequency table.

That is, all of block frequencies larger than or equal to the above LMT is registered into the LMT in a frequency table as shown in FIG. 21, when the block activity value is clipped by the LMT. As a result, the block frequency in the LMT become large as shown in FIG. 21. Here, sum of block frequencies to be calculated is the hatched portion.

Figure 22:
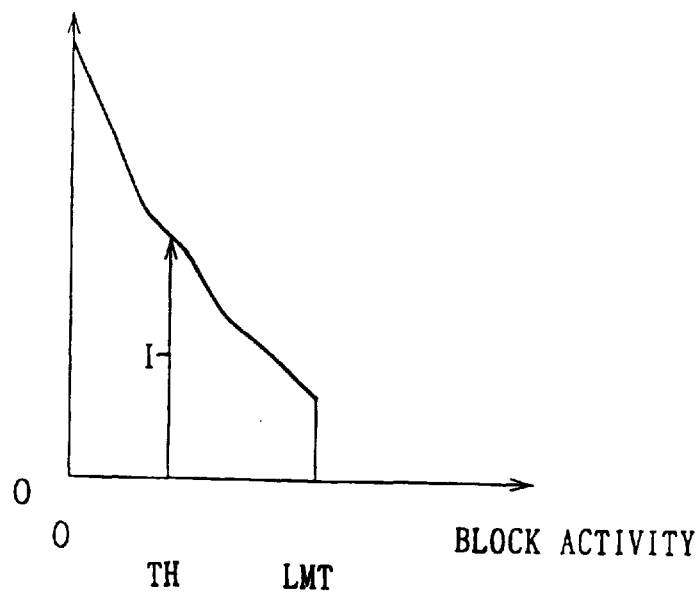
FIG. 22 is a characteristic curvilinear diagram illustrating an integrating frequency table.

FIG. 22 shows an integrating frequency table contrary to this frequency table. In this case, the integrating calculation of Equation (10) described above is not by the maximum value of block activity value and is performed for a period from the block activity value to 0. The sum of block frequencies to be calculated is an integrated block frequency I of coordinates of the threshold value TH. In this manner, the same result as the case shown in FIG. 20 can be obtained.

Thereby, a time for producing an integrating frequency table can be shortened and a table frequency memory can be more miniatulized.

By the way, it is considered that a method for changing the clipped value LMT for each hierarchy as the first method, and a method for setting the clipped value LMT to a fixed value in all of hierarchies as the second method. The first method is used in the case where the distributions of inter-hierarchy difference values of each hierarchy are different from each other clearly. The second method is used in the case where the distributions of inter-hierarchy difference of each hierarchy is almost the same from each other.

Further, in the embodiments described above, such a case is described that the picture data is PCM coded at the coder. However, the present invention is not only limited to this, but the other coding schemes, such as an orthogonal coding scheme, can be applied.

Further, in the embodiments described above, such a case is described that the plural combinations of the threshold value of the frequency table which has been obtained for each hierarchy are previously stored in a ROM, and then the combination of the threshold value by which the generated information quantity becomes nearest to the target value is obtained. However, the present invention is not only limited to this, but is possible to be adapted to set it independently for each hierarchy.

Further, in the embodiments described above, such a case is described that the lowermost hierarchy data is averaged for each 2 lines×2 pixels at a time so that the picture data of the upper hierarchy is obtained, however, the present invention is not only limited to this, but the average value may be obtained by other combinations.

(5) As described above, according to the present invention, when a picture data is sequentially and recursively divided and coded into the plural hierarchy data having a plurality of different resolutions, the block activity value is determined with respect to the predetermined block of the hierarchy data excepting the uppermost hierarchy data having a lowest resolution, and then the threshold value which is the determination standard of the division process to the lower hierarchy data is set from the frequency distribution of the block corresponding to the block activity value. Thereby, the method for hierarchically coding the picture data can be realized without lowering the compression efficiency can be easily realized.

[5] Fourth Embodiment (1) Picture Coding Apparatus of Fourth Embodiment

Figure 23:
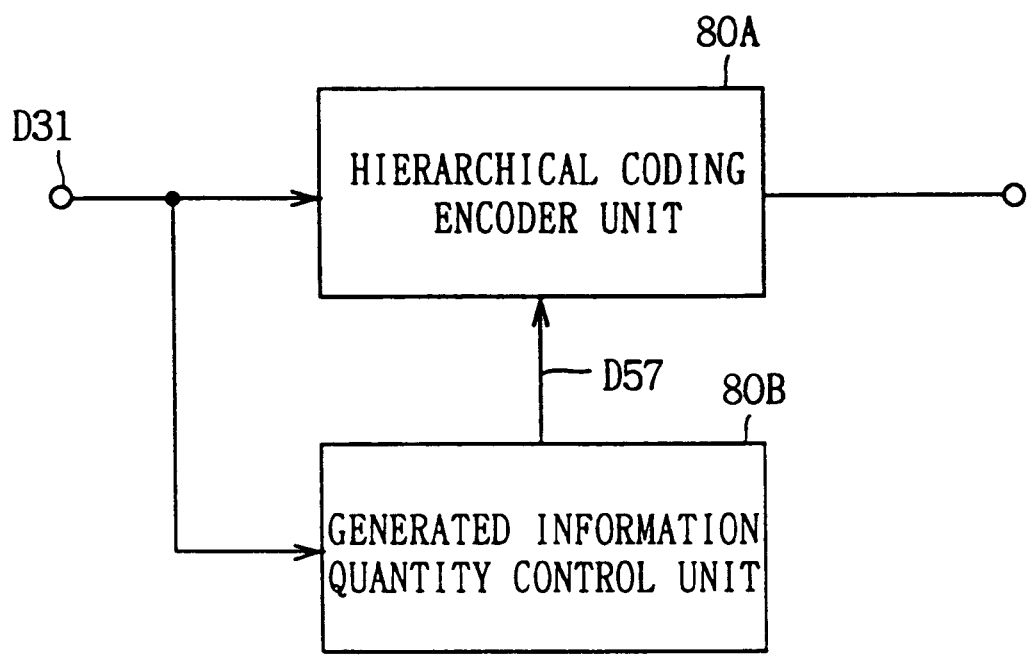
FIG. 23 is a block diagram showing the picture coding apparatus of the fourth embodiment according to the present invention.

A picture coding apparatus 80 of the fourth embodiment has the same schematic construction as a case of the third embodiment (FIG. 11) as shown in FIG. 23, and is composed of a hierarchical coding encoder unit 80A which hierarchically codes an inputted picture data D1 and outputs it, and a generated information quantity control unit 80B which controls the generated information quantity in the hierarchical coding encoder unit 80A so that it attains the target value.

The hierarchical coding encoder unit 80A is composed of a data delaying memory (not shown) and an encoder. The memory is provided in the inputting stage in order that the data can be delayed so that the encoding process will not be performed until an optimal control value is determined in the generated information quantity control unit 80B.

Meanwhile, the generated information quantity control unit 80B is adapted to be inputted an input picture data D31 and then determines a threshold value TH which is accommodated to the data to be processed, and also adapted to transmit the optimal control value, which is determined so that the inputted picture data D31 will be efficiently coded in the hierarchical coding encoder unit 80A, to the encoder. It has a construction of a so-called feed-forward type buffering. By virtue of this construction, the accurate control of the generated information quantity can be performed and a time delay generated by the feed-forward type buffering can be eliminated.

Hereupon, the selection of the division processing in the lower hierarchy is performed, by a block activity value which is defined based on the difference value between hierarchies. From four pixels of 2×2 of the lower hierarchy, the upper hierarchy data is composed and a block is defined.

Here, activity is a correlation value which is represented by a maximum value, a mean value, an absolute value sum, a standard deviation, or an n-th power sum, etc., of inter-hierarchy difference data D41 to D44 in a predetermined block, in the case of defining a lower hierarchy data area corresponding to an upper hierarchy data as "block". That is, when the activity is low, it can say that this block is a plane block.

Denoting an upper hierarchy data by $X0(i+1)$ and a lower hierarchy data by $Xj(i)$, an inter-hierarchy difference coded value $\Delta Xj(i)$ becomes equal to $\Delta Xj(i)=X0(i+1)-Xj(i)$, where j=0 to 3. Meanwhile, denoting a block activity value determining function by $G(\cdot)$, a block activity value ACT is described as $ACT=G(\Delta Xj(i))$.

Further, denoting a hierarchy determination flag by FLG (0:division stop, 1:division continue), when FLG=0, the division of the lower hierarchy is stopped, when ACT≧threshold value TH and FLG=1, the division of the lower hierarchy is performed, and when ACT<threshold value TH and FLG=1, the division of the lower hierarchy is stopped.

After the division determination is terminated in this hierarchy, the division determined result is defined as a determination flag FLG, thereafter, it is transmitted to the next lower hierarchy. As the above, the division in the lower hierarchy is not performed when FLG=0.

(2) Hierarchical Coding Encoder Unit

Figure 24:
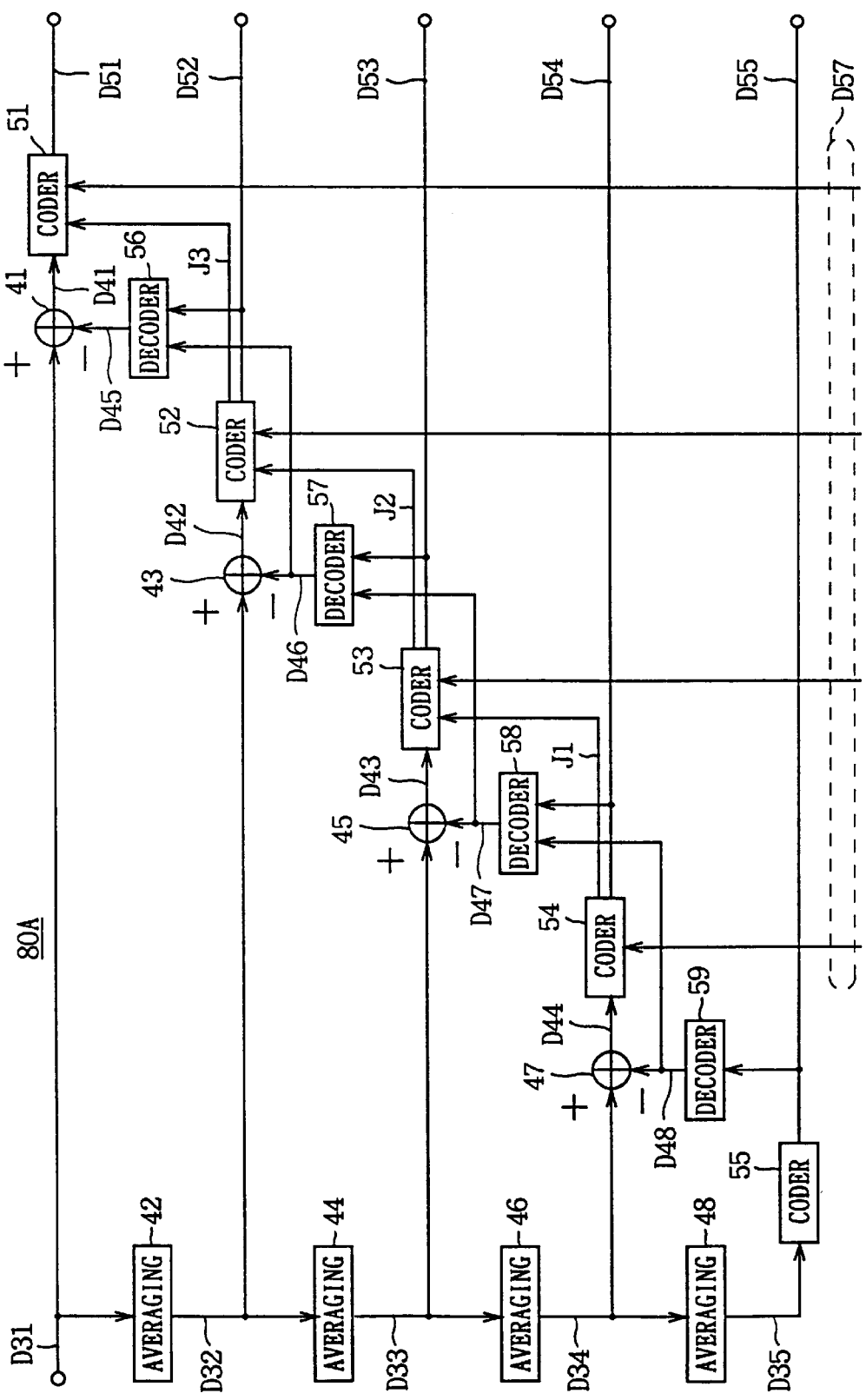
FIG. 24 is a block diagram showing the hierarchical coding encoder unit of FIG. 23.
Figure 25:
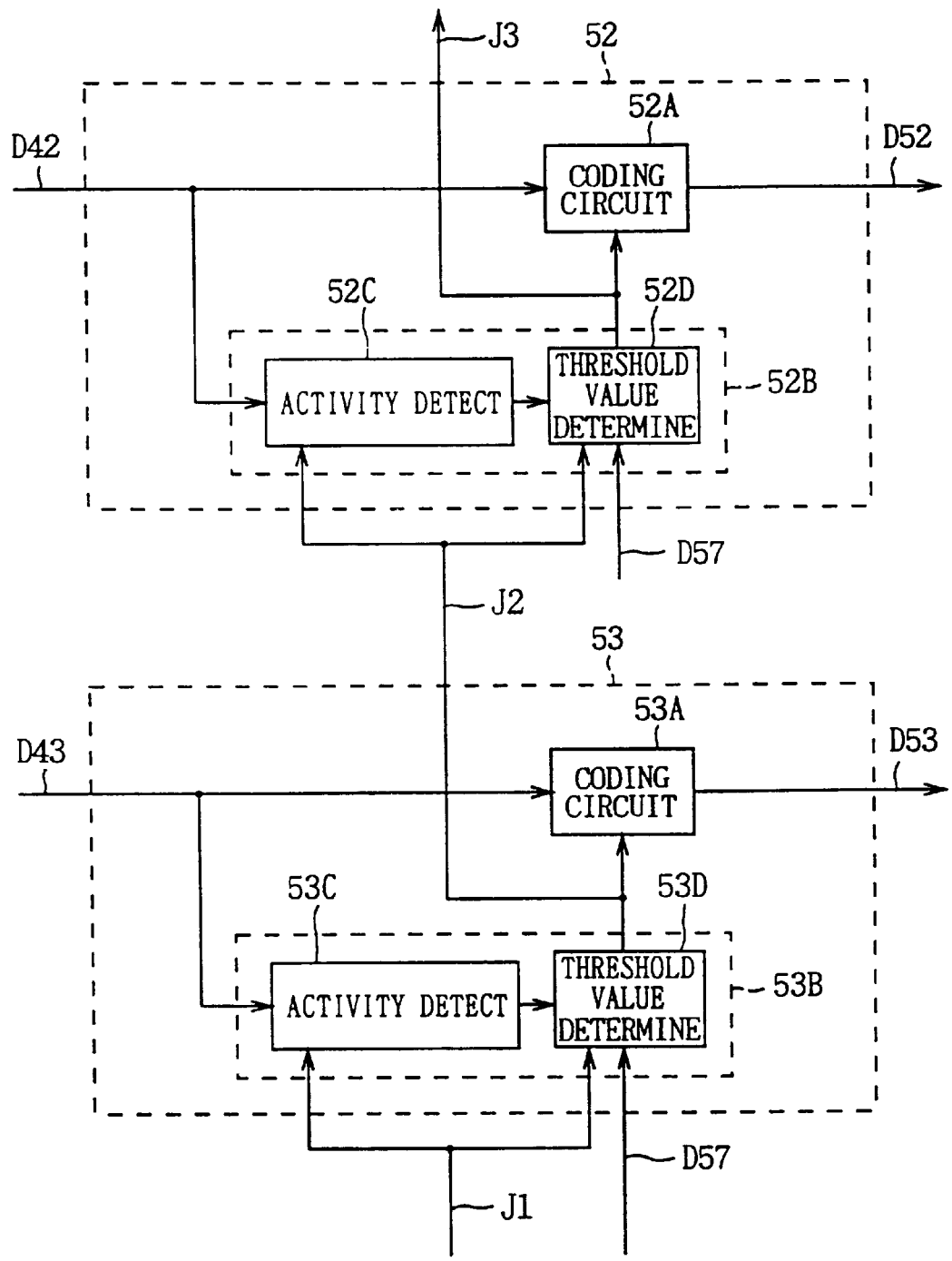
FIG. 25 is a block diagram showing the coder of FIG. 24.

The hierarchical coding encoder unit 80A has the construction shown in FIG. 24, and has the same construction as that is described with respect to FIGS. 12 and 13, excepting a point that coders 51 to 54 are structured as shown in FIG. 25.

The coders 54, 53, 52 in this case output respectively threshold value determined result information J1, J2, J3 which has been used in division or non-division of the block to the coders 53, 52, 51 of the lower hierarchy which is adjacent thereto. Thereby, the hierarchical coding encoder unit 80A stops all of division with respect to the block in which the block division has been stopped once, in the following lower hierarchies.

Practically, the coders 51 to 54 are structured as shown in FIG. 25. FIG. 25 shows the structure of the coders 52 and 53 for simplification.

The coder 53 inputs a difference data D43 to the coding circuit 53A and the activity detecting circuit 53C of the division control unit 53B. The activity detecting circuit 53C detects an activity for each specified block of the difference data D43, and gives thus obtained detected result to the following threshold value determining circuit 53D. The threshold value determining circuit 53D compares the detected result of activity for each block and the threshold value data D57, and outputs thus obtained determined result to the coding circuit 53A and the adjacent coder 52 of the lower hierarchy as the threshold value determined result information J2. The coding circuit 53A compression-codes and transmits with respect to a block having high activity, on the contrary, does not transmit with respect to a block having low activity, according to the threshold value determined result information J2.

Here, the activity detecting circuit 53C and the threshold value determining circuit 53D receive the threshold value determined result information J1 which is outputted from the adjacent coder 54 of the upper hierarchy, so that the activity detection and the threshold value determined result are performed in the case where the threshold value determined result information J1 is that represents to perform division of the block. On the contrary, the activity detection and the threshold value determination are not performed with respect to the corresponding block in the case where the threshold value determined result information J1 is that represents non-division of the block, and the threshold value determined result information J2 which represents non-division of the block is outputted from the threshold value determining circuit 53D. The coder 52 also performs activity detection and threshold value determination with respect to the corresponding block, in the case where the activity detecting circuit 52C and the threshold value determining circuit 52D receive the threshold value determined result information J2 which represents division of the block from the adjacent coder 53 of the upper hierarchy. On the contrary, in the case where the threshold value determined result information J2 which represents non-division of the block, the coder 52 does not perform activity detection and threshold value determination, and outputs the threshold value determined result information J3 which represents non-division of the block from the threshold value determining circuit 52D.

As the above, in the hierarchical coding encoder unit 80A, if non-division determined result has been obtained once, the block division is not performed (i.e., is not coded) with respect to the corresponding block in the following lower hierarchies.

(3) Generated Information Quantity Control Unit

Figure 26:
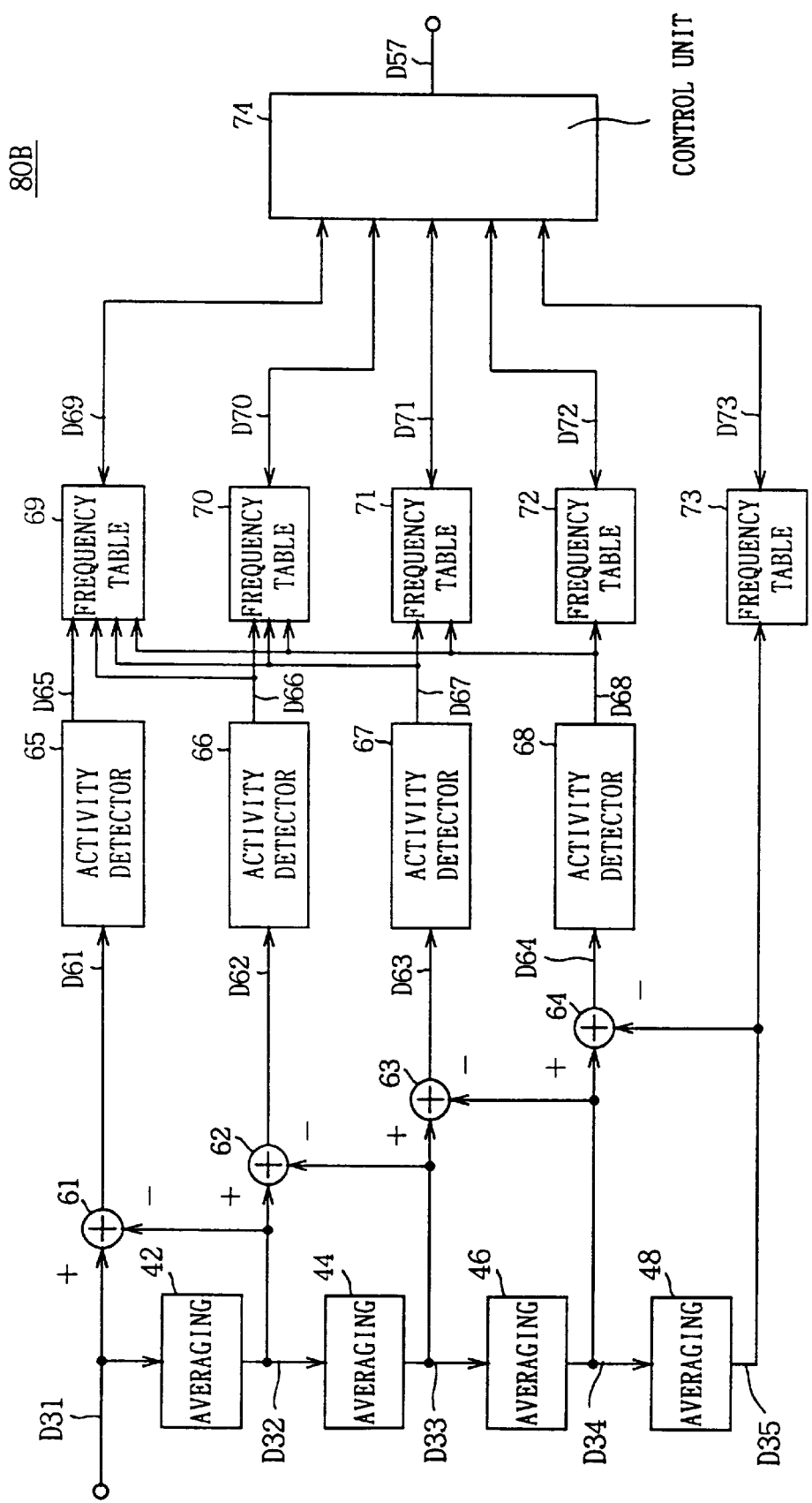
FIG. 26 is a block diagram showing a generated information quantity control unit.
Figure 27A:
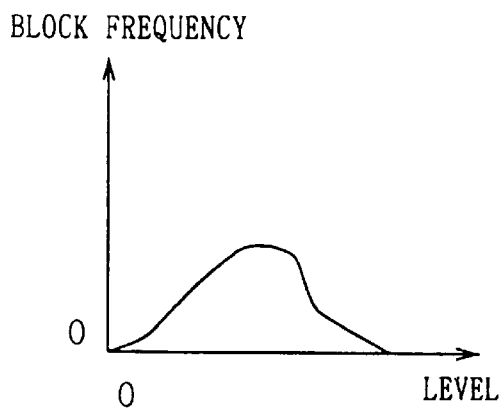
FIGS. 27(A) to 27(E) are characteristic curvilinear diagrams illustrating the frequency table of each hierarchy.
Figure 27B:
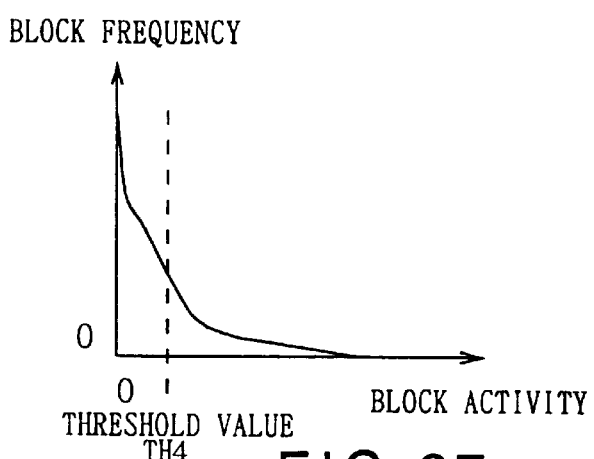
Figure 27C:
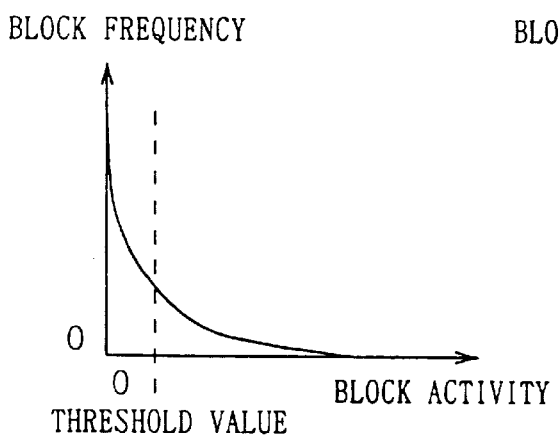
Figure 27D:
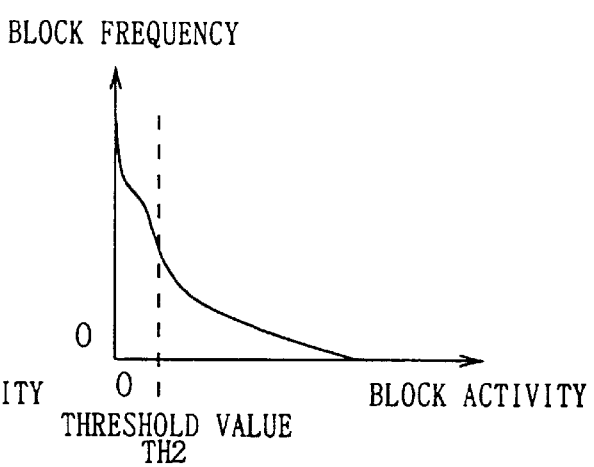
Figure 27E:
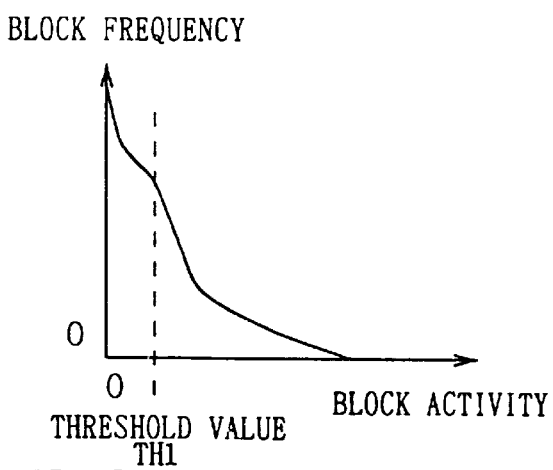

The generated information quantity control unit 80B is structured such as shown in FIG. 26.

The generated information quantity control unit 80B generates picture data of five hierarchies having different resolutions from each other, by ¼-averaging the input picture data D31 sequentially through the mean value circuits 42, 44, 46, and 48.

Next, differences between the hierarchical picture data D32, D33, D34, D35 and the picture data D31, D32, D33, D34 of the respective hierarchies, the former hierarchy being upper than the latter by one hierarchy, are obtained at respective difference circuits 61, 62, 63, 64, to obtain the generated information quantity for each hierarchy of the picture data transmitted as a difference data.

These difference data outputted from respective difference circuits 61, 62, 63, 64 can be defined as a difference data of each hierarchy which is obtained by the hierarchical processing at the hierarchical coding encoder unit 80A.

The activity detecting circuits 65, 66, 67, 68 correspond to the picture data of the first to the fourth hierarchies respectively. The activity detecting circuit 65, 66, 67, 68 obtain the activity of each block with respect to the respective hierarchies and register it to the corresponding frequency tables 69 to 72.

In generating process of the frequency table, three pixels which are objects to be transmitted by the encoder practically, are used out of four pixels of a lower hierarchy corresponding to one pixel of the upper hierarchy, to grasp correctly the quantity of data to be transmitted of the encoder unit.

Since the picture data of the fifth hierarchy is the uppermost hierarchy data, which is transmitted directly not as difference data. Therefore, the dynamic range of each block is registered to the frequency table 73 as it is.

This measure the frequency of data corresponding to the compression processing which is performed in the encoder unit 80A described above. For instance, when compression processing by the PCM coding is performed for the fifth hierarchy data D35, a dynamic range which is given with respect to each block is registered as a data, and when the ADRC (adaptive dynamic range coding (U.S. Pat. No. 4,703,352)) is applied as a compression processing method, "DR" of the ADRC block is registered.

Succeedingly, the difference data D64 is generated from the fourth hierarchy data D34 and the fifth hierarchy data D35. As to the difference data D64, its block activity is detected at the activity detecting circuit 68. The detected block activity D68 is registered to the frequency table 72.

The difference data D63 is generated from the third hierarchy data D33 and the fourth hierarchy data D34. As to the difference data D63, its block activity is detected at the activity detecting circuit 67. The detected block activity D67 is registered to the frequency table 71. At this time, block division determination is performed in the third hierarchy only with respect to the block that is received the determination of block division continue in the threshold value determined result in the fourth hierarchy.

Accordingly, the frequency table 71 shows the number of blocks of which the coordinates is determined by two variables of the block activity value D68 in the fourth hierarchy and the block activity value D67 in the third hierarchy.

Further, the difference data D62 is generated from the second hierarchy data D32 and the third hierarchy data D33, and the block activity value D66 is outputted at the activity detecting circuit 66. The detected block activity value D66 is registered to the frequency table 70. In the second hierarchy, determination of block division is performed only with respect to the block that is received the determination of division continue in the fourth and the third hierarchies.

Accordingly, the frequency table 70 is to be a block frequency table of which the coordinates is determined by three variables of the block activity value D68 in the fourth hierarchy, the block activity D67 in the third hierarchy, and the block activity value D66 in the second hierarchy.

Lastly, the difference data D61 is generated from the first hierarchy data D31 and the second hierarchy data D32, and the block activity value D65 is outputted at the activity detecting circuit 65. The detected block activity value D65 is registered to the frequency table 69. In the first hierarchy, determination of block division is performed only with respect to the block which is received the determination of block division continue in the fourth, the third, and the second hierarchies.

Accordingly, the frequency table 69 is composed of four variables of the block activity value D68 in the fourth hierarchy, the block activity value D67 in the third hierarchy, the block activity value D66 in the second hierarchy, and the block activity value D65 in the first hierarchy.

The control of generated information quantity is performed using thus generated frequency tables 69 to 73. Each frequency table and the control unit 74 of the latter stage are connected each other with bi-directional signal channels D69 to D73.

In the control unit 74, a threshold value with respect to each frequency table is transmitted to each frequency table. In each frequency table, the generated information quantity corresponding to the threshold value is detected. The generated quantity in each frequency table is transmitted via the signal channels D69 to D73 to the control unit 74.

In the control unit 74, the total generated information quantity to be controlled is calculated by integrating the received generated information quantity in each frequency table. This total generated information quantity and the target value are compared, and the threshold value is changed according to the comparison result so that the target value is satisfied.

The threshold value updated again is transmitted from the control unit 74 via the signal channels D69 to D73 to each frequency table. Further, the generated information quantity corresponding to the threshold value is transmitted again to the control unit 74.

The above processing is repeated, and the control result D57 for attaining the target value is determined finally. The detected generated information quantity control value D57 is transmitted to the hierarchical coding encoder unit 80A.

The data to be controlled is waited into a memory M1 which is included in the encoder unit 80A while this generated information quantity control processing. The threshold value applied to the object data can be determined by using the structure of feed-forward type buffering, as a result, the coding can be realized with high efficiency.

Here, it will be described that frequency tables 69 to 73 for information quantity control below.

FIGS. 27(A) to 27(E) show respectively a frequency table of the block activities which has been obtained with respect to the uppermost hierarchy data (the fifth hierarchy data) to the lowermost hierarchy data (the first hierarchy data). As to the frequency table of the fifth hierarchy shown in FIG. 27(A), since the difference data is not an object data, the frequency table by dynamic range is generated. For instance, the dynamic range with respect to the coded block is registered in case of applying the PCM coding.

Meanwhile, in the another frequency tables 69 to 72, the object data is a difference data, and a block having the block activity value larger than or equal to the threshold values TH1, TH2, TH3, TH4 which are given with respect to each frequency table is to be a block to be divided.

Accordingly, the generated information quantity can be calculated by calculating the number of blocks having the block activity larger than or equal to the threshold value in each hierarchy.

Next, an example of calculation of the generated information quantity will be described below. To calculate the generated information quantity, it is needed to count the number of blocks which is larger than or equal to the division determination threshold value in each hierarchy. However, in the control of the generated information quantity in the hierarchical coding by determination flag propagating method which is objected in this embodiment, it is needed to eliminate the block, which received the determination of division stop in the upper hierarchy, from the determination object in the lower hierarchy.

Further, in each hierarchy, a threshold value for the block activity is introduced to perform division determination.

Here, assuming that the sum of pixel numbers in the block to be divided in the first hierarchy as M1, the number of quantization bits of the first hierarchy data as Q1, the number of determination flag bits of the first hierarchy as N1, then the generated information quantity I1 in the first hierarchy is given by the following equation:

$$I1 = 4 \cdot Q1 - M1 \cdot (\tfrac{3}{4}) + N1 \tag{11}$$

In the first term of Equation (11), each number of bits is quadrupled, because in the case of this example, each block is divided into 2 lines×2 pixels. Further, in the first term, it is multiplied by ¾, because the characteristic is reflected that in a structure that an upper hierarchy value is generated based on the mean value of lower hierarchy values, the fourth non-transmission pixel value of lower hierarchy can be restored by means of an arithmetic equation using the upper hierarchy value and three pixels of the lower hierarchy value.

By the way, in the second term, N1 is added to the number of blocks in the first hierarchy, it means that the respective blocks are transmitted with adding one bit as a division determination flag.

Similarly, as to the second, the third, the fourth hierarchy, assuming that the sum of pixel numbers in the block to be divided in each hierarchy as M2, M3, M4, the number of quantization bits in each hierarchy as Q2, Q3, Q4, the number of determination flag bits in each hierarchy as N2, N3, N4, then the generated information quantity Ik (k=2, 3, 4) in each hierarchy is given by the following equation:

$$I = I1 + I2 + I3 + I4 + I5 \quad (12)$$

Using the generated information quantities I1 to I4 of the first to the fourth hierarchy and the generated information quantity I5 of the fifth hierarchy, the total generated information quantity I which is generated by the coding processing of the hierarchical coding encoder unit 80A can be obtained as a sum of generated information quantities for each hierarchy as the following equation:

$$Ik = 4 \cdot Qk \cdot Mk \cdot (\tfrac{3}{4}) + Nk \quad (13)$$

Here, the number of bits of the determination flag is added to the generated information quantity of each hierarchy. However, the information quantity of this flag is equal to the number of blocks which has been performed the division processing in the upper hierarchy. That is, it means that the block in which the division processing has been stopped in the upper hierarchy is eliminated from the division determination object in the lower hierarchy. The spatial position of each block can be specified in each hierarchy by a history of the determination flag from the upper hierarchy.

Now, the individual frequency tables will be explained.

As stated above, since the frequency table of the upper hierarchy data depends on the compression scheme, it is not determined uniquely. However, the generated information quantity can be controlled using means such as a frequency table.

Figure 28A:
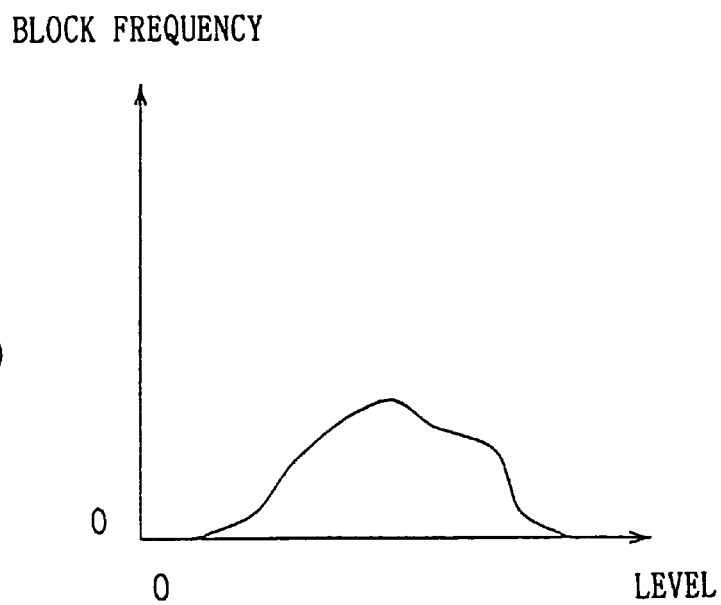
Figure 28B:
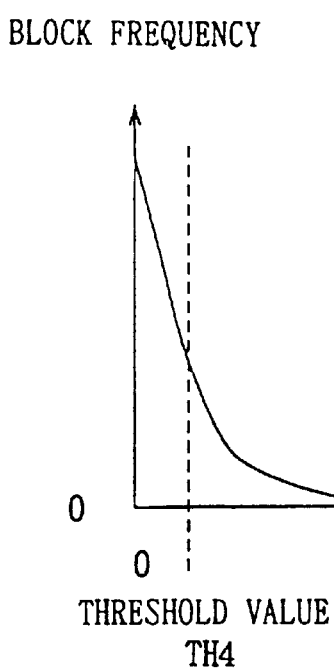

Next, as to the fourth hierarchy data, the block frequency toward the block activity value ACT4 is registered. By applying the fourth hierarchy frequency table of FIG. 28(B) to the fifth hierarchy frequency table of FIG. 28(A), the generated information quantity which is related to the threshold value TH4 can be easily calculated.

Since the blocks which are larger than or equal to the threshold value TH4 are the object of division, the generated information quantity on the fourth hierarchy is calculated by computing the sum of the number of blocks which are not less than the threshold value.

Figure 29:
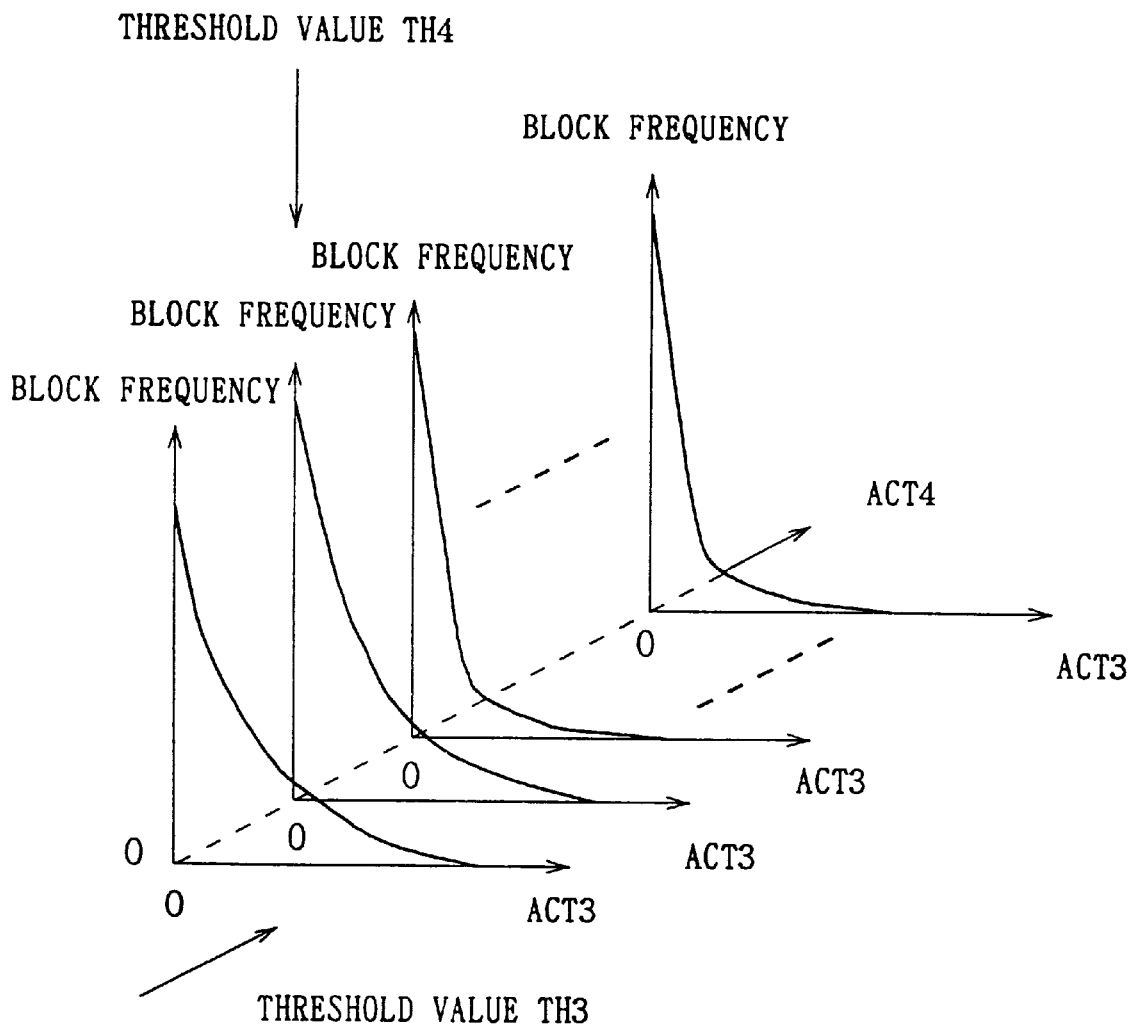

Next, an example of the frequency table of the third hierarchy is shown in FIG. 29. In the determination flag propagating scheme, the blocks which have been received the determination of division stopping at the upper hierarchy are eliminated from the determination object.

Then, such a frequency table is introduced that is defined by two variables of the third hierarchy block activity value ACT3 and the fourth hierarchy block activity value ACT4.

In other words, such a block frequency is obtained that is larger than or equal to the threshold value TH4 of the fourth hierarchy and larger than or equal to the threshold value TH3 of the third hierarchy.

As to this operation, by calculating the block frequency which is larger than or equal to the threshold value TH4 at the ACT4 axis and larger than or equal to the threshold value TH3 at the ACT3 axis on the frequency table of FIG. 29, the generated information quantity in the third hierarchy which satisfies the above conditions can be calculated.

Next, the examples of the frequency tables for the second hierarchy and the first hierarchy are shown in FIG. 30.

In accordance with the same idea as that of the frequency table of the third hierarchy, a frequency table which is defined by several variables is produced.

In the second hierarchy, the blocks which are defined by the respective block activities ACT2, ACT3, and ACT4 of the second hierarchy, the third hierarchy, and the fourth hierarchy are registered to the frequency table. This situation is shown in FIG. 30(A).

In the second hierarchy, by calculating the block frequency which is larger than or equal to the threshold value TH4 at the ACT4 axis, larger than or equal to the threshold value TH3 at the ACT3 axis, and larger than or equal to the threshold value TH2 at the ACT2 axis, the generated information quantity in the second hierarchy is calculated.

In the first hierarchy, the blocks which are defined by the respective block activities ACT1, ACT2, ACT3, and ACT4 of the first hierarchy, the second hierarchy, the third hierarchy, and the fourth hierarchy are registered to the frequency table. This situation is shown in FIG. 30(B).

In the case of the first hierarchy, by calculating the block frequency which is larger than or equal to the threshold value TH4 at the ACT4 axis, larger than or equal to the threshold value TH3 at the ACT3 axis, and larger than or equal to the threshold value TH2 at the ACT2 axis, the generated information quantity in the first hierarchy is calculated.

The generated information quantity toward the threshold value can be calculated utilizing the abovementioned five kinds of frequency tables, and can be controlled so as to coincide with the target information quantity.

As to the threshold value of each hierarchy which is utilized to control the generated information quantity, there are methods for changing it independently for each hierarchy.

For instance, there is such a scheme that the target information quantity is previously set for each hierarchy and then the threshold value is independently changed for each hierarchy, so that it is controlled so as to coincide with the target information quantity.

Also, as another scheme, such a scheme that the combinations of the threshold values for each hierarchy are previously prepared, and then these threshold value sets are applied in accordance with a control sequence can be also considered, and thereby the control is simplified.

In the abovementioned scheme for controlling the generated information quantity which utilizes the frequency table of each hierarchy, in each hierarchy, the block frequency whose block activity value at each hierarchy is larger than or equal to the threshold value, is calculated considering the division determined result of the upper hierarchy, so that the optimal control value is detected.

In order to shorten the time for calculating the block frequency which is larger than or equal to the threshold value, the frequency table in which the block frequency is registered may be reconstructed into an integration type frequency table.

Figure 31:
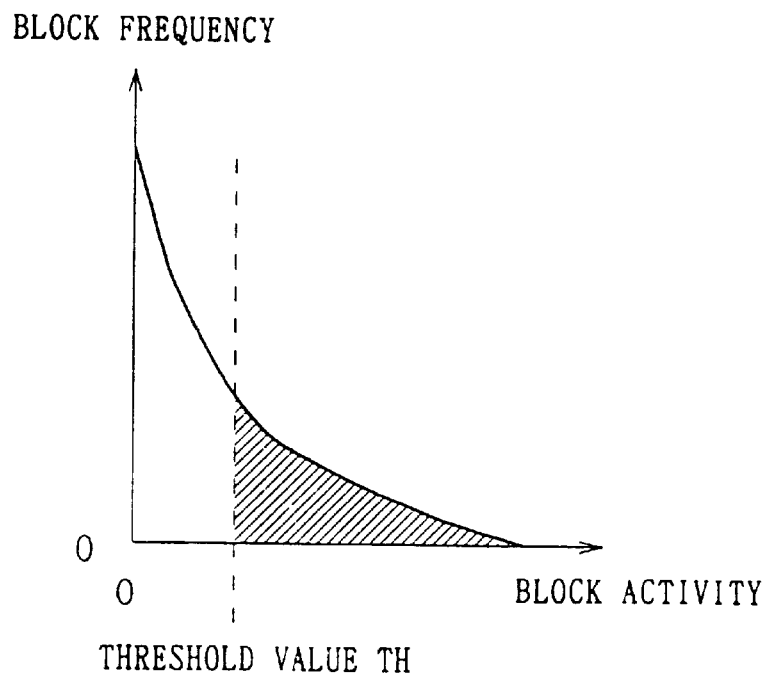
Figure 32:
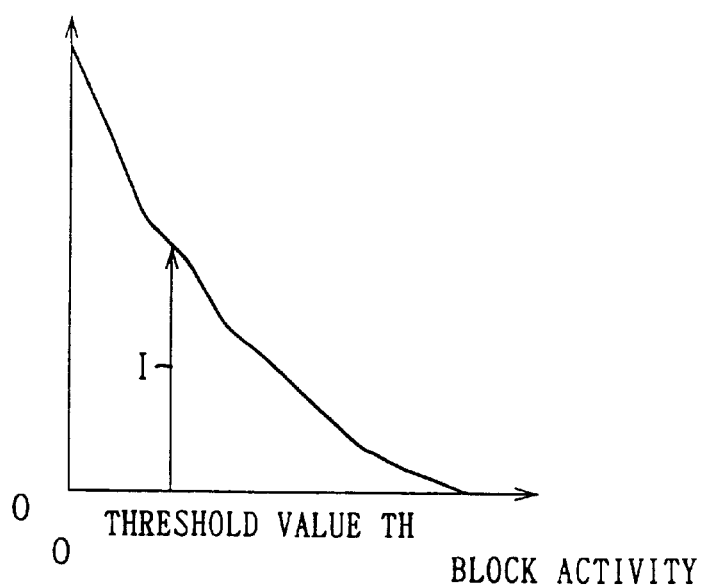
FIG. 32 is a characteristic curvilinear diagram illustrating an integrating frequency table.

An example of this integrating frequency table is shown in FIG. 32. It is supposed that a block activity value has been registered with the result that an example of a frequency table which is shown in FIG. 31 has been obtained. In this case, to simplify the explanation, an example of which the block activity value is one variable is shown. In the abovementioned frequency table, it is the same one as that of the fourth hierarchy.

The integrating frequency table has such a structure that the integrating calculation is performed, starting from the block frequency which corresponds to the maximum value of the block activity value of the frequency table of FIG. 31, and toward the block frequency which corresponds to the smaller block activity value, so that the respective results of the integration are re-registered in the frequency table.

This process is represented as the following equation:

$$SUM(act) = \sum_{ACT=act}^{n} N(ACT) \quad (14)$$

Here, "SUM(.)" represents a integrated block frequency, "N(.)" represents a block frequency in a frequency table, "act" denotes a block activity variable in the integrating frequency table, "ACT" denotes a block activity variable in the frequency table, and "n" denotes the maximum value of a variable in the frequency table.

What is meant by Equation (14) is such a process that a block frequency of a block activity value address is read and added to the integrated value which has been obtained up to the upper block activity value, and then the result is written into the present block activity value address.

As a result, the integration type frequency table which is shown in FIG. 32 is obtained. In this integrating frequency table, the sum of the block frequency of the hatched portion of FIG. 31 corresponds to the threshold value TH coordinate data I.

By virtue of this integrating frequency table, it becomes unnecessary to calculate the sum of the block frequency of the hatched portion of FIG. 31 each time the threshold value TH is changed. That is to say, by outputting the integrated block frequency which corresponds to the threshold value of the integrating frequency table, the calculation of the sum of the block frequency is realized.

Also, the third hierarchy frequency table of FIG. 29 shows the case of two variables. By expanding Equation (14), an integrating frequency table is produced and the following equation:

$$SUM(act3, act4) = \sum_{ACT3=act3}^{n} \cdot \sum_{ACT4=act4}^{n} N(ACT3, ACT4) \quad (15)$$

is obtained. Here, "SUM(.)" represents an integrated block frequency, "N(.)" represents a block frequency in a frequency table, "act3" denotes the third hierarchy corresponding variable in an integrating frequency table, "act4" denotes the fourth hierarchy corresponding variable in the integrating frequency table, "ACT3" denotes the third hierarchy variable in the frequency table, "ACT4" denotes the fourth hierarchy variable in the frequency table, and "n" denotes the maximum value of the variable in the frequency table.

In an integrating frequency table which is produced in accordance with Equation (15), an integrated block frequency which corresponds to the address of the determination threshold value TH3 of the third hierarchy and the determination threshold value TH4 of the fourth hierarchy indicates the sum of the block frequency which is larger than or equal to the threshold value TH3 and also larger than or equal to the determination threshold value TH4. In this way the generated information quantity at the third hierarchy can be calculated.

With respect to the frequency tables of the second hierarchy and the first hierarchy shown in FIG. 30, the time for calculating the block frequency sum can also be shortened by utilizing an integrating frequency table.

In these cases the number of block activities increases, therefore the number of integration increases.

First, the operational expression in the case of the second hierarchy is represented by the following equation:

$$SUM(act2, act3, act4) = \sum_{ACT2=act2}^{n} \cdot \sum_{ACT3=act3}^{n} \cdot \sum_{ACT4=act4}^{n} N(ACT2, ACT3, ACT4) \quad (16)$$

Here, "SUM(.)" represents a integrated block frequency, "N(.)" represents a block frequency in a frequency table, "act2" denotes the second hierarchy corresponding variable in an integrating frequency table, "act3" denotes the third hierarchy corresponding variable in the integrating frequency table, "act4" denotes the fourth hierarchy corresponding variable in the integrating frequency table, "ACT2" denotes the second hierarchy variable in the frequency table, "ACT3" denotes the third hierarchy variable in the frequency table, and "ACT4" denotes the fourth hierarchy variable in the frequency table.

In the integrating frequency table which is produced in accordance with Equation (16), the integrated block frequency which corresponds to the address of the determination threshold value TH2 of the second hierarchy and the determination threshold value TH3 of the third hierarchy and the determination threshold value TH4 of the fourth hierarchy indicates the sum of the block frequency which is larger than or equal to the threshold value TH2 and also larger than or equal to the threshold value TH3 and also larger than or equal to the determination threshold value TH4.

In this manner, the generated information quantity in the second hierarchy can be calculated.

Lastly, a process which is related to the frequency table of the first hierarchy shown in FIG. 30(B) will be described.

In this case, there are four kinds of block activity value variables, therefore the number of integrating calculations becomes the most. The operational expression in the case of the first hierarchy is represented by the following equation:.

$$SUM(act1, act2, act3, act4) = \sum_{ACT1=act1}^{n} \cdot \sum_{ACT2=act2}^{n} \cdot \sum_{ACT3=act3}^{n} \cdot \sum_{ACT4=act4}^{n} N(ACT1, ACT2, ACT3, ACT4) \quad (17)$$

Here, "SUM(.)" represents an integrated block frequency, "N(.)" represents a block frequency in a frequency table, "act1" denotes the first hierarchy corresponding variable in an integrating frequency table, "act2" denotes the second hierarchy corresponding variable in the integrating frequency table, "act3" denotes the third hierarchy corresponding variable in the integrating frequency table, "act4" denotes the fourth hierarchy corresponding variable in the integrating frequency table, "ACT1" denotes the first hierarchy variable in the frequency table, "ACT2" denotes the second hierarchy variable in the frequency table, "ACT3" denotes the third hierarchy variable in the frequency table, and "ACT4" denotes the fourth hierarchy variable in the frequency table.

In the integrating frequency table which is produced in accordance with Equation (17), the integrated block frequency, which corresponds to the address of the determination threshold value TH1 of the first hierarchy and the determination threshold value TH2 of the second hierarchy and the determination threshold value TH3 of the third hierarchy and the determination threshold value TH4 of the fourth hierarchy, indicates the sum of the block frequency which is larger than or equal to the threshold value TH1, larger than or equal to the threshold value TH2 and, larger than or equal to the threshold value TH3, and also larger than or equal to the threshold value TH4. In this manner, the generated information quantity at the first hierarchy can also be calculated.

As a result of this process, the calculation of the generated information quantity based on the number of the dividing object blocks in each hierarchy based on Equation (12) is realized.

By the introduction of the above described integrating frequency table, the time for controlling the generated information quantity can be shortened significantly. Such a method will be described below that the time for controlling the generated information quantity is further shortened on this integrating frequency table.

The integrating frequency table which is used in this proposal is utilized to calculate the information quantity which is generated toward the division determination threshold value. In the actual threshold value processing, a large determination threshold value can not be practically used, from the viewpoint of the degradation of the picture quality. Hence, it is proposed herein to make frequency tables whose block activity value is clipped. Such a situation is shown in FIGS. 33 and 34.

Figure 33:
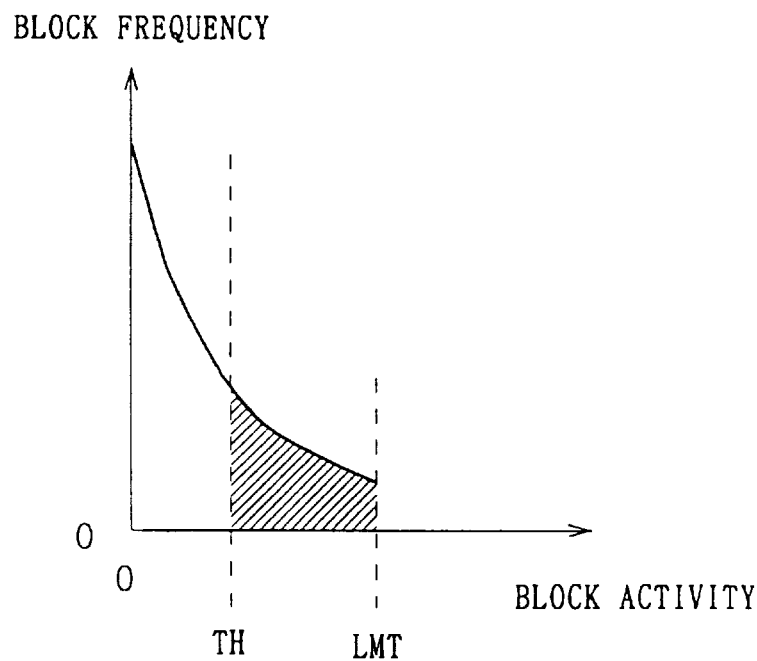
FIG. 33 is a characteristic curvilinear diagram illustrating the frequency table which uses a clipped value.
Figure 34:
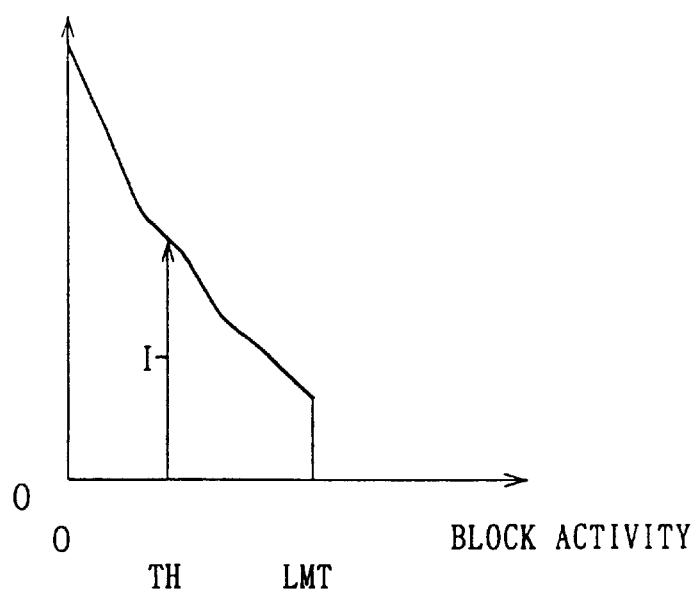
FIG. 34 is a characteristic curvilinear diagram illustrating the integrating frequency table which uses the clipped value.

As shown in FIG. 33, on the condition that the block activity value is clipped at LMT, the block frequency which are larger than or equal to LMT are all registered as LMT to the frequency table. As a result, the block frequency at LMT become large, as indicated in the figure. The block frequency sum to be calculated is the hatched portion.

The integrating frequency table toward this frequency table is shown in FIG. 33. The integrating calculations which are shown in Equations (14) to (17) are performed with respect to the interval, which extends from the block activity value LMT instead of the maximum value "n" of the block activity value, to "0".

The block frequency sum to be calculated is the integrated block frequency I of the coordinate of the threshold value TH. As shown in this example, the same result as that of FIG. 32 is obtained. By the introduction of clipping into the block activity value of the frequency table, a shortening of the integrating frequency table generating time and a miniaturization of the frequency table memory space can be realized.

As the frames to which this scheme is applied, two frames can be considered. One of these is the case where clipping value LMT is changed for each hierarchy, and the other is the case where clipping value LMT is fixed for all hierarchies.

The former is utilized when there are clear differences in the distribution of the inter-hierarchy difference values of each hierarchy, and the latter is utilized when there are little differences in the distribution of the inter-hierarchy difference values of each hierarchy.

Figure 35:
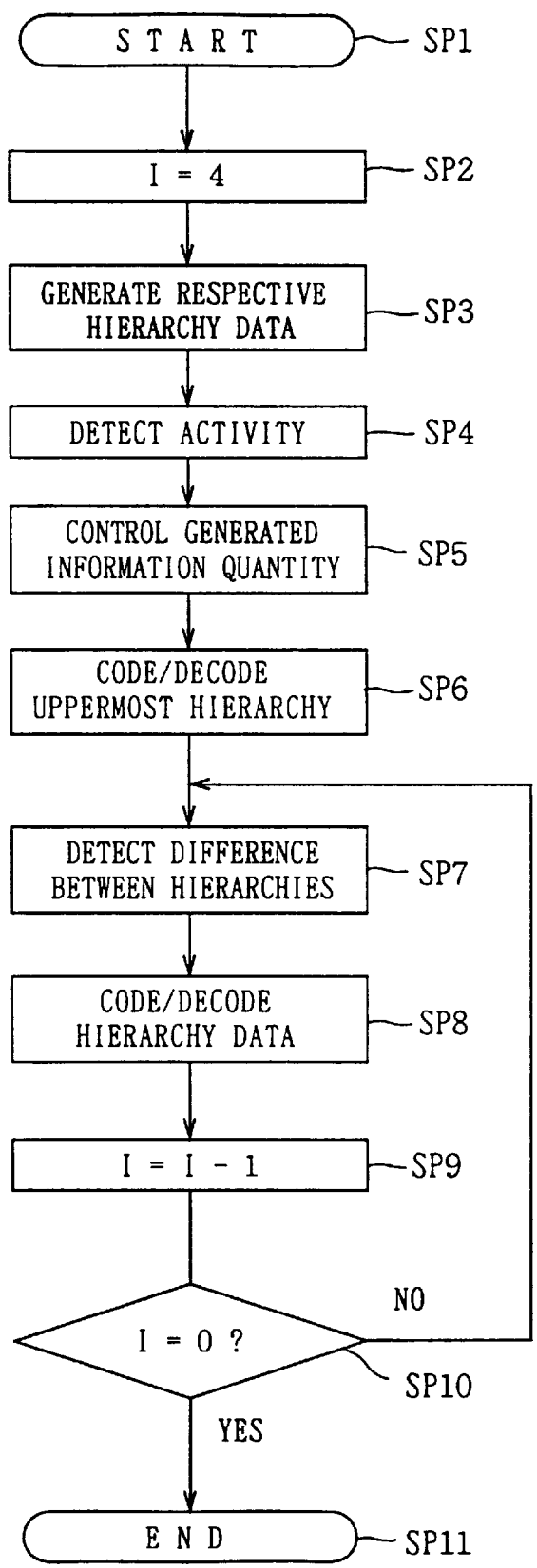
FIG. 35 is a flowchart showing a processing procedure of the hierarchical coding.

Note that, FIG. 35 shows a flowchart of the hierarchical coding process. In the step SP2, "4" is registered in the hierarchy counter I for storing the hierarchy number, so that the frame of this hierarchization is determined.

Further, at step SP3, the hierarchical data is produced by the generated information quantity calculation, and at step SP4, each block activity value is detected. With respect to this activity value, at step SP5, the multi-dimensional frequency table which is abovementioned in relation to FIG. 29 is generated and registered, hereby the generated information quantity controlling is performed and the optimal control value is determined.

Further, at step SP6, the hierarchical coding is performed at the encoder side based on this control value. At first, the coding and the coding are performed with respect to the data of the fifth hierarchy which is the uppermost hierarchy. The result of this process becomes to the initial value of the process at the lower hierarchy, and the inter-hierarchy difference value between this result and the lower hierarchy is produced at step SP7. Further, at step SP8, based on the generated information quantity control value which is determined at the upper stage, the division selecting and the coding at the lower hierarchy are performed.

After the processing of each hierarchy, the hierarchy counter I is decremented at step SP9. And then, at step SP10, a termination determination is performed with respect to the content of the hierarchy counter I. In the case where it is not to be terminated, the process of the lower hierarchy is further continued. In the case where the processes of all hierarchies have been terminated, the operation goes out the loop and then terminates at step SP11.

By virtue of the generated information quantity controlling stated above, the hierarchical coding which has little degradation of picture quality and high efficiency of compression can be performed.

(4) Other Embodiments of Fourth Embodiment (4-1) In the abovementioned embodiment, such a case is described that the block activity valuelue P is determined based on the maximum value of the difference value between the lower hierarchy data and the decoded data obtained for each block with respect to the upper hierarchy data. However, the present invention is not to be limited to such an aspect, but the determination cancan be performed based on an average error, an absolute value sum, a standard deviation, an n-th power sum, or a frequency of data which is larger than or equal to a threshold value in a block. (4-2) In the abovementioned embodiment, such a case is described that the picture data is PCM coded at the coder. However, the present invention is not to be limited to such an aspect but other coding schemes, such as a quadrature coding scheme, can be applied.

(4-3) In the abovementioned embodiment, such a case is described that the plural combinations of the threshold value of the frequency table which has been obtained for each hierarchy are previously stored in a ROM, and then the combination of the threshold value by which the generated information quantity becomes nearest to the target value is obtained. However, the present invention is not to be limited to such an aspect but is possible to be adapted to set it independently for each hierarchy.

(4-4) In the abovementioned embodiment, such a case is described that the lowermost hierarchy data is averaged for each 2 lines×2 pixels at a time so that the picture data of the upper hierarchy is obtained, however, the present invention is not to be limited to such an aspect but the average value can be obtained by other combinations.

(5) As stated above, according to the present invention, when the picture data is sequentially recursively divided and coded into the data of the plural hierarchies composed of different plural resolutions, the block activity value is determined with respect to the predetermined block of the hierarchy data, and then the threshold value which is the determination standard of the division process to the lower hierarchy data is set from the frequency distribution of the block corresponding to the block activity value. Hereby the method for hierarchically coding the picture data without lowering the efficiency of compression can be easily realized.

[6] Fifth Embodiment (1) Picture Coding Apparatus of Fifth Embodiment

Figure 36:
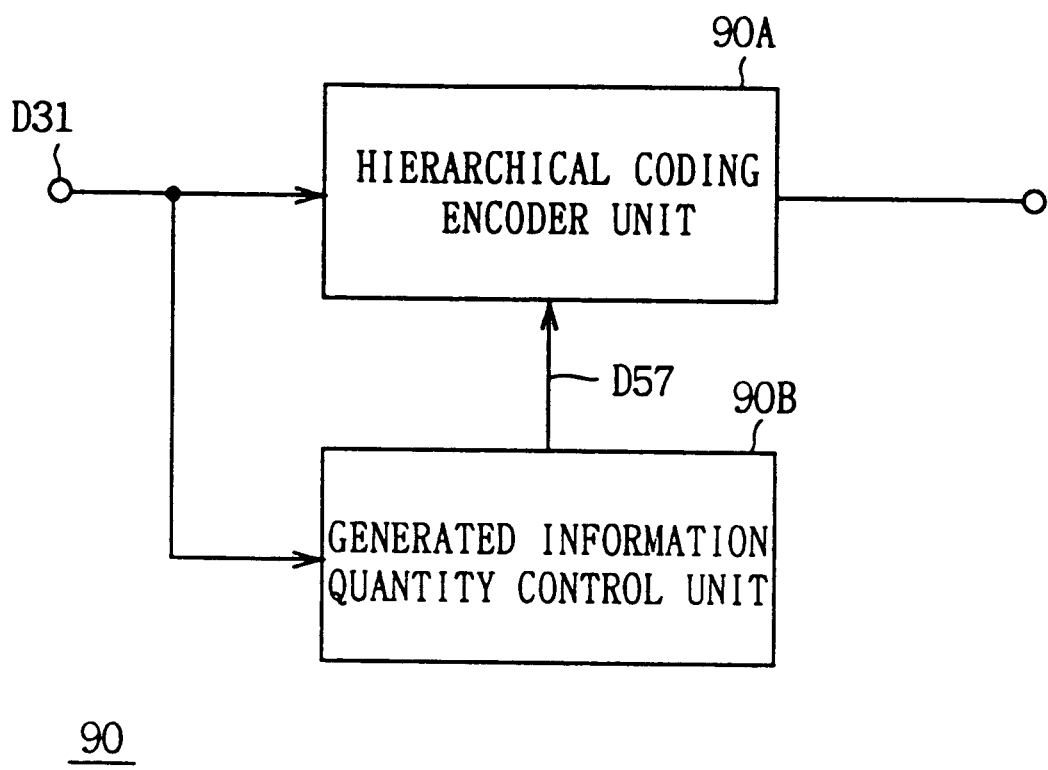
FIG. 36 is a block diagram showing the picture coding apparatus of the fifth embodiment according to the present invention.

A picture coding apparatus 90 of the fifth embodiment has the same schematic construction as a case of the third embodiment (FIG. 11) as shown in FIG. 36, and is composed of a hierarchical coding encoder unit 90A which hierarchically codes an inputted picture data D31 and outputs it, and a generated information quantity control unit 90B which controls the generated information quantity in the hierarchical coding encoder unit 90A so that it attains the target value.

The hierarchical coding encoder unit 90A is composed of a data delaying memory (not shown) and an encoder. The memory is provided in the inputting stage in order that the data can be delayed so that the encoding process will not be performed until an optimal control value is determined in the generated information quantity control unit 90B.

Meanwhile, the generated information quantity control unit 90B is adapted to be inputted an input picture data D31 and then determines a threshold value TH which is accommodated to the data to be processed, and also adapted to transmit the optimal control value, which is determined so that the inputted picture data D31 will be efficiently coded in the hierarchical coding encoder unit 90A, to the encoder. It has a construction of a so-called feed-forward type buffering. By virtue of this construction, the accurate control of the generated information quantity can be performed and a time delay generated by the feed-forward type buffering can be eliminated.

Hereupon, the selection of the division processing in the lower, hierarchy is performed, by a block activity value which is defined based on the inter-hierarchy difference value. The upper hierarchy data is composed of four pixels of 2×2 of the lower hierarchy, and a block is defined.

Denoting an upper hierarchy data by XO(i+1) and a lower hierarchy data by Xj(i), an inter-hierarchy difference coded value $\Delta Xj(i)$ becomes equal to $\Delta Xj(i)=XO(i+1)-Xj(i)$, where j=0 to 3. Meanwhile, denoting a block activity value determining function by G(.), a block activity value ACT is described as $ACT=G(\Delta Xj(i))$.

Further, denoting the case where the hierarchy determination flag FLG is 0 by division stop, denoting the case where the hierarchy determination flag FLG is 1 by division continue, method for confirming the division determination flag will be described. First, in the generated information quantity control process, the activity ACT of all of the hierarchies is generated for each block, succeedingly, the determination flag FLG is generated by the threshold value which corresponds to the activity ACT of the all of the hierarchies. Further, a hierarchy in which the determination flag FLG is firstly to be 1 is searched in the sequence from the lowermost hierarchy for each block.

The hierarchical determination flag FLG of all of the upper hierarchy blocks than the hierarchy in which the determination flag FLG is firstly to be 1, is set as "1". According to this manner, the determination flag FLG is updated. Further, the determination threshold value is changed based on the control of generated information quantity, and an optimal threshold value which satisfies the target value is selected. In this connection, in the case of this embodiment, the determination flag used here is different from a determination flag which is used in the coding process.

The block division selecting processing (i.e. the practical coding process) will be described below. When the determination flag FLG is defined as FLG=0, the lower hierarchy is stopped the division, on the contrary, when the determination flag FLG is defined as FLG=1, the division of the lower hierarchy is performed. The above processing is composed of two steps that the hierarchical determination flag FLG is determined previously for each block of each hierarchy by controlling the generated information quantity, and the practical block division processing is performed based on the result.

(2) Hierarchical Coding Encoder Unit

Figure 37:
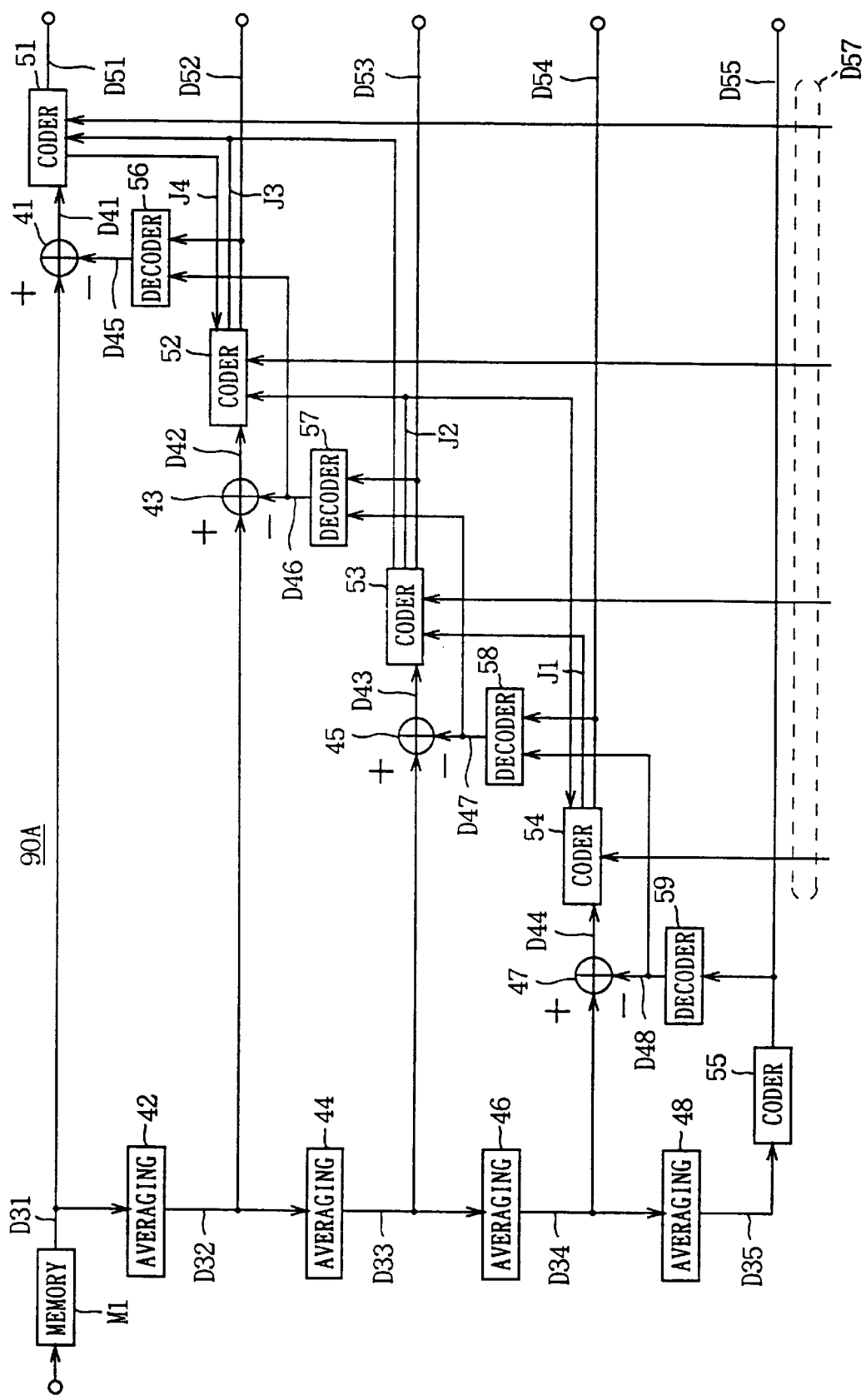
FIG. 37 is a block diagram showing the hierarchical coding encoder unit of FIG. 36.
Figure 38:
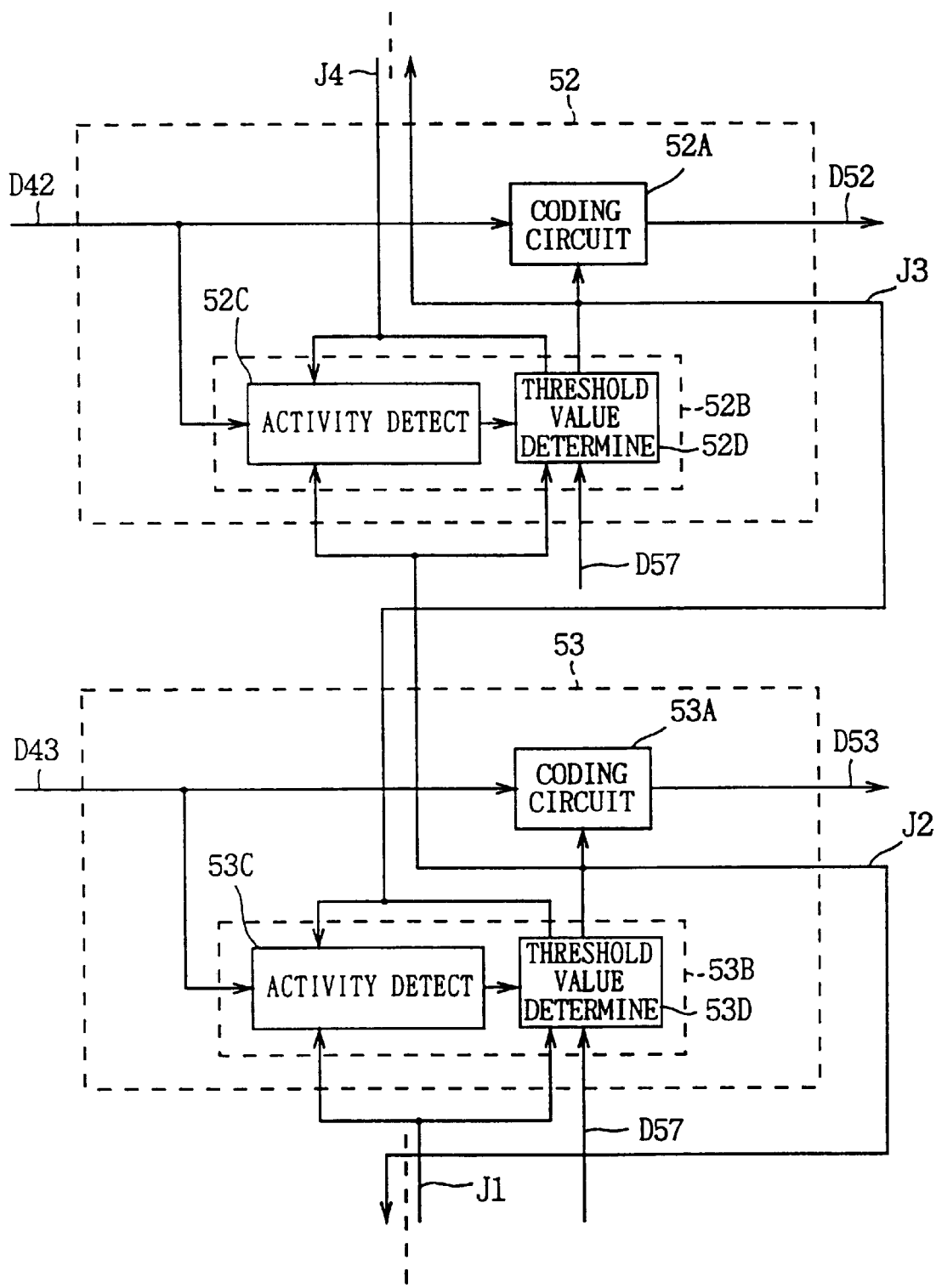
FIG. 38 is a block diagram showing the coder of FIG. 37.

The hierarchical coding encoder unit 90A has the construction shown in FIG. 37, and has the same construction as that is described with respect to FIGS. 12 and 13, excepting a point that coders 51 to 55 are structured as shown in FIG. 38.

The coders 54, 53, 52 in this case output respectively threshold value determined result information J1, J2, J3 which has been used to represent division or non-division of the block to the coders 53, 52, 51 of the lower hierarchy which are adjacent thereto. The coders 51, 52, 53 output respectively the threshold value determined result information J4, J3, J2 to the coders 52, 53, 54 which are adjacent thereto.

That is, in the hierarchical coding encoder unit 90A, as to the hierarchy data, with respect to the block in which the division processing is stopped by the determination of the threshold value of the upper hierarchy, the processing returns to the hierarchy where the division processing is stopped when an useful activity is detected in the following lower hierarchy, and resets the determination flag and performs the determination of threshold value toward the lower hierarchy again.

This is because the necessity of re-determination is recognized since the number of lower hierarchy data which corresponds to an upper hierarchy block increases on the hierarchical structure.

The coders 52 and 53 are structured as shown in FIG. 38 in practical.

The coder 53 inputs the difference data D43 to the coding circuit 53A and the activity detecting circuit 53C of the division control unit 53B. The activity detecting circuit 53C detects an activity of each specified block of the difference data D43, and gives thus obtained detected result to the following threshold value determining circuit 53D. The threshold value determining circuit 53D compares the detected result of the activity of each block with the threshold value data D57, and outputs thus obtained determined result as the threshold value determined result information J2 to the coding circuit 53A and the coder 52 of the lower hierarchy which is adjacent to that. The coding circuit 53A compression-codes and transmits as to the block having high activity based on the threshold value determined result information J2, on the contrary, does not transmit as to the block having low activity.

Here, the activity detecting circuit 53C and the threshold value determining circuit 53D receive the threshold value determined result information J1 which is outputted from the adjacent coder 54 of the upper hierarchy, so that the activity detection and the threshold value determined result are performed in the case where the threshold value determined result information J1 is that represents to perform division of the block. On the contrary, the activity detection and the threshold value determination are not performed with respect to the corresponding block in the case where the threshold value determined result information J1 is that represents non-division of the block, and the threshold value determined result information J2 which represents non-division of the block is outputted from the threshold value determining circuit 53D.

The coder 52 also performs the activity detection and the threshold value determination with respect to the corresponding block, in the case where the activity detecting circuit 52C and the threshold value determining circuit 52D receive the threshold value determined result information J2 which represents division of the block from the adjacent coder 53 of the upper hierarchy. On the contrary, the coder 52 does not perform activity detection and threshold value determination in the case where the threshold value determined result information J2 is that represents non-division of the block, and outputs the threshold value determined result information J3 which represents non-division of the block from the threshold value determining circuit 52D.

As the above, in the hierarchical coding encoder unit 90A, if non-division determined result has been obtained once, the block division is not performed (i.e., is not coded) with respect to the corresponding block in the following lower hierarchies.

Further, in the hierarchical coding encoder unit 90A, when the threshold value determined result information J4 which represents division of the block can be obtained, the coder 52 receives this threshold value determined result information J4 at the division control unit 52B to perform the determination of threshold value of the block activity, and determines whether or not to divide the block, even if the threshold value determined result information J2 which represents non-division of the block is obtained for example, by the division control unit 53B of the coder 53.

(3) Generated Information Quantity Control Unit

Figure 39:
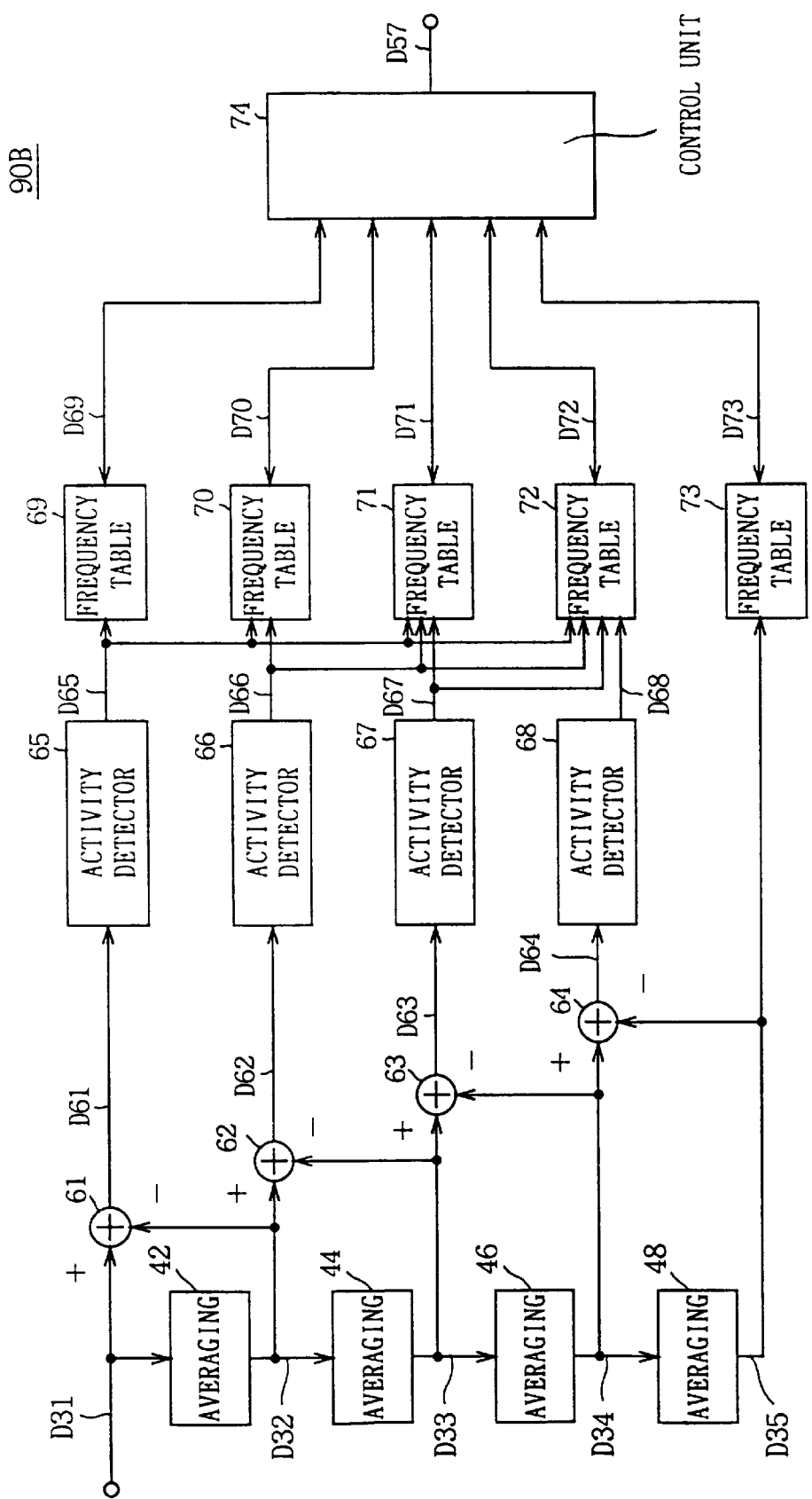
FIG. 39 is a block diagram showing a generated information quantity control unit.
Figure 40:
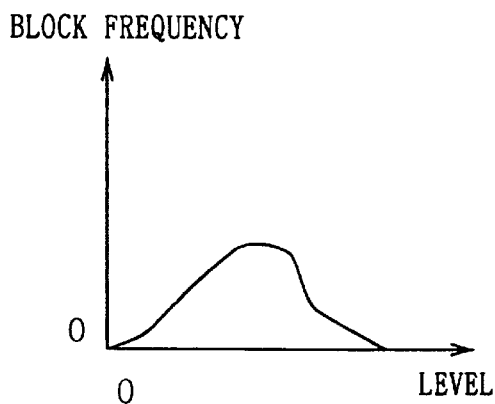
FIGS. 40(A) to 40(E) are characteristic curvilinear diagrams illustrating the frequency table of each hierarchy.
Figure 40:
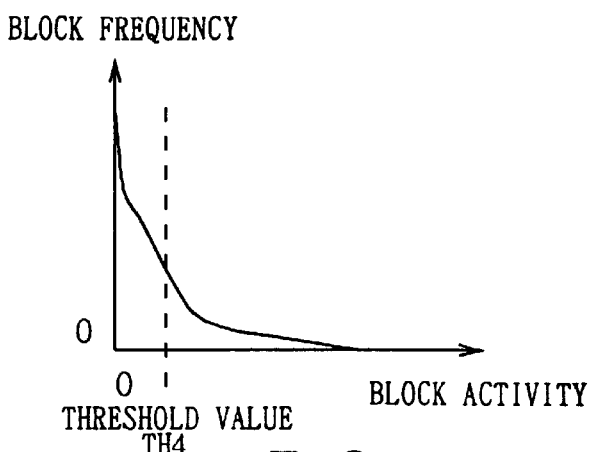
Figure 40:
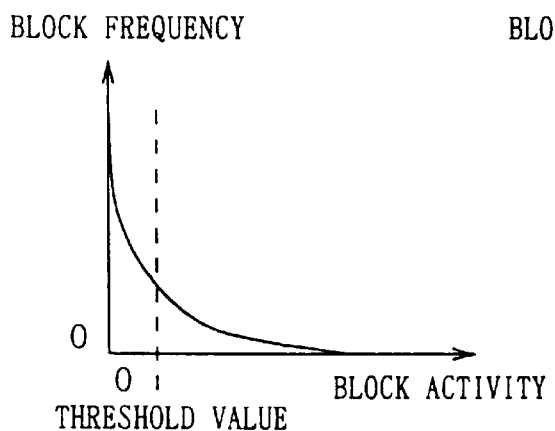
Figure 40:
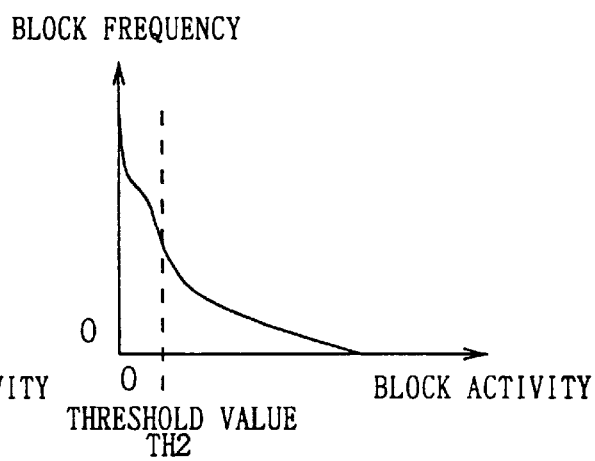
Figure 40:
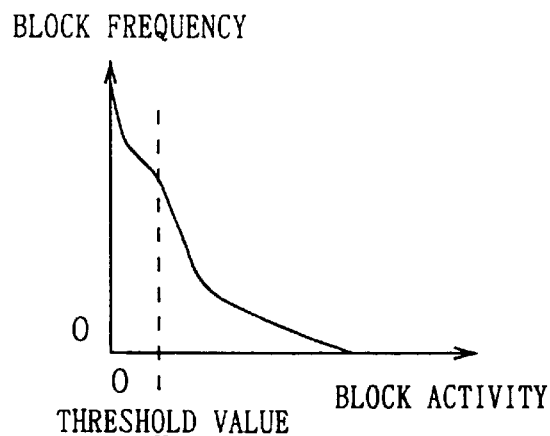

FIG. 39 shows a block diagram of an example of the structure of the generated information quantity control unit.

First, at the averaging circuit 42, ¼-averaging processing is performed toward the picture data D31 which is same as that of the encoder unit of FIG. 37, to generate the second hierarchy data D32.

Secondly, at the averaging circuit 44, ¼-averaging processing is performed toward the second hierarchy data D32 to generate the third hierarchy data D33.

Similarly, the fourth hierarchy data D34 is generated by ¼-averaging processing of the averaging circuit 46 toward the third hierarchy data D33.

Lastly, the fifth hierarchy data D35 is generated by ¼-averaging processing at the averaging circuit 48.

Data frequency at the fifth hierarchy data D35 is registered into the frequency table 73. This measures data frequency corresponding to the compression processing which has been performed at the encoder unit described above. For instance, in the case where compression processing by the PCM coding is performed for the fifth hierarchy data D35, a dynamic range which is given with respect to each block is registered as a data, and in the case where the ADRC (adaptive dynamic range coding (U.S. Pat. No. 4,703,352)) is applied as the compression processing method, "DR" of the ADRC block is registered.

Succeedingly, the difference data D64 is generated from the fourth hierarchy data D34 and the fifth hierarchy data D35. As to the difference data D64, the abovementioned detection of block activity is performed at the activity detecting circuit 68. Thus detected block activity value D68 is registered into the frequency table 72.

The determination of block division in the upper hierarchy is determined with reference to the determined result of the block activity in all of the lower hierarchies.

Then, the frequency table 72 is defined by four variables, the first hierarchy block activity value D65, the second hierarchy block activity value D66, the third hierarchy block activity value D67, and the fourth hierarchy block activity value D68.

The difference data D63 is generated from the third hierarchy data D32 and the fourth hierarchy data D34. As to the difference data D63, its block activity value is detected at the activity detecting circuit 67. Thus detected activity value D67 is registered to the frequency table 71.

Also in this case, the block division is determined with reference to the determined result of the block activity value of all of the lower hierarchies which are lower than the third hierarchy.

Therefore, the frequency table 71 of the third hierarchy is defined by three variables, these are the first hierarchical block activity value D65, the second hierarchical block activity value D66, and the third hierarchical block activity value D67.

The difference data D62 is generated from the second hierarchy data D33 and the third hierarchy data D32, and the block activity value D66 is outputted from the activity detecting circuit 66. The detected block activity value D66 is registered to the frequency table 70.

In this case, the block division is determined with reference to the determined result of the block activity of the first hierarchy.

The frequency table 70 of the second hierarchy is defined by two variables, the first hierarchy block activity value D65 and the second hierarchy block activity value D66.

Lastly, the difference data D61 is generated from the first hierarchy data D31 and the second hierarchy data D32, and the block activity value D65 is outputted from the activity detecting circuit 65. The detected block activity value D65 is registered to the frequency table 69.

With respect to the first hierarchy, the determination of threshold value of the block activity is independently performed and the result is performed, therefore it is not needed to monitor the block activity of the upper hierarchy. That is, the frequency table 1 of the first hierarchy is to be one-dimensional frequency table which is composed of the first hierarchy block activity data D65.

In generating process of the frequency table, three pixels which are objects to be transmitted by the encoder practically, are used out of four pixels of a lower hierarchy corresponding to one pixel of the upper hierarchy, to grasp correctly the quantity of data to be transmitted of the encoder unit.

The control of generated information quantity is performed using thus generated frequency tables 69 to 73. Each frequency table and the control unit of the latter stage are connected each other with bidirectional signal channels D69 to D73.

In the control unit, a threshold value for each frequency table is transmitted to each frequency table.

In each frequency table, the generated information quantity corresponding to the threshold value is detected.

The generated information quantity in each frequency table is transmitted via the signal channels D69 to D73 to the control unit 74.

In the control unit 74, the total generated information quantity to be controlled is calculated by integrating the received generated information quantity in each frequency table.

This total generated information quantity is compared with the target value, and the threshold value is changed according to the comparison result so that the target value is satisfied.

The threshold value updated again is transmitted from the control unit 74 via the signal channel D69 to D73 to each frequency table.

The generated information quantity corresponding to the above threshold value is transmitted to the control unit 74 again.

The control result D57 for attaining the target value is determined finally by repeating the above processing.

The detected generated information quantity control value D57 is transmitted to the hierarchical coding encoder unit as shown by the block diagram of FIG. 36.

The data to be controlled is to be waited into a memory M1 which is included in the encoder unit, while this generated information quantity control unit is processing.

In the above control of information quantity, the threshold value applied to the object data can be determined, thereby a coding can be realized with high efficiency.

FIGS. 40(A) to 40(E) show respectively frequency tables of the block activities which has been obtained with respect to the uppermost hierarchy data to the lowermost hierarchy data. Here, as to the frequency table of the fifth hierarchy shown in FIG. 40(A), since the difference data is not an object data, the frequency table by dynamic range is generated. For instance, in the case where the compression processing by the PCM coding is performed on the fifth hierarchy data D35, the dynamic range which is given with respect to each block is registered as a data, on the other hand, in the case where the ADRC (adaptive dynamic range coding (U.S. Pat. No. 4,703,352)) is applied as a compression processing method, the DR of the ADRC block is registered.

An example of the frequency table for control of the generated information quantity in case of having fifth hierarchies is shown in FIGS. 41 to 47.

First, a defining equation is introduced that calculates the total generated information quantity.

To calculate the generated information quantity, it is needed to count the number of activity blocks which is larger than or equal to the division determination threshold value in each hierarchy. However, in the control of the generated information quantity in the hierarchical coding by determination flag confirming method, the division determination of object block must be performed considering the determined result of division of all of the lower hierarchies for each block in the upper hierarchy.

At this time, as to the block activity determination threshold value used to the determination of division in each hierarchy, the first hierarchy division determination threshold value is denoted by TH1, the second hierarchy division determination threshold value is denoted by TH2, the third hierarchy division determination threshold value is denoted by TH3, and the fourth hierarchy division determination threshold value is denoted by TH4.

The division of the lower hierarchy of the block which is larger than or equal to the threshold value is performed, in all of hierarchies. In the upper hierarchy, the division of block is stopped in the case where there is no block activity which is larger than or equal to the threshold value in all of the lower hierarchies and when the block activity of the hierarchy is less than the threshold value.

Figure 41A:
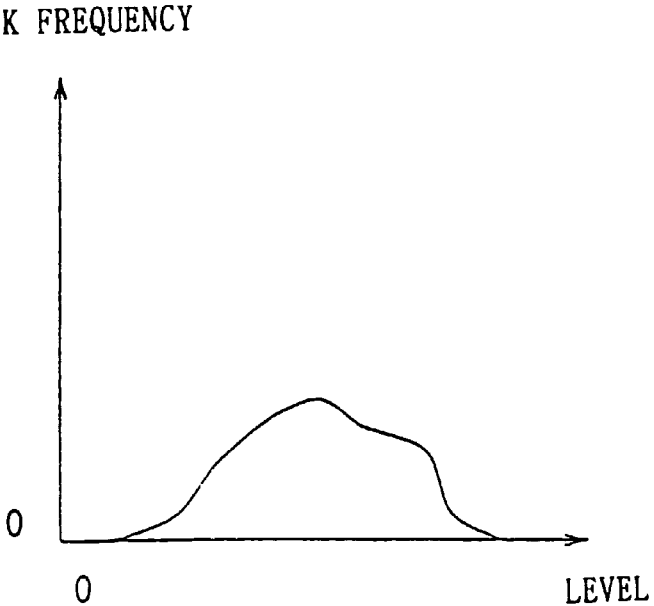

FIG. 41(A) shows a frequency table of the fifth hierarchy which is the uppermost hierarchy.

As to the frequency table of the fifth hierarchy, the control of information quantity corresponding to the coding processing is performed because the object data is not difference data.

In the case where the fixed-length coding such as the linear quantization is applied, it is not needed to produce a frequency table. On the control of generated information quantity, it may use the following calculation of generated information quantity.

That is, assuming that the sum of pixel numbers in the block to be divided in the first hierarchy as "M1", the number of quantization bits of the first hierarchy data as "Q1", the number of determination flag bits of the first hierarchy as "N1", then the generated information quantity "I1" in the first hierarchy is given by the following equation:

$$I1 = 4 \cdot Q1 \cdot M1 \cdot (3/4) + N1 \quad (18)$$

In the first term of Equation (18), each number of bits is quadrupled, because in the case of this example, each block is divided into 2 lines×2 pixels. Further, in the first term, it is multiplied by ¾, because the characteristic is reflected that, on a structure that an upper hierarchy value is generated based on the mean value of lower hierarchy values, the fourth non-transmission pixel value of lower hierarchy can be restored by means of an arithmetic equation using the upper hierarchy value and three pixels of the lower hierarchy value.

By the way, in the second term, N1 is added to the number of blocks in the first hierarchy, it means that the respective blocks are transmitted with adding one bit as a division determination flag.

Similarly, as to the second, the third, and the fourth hierarchies, assuming that the sum of pixel numbers in the block to be divided in each hierarchy as M2, M3, M4, the number of quantization bits in each hierarchy as Q2, Q3, Q4, the number of determination flag bits in each hierarchy as N2, N3, N4, then the generated information quantity Ik (k=2, 3, 4) in each hierarchy is given by the following equation:

$$I = I1 + I2 + I3 + I4 + I5 \quad (19)$$

Using the generated information quantities I1 to I4 of the first to the fourth hierarchy and the generated information quantity I5 of the fifth hierarchy, the total generated information quantity I which is generated by the coding processing of the hierarchical coding encoder unit 40A can be obtained as a sum of generated information quantities for each hierarchy as the following equation:

$$Ik = 4 \cdot Qk \cdot Mk \cdot (3/4) + Nk \quad (20)$$

Here, the number of bits of the determination flag is added to the generated information quantity of each hierarchy. However, the information quantity of this flag is equal to the number of blocks which has been performed the division processing in the upper hierarchy. The spatial position of each block can be specified in each hierarchy by a history of the determination flag from the upper hierarchy.

Now, the individual frequency tables will be explained.

As stated above, since the frequency table of the uppermost hierarchy data depends on the compression scheme, it is not determined uniquely. However, the generated information quantity can be controlled using means such as a frequency table.

Next, as to the first hierarchy data, the block frequency toward the block activity value ACT1 is registered. By applying the first hierarchy frequency table of FIG. 41, the generated information quantity which is related to the threshold value TH1 can be easily calculated.

Since the blocks which are larger than or equal to the threshold value TH1 are the object of division, the generated information quantity on the fourth hierarchy is calculated by computing the sum of the number of blocks which are not less than the threshold value.

Figure 42:
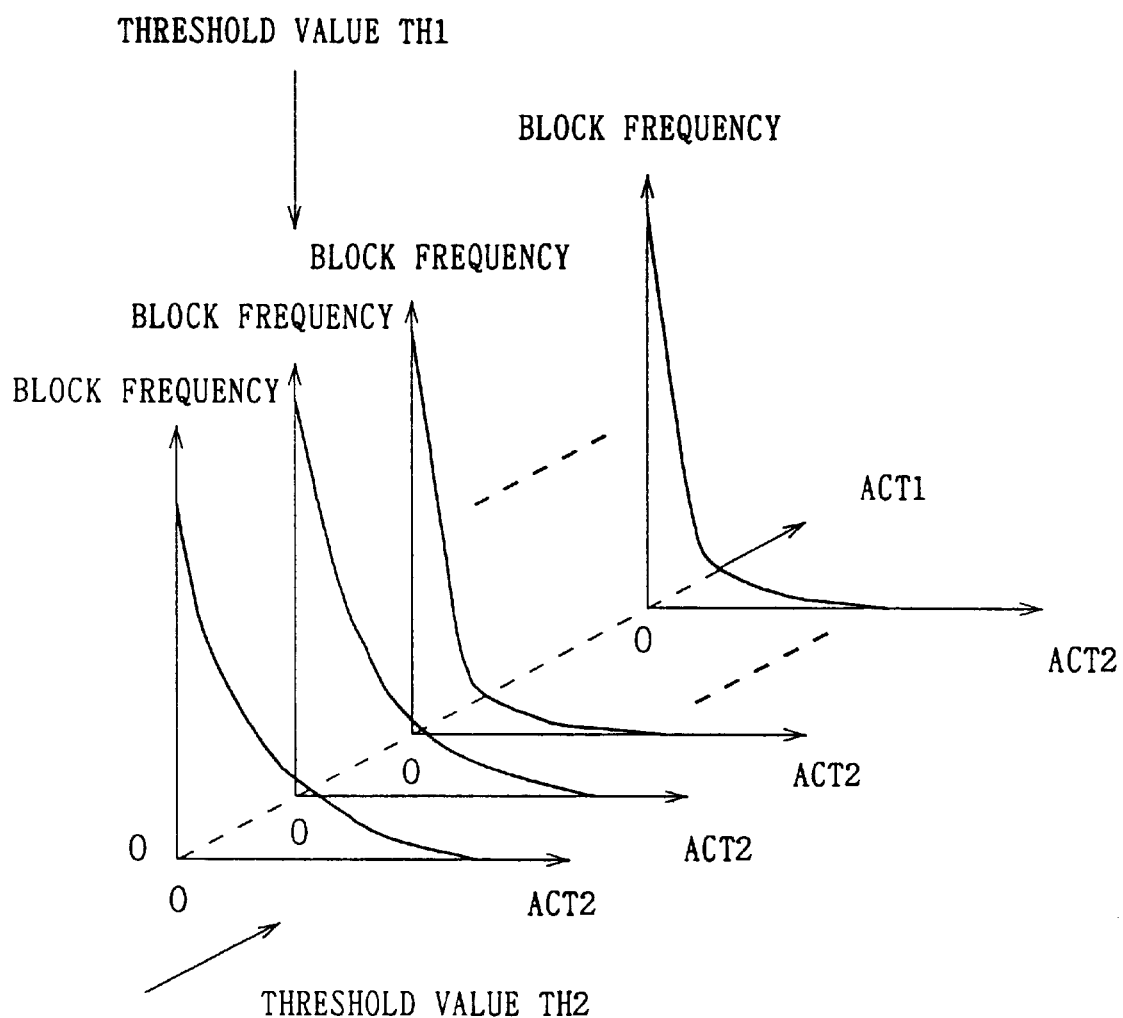

Next, an example of the frequency table of the second hierarchy is shown in FIG. 42.

In the determination flag confirming scheme, the number of blocks which is over the threshold value TH2 in the second hierarchy is counted, for the block which received the determination of block division stop in the first hierarchy.

Then, such a frequency table is introduced that is defined by two variables, that are the first hierarchy block activity value ACT1 and the second hierarchy block activity value ACT2.

In other words, such a block frequency is obtained that is larger than or equal to the threshold value TH1 of the first hierarchy and larger than or equal to the threshold value TH2 of the second hierarchy.

As to this operation, by calculating the block frequency which is larger than or equal to the threshold value TH1 at the ACT1 axis and larger than or equal to the threshold value TH2 at the ACT2 axis on the frequency table of FIG. 42, the generated information quantity in the second hierarchy which satisfies the above conditions can be calculated.

FIG. 42 shows the state where the block activity values ACT2 of the second hierarchy are distributed for each value of the ACT1 in the case where the ACT1 is measured discretely.

Next, the examples of the frequency tables for the third hierarchy and the fourth hierarchy are shown in FIG. 43.

In accordance with the same idea as that of the frequency table of the second hierarchy, a frequency table which is defined by several variables is produced.

In the third hierarchy, the blocks which are defined by the respective block activities ACT1, ACT2, and ACT3 of the first hierarchy, the second hierarchy, and the third hierarchy, are registered to the frequency table. This situation is shown in FIG. 43(A).

In the third hierarchy, by calculating the block frequency which is larger than or equal to the threshold value TH1 at the ACT1 axis, larger than or equal to the threshold value TH2 at the ACT2 axis, and larger than or equal to the threshold value TH3 at the ACT3 axis, the generated information quantity in the third hierarchy is calculated.

In the fourth hierarchy, the blocks which are defined by the respective block activities ACT1, ACT2, ACT3, and ACT4 of the first hierarchy, the second hierarchy, the third hierarchy, and the fourth hierarchy are registered to the frequency table. This situation is shown in FIG. 43(B).

In the case of the fourth hierarchy, by calculating the block frequency which is larger than or equal to the threshold value TH1 at the ACT1 axis, larger than or equal to the threshold value TH2 at the ACT2 axis, larger than or equal to the threshold value TH3 at the ACT3 axis, and larger than or equal to the threshold value TH4 at the ACT4 axis, the generated information quantity in the fourth hierarchy is calculated.

The generated information quantity toward the threshold value can be calculated utilizing the abovementioned five kinds of frequency tables, and can be controlled so as to coincide with the target information quantity.

As to the threshold value of each hierarchy which is utilized to control the generated information quantity, there are methods for changing it independently for each hierarchy.

For instance, there is such a scheme that the target information quantity is previously set for each hierarchy and then the threshold value is independently changed for each hierarchy, so that it is controlled so as to coincide with the target information quantity.

Also, as another scheme, such a scheme that the combinations of the threshold values for each hierarchy are previously prepared, and then these threshold value sets are applied in accordance with a control sequence is also considerable, and hereby the control is simplified.

A frequency table will be described below.

In the abovementioned scheme for controlling the generated information quantity which utilizes the frequency table of each hierarchy, in each hierarchy, the block frequency whose block activity value at each hierarchy is larger than or equal to the threshold value, is calculated considering the division determined result of the upper hierarchy, so that the optimal control value is detected.

In order to shorten the time for calculating the block frequency which is larger than or equal to the threshold value, the frequency table in which the block frequency is registered may be reconstructed into an integration type frequency table.

Figure 45:
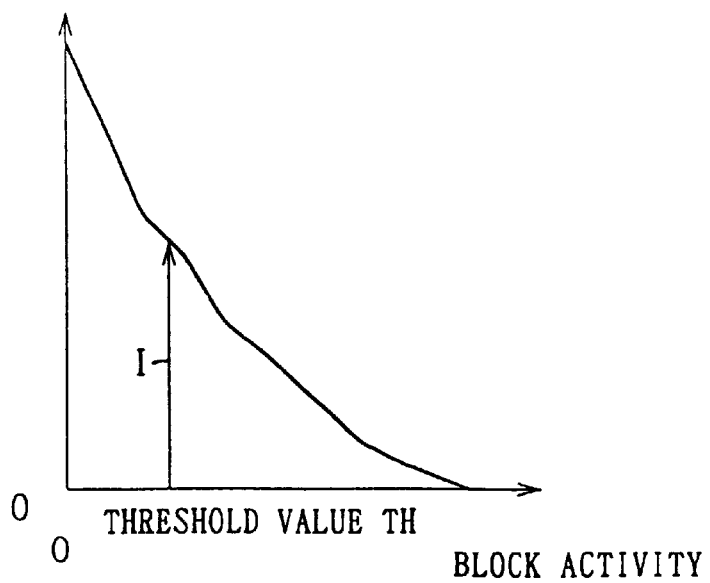
FIG. 45 is a characteristic curvilinear diagram illustrating an integrating frequency table.

An example of this integrating frequency table is shown in FIG. 45.

Figure 44:
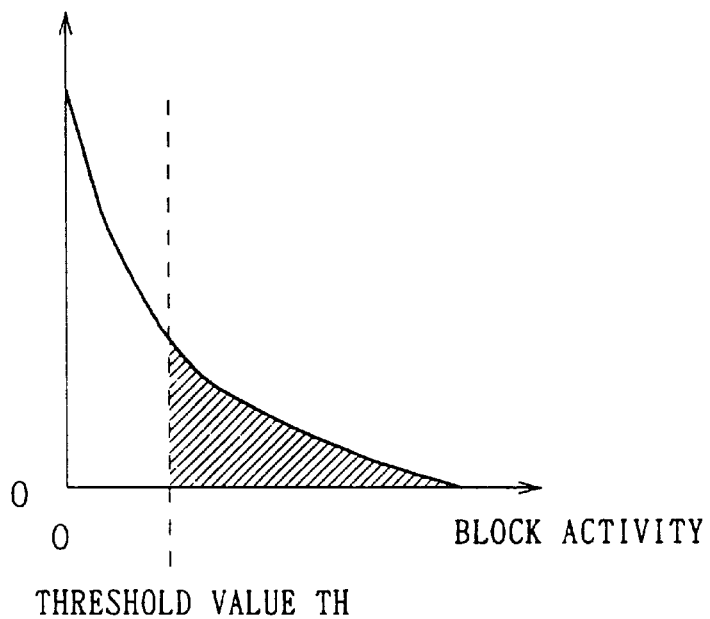

It is supposed that a block activity value has been registered with the result that an example of a frequency table which is shown in FIG. 44 has been obtained. In this case, to simplify the explanation, an example of which the block activity value is one variable is shown.

The integrating frequency table (FIG. 45) has such a structure that the integrating calculation is performed starting with the block frequency which corresponds to the maximum value of the block activity value of the frequency table of FIG. 44, and toward the block frequency which corresponds to the smaller block activity value, so that the respective results of the integration are re-registered in the frequency table.

This process is represented by the following equation:

$$SUM(act) = \sum_{ACT=act}^{n} N(ACT) \qquad (21)$$

There, SUM(.) represents an integrated block frequency, "N(.)" represents a block frequency in a frequency table, "act" denotes a block activity value variable in the integrating frequency table, "ACT" denotes a block activity value variable in the frequency table, and "n" denotes the maximum value of a variable in the frequency table.

What is meant by Equation (21) is such a process that a block frequency of a block activity value address is read and added to the integrated value which has been obtained up to the upper block activity value, and then the result is written into the present block activity value address.

This result is shown in FIG. 45. In this integrating frequency table, the sum of the block frequency of the hatched portion of FIG. 44 corresponds to the threshold value TH coordinate data I.

By virtue of this integrating frequency table, it becomes unnecessary to calculate the sum of the block frequency of the hatched portion of FIG. 44 each time the threshold value TH is changed.

That is to say, by outputting the integrated block frequency which corresponds to the threshold value of the integrating frequency table, the calculation of the sum of the block frequency is realized.

Figure 41B:
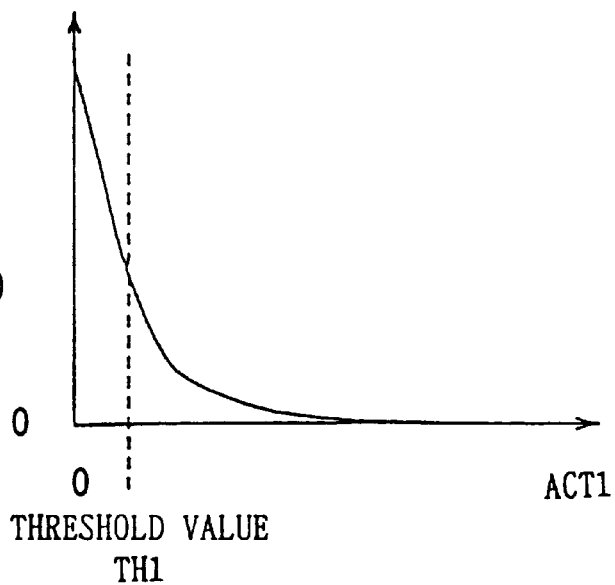

FIG. 45 also shows an example of one variable, which can be applied to the first hierarchy frequency table of FIG. 41.

The second hierarchy frequency table of FIG. 42 shows the case of two variables. By expanding Equation (21), an integrating frequency table is produced and represented by the following equation:

$$SUM(act1, act2) = \sum_{ACT1=act1}^{n} \cdot \sum_{ACT2=act2}^{n} N(ACT1, ACT2) \quad (22)$$

Here, "SUM(.)" represents an integrated block frequency, "N(.)" represents a block frequency in a frequency table, "act1" denotes the first hierarchy corresponding variable in an integrating frequency table, "act2" denotes the second hierarchy corresponding variable in the integrating frequency table, "ACT1" denotes the first hierarchy variable in the frequency table, "ACT2" denotes the second hierarchy variable in the frequency table, and "n" denotes the maximum value of a variable in the frequency table.

In an integrating frequency table which is produced in accordance with Equation (22), an integrated block frequency, which corresponds to the address of the determination threshold value TH1 of the first hierarchy and the determination threshold value TH2 of the second hierarchy, indicates the sum of the block frequency which is larger than or equal to the threshold value TH1 and also larger than or equal to the determination threshold value TH2.

In this way the generated information quantity at the second hierarchy can be calculated.

With respect to the frequency tables of the third hierarchy and the fourth hierarchy shown in FIG. 43, the time for calculating the block frequency sum can also be shortened by utilizing an integrating frequency table.

In these cases the number of block activity variables increases, therefore the number of integration increases.

First, the operational expression in the case of the third hierarchy is represented by the following equation:

$$SUM(act1, act2, act3) = \quad (23)$$
$$\sum_{ACT1=act1}^{n} \cdot \sum_{ACT2=act2}^{n} \cdot \sum_{ACT3=act3}^{n} N(ACT1, ACT2, ACT3)$$

Here, "SUM(.)" represents an integrated block frequency, "N(.)" represents a block frequency in a frequency table, "act1" denotes the first hierarchy corresponding variable in an integrating frequency table, "act2" denotes the second hierarchy corresponding variable in the integrating frequency table, "act3" denotes the third hierarchy corresponding variable in the integrating frequency table, "ACT1" denotes the first hierarchy variable in the frequency table, "ACT2" denotes the second hierarchy variable in the frequency table, "ACT3" denotes the third hierarchy variable in the frequency table, and "n" denotes the maximum value of a variable in the frequency table.

In the integrating frequency table which is produced in accordance with Equation (23), the integrated block frequency, which corresponds to the address of the determination threshold value TH1 of the first hierarchy, the determination threshold value TH2 of the second hierarchy, and the determination threshold value TH3 of the third hierarchy, indicates the sum of the block frequency which is larger than or equal to the threshold value TH1 and also larger than or equal to the threshold value TH2 and also larger than or equal to the determination threshold value TH3.

In this manner, the generated information quantity in the third hierarchy can be calculated.

Further, a process which is related to the frequency table of the fourth hierarchy shown in FIG. 43 will be described.

In this case, there are four kinds of block activity value variables, therefore the number of integrating calculations becomes the most.

The operational expression in the case of the fourth hierarchy is represented by the following equation:

$$SUM(act1, act2, act3, act4) = \sum_{ACT1=act1}^{n} \cdot \sum_{ACT2=act2}^{n} \cdot \quad (24)$$
$$\sum_{ACT3=act3}^{n} \cdot \sum_{ACT4=act4}^{n} N(ACT1, ACT2, ACT3, ACT4)$$

Here, "SUM(.)" represents an integrated block frequency, "N(.)" represents a block frequency in a frequency table, "act1" denotes the first hierarchy corresponding variable in an integrating frequency table, "act2" denotes the second hierarchy corresponding variable in the integrating frequency table, "act3" denotes the third hierarchy corresponding variable in the integrating frequency table, "act4" denotes the fourth hierarchy corresponding variable in the integrating frequency table, "ACT1" denotes the first hierarchy variable in the frequency table, "ACT2" denotes the second hierarchy variable in the frequency table, "ACT3" denotes the third hierarchy variable in the frequency table, "ACT4" denotes the fourth hierarchy variable in the frequency table, and "n" denotes the maximum value of a variable in the frequency table.

In the integrating frequency table which is produced in accordance with Equation (24), the integrated block frequency, which corresponds to the address of the determination threshold value TH1 of the first hierarchy, the determination threshold value TH2 of the second hierarchy, the determination threshold value TH3 of the third hierarchy, and the determination threshold value TH4 of the fourth hierarchy, indicates the sum of the block frequency which is larger than or equal to the threshold value TH1, also larger than or equal to the threshold value TH2, also larger than or equal to the threshold value TH3, also larger than or equal to the threshold value TH4.

In this manner, the generated information quantity at the fourth hierarchy can also be calculated.

As a result of this process, the calculation of the generated information quantity based on the number of the dividing object blocks in each hierarchy based on Equation (19) is realized.

By the introduction of the above described integrating frequency table, the time for controlling the generated information quantity can be shortened significantly.

Such a method will be described below that the time for controlling the generated information quantity is further shortened on this integrating frequency table.

The integrating frequency table which is used in this proposal is utilized to calculate the information quantity which is generated toward the division determination threshold value.

In the actual threshold value processing, a large determination threshold value can not be practically used, from the viewpoint of the degradation of the picture quality. Hence, it is proposed herein to make frequency tables whose block activity value is clipped. Such a situation is shown in FIGS. 46 and 47.

Figure 46:
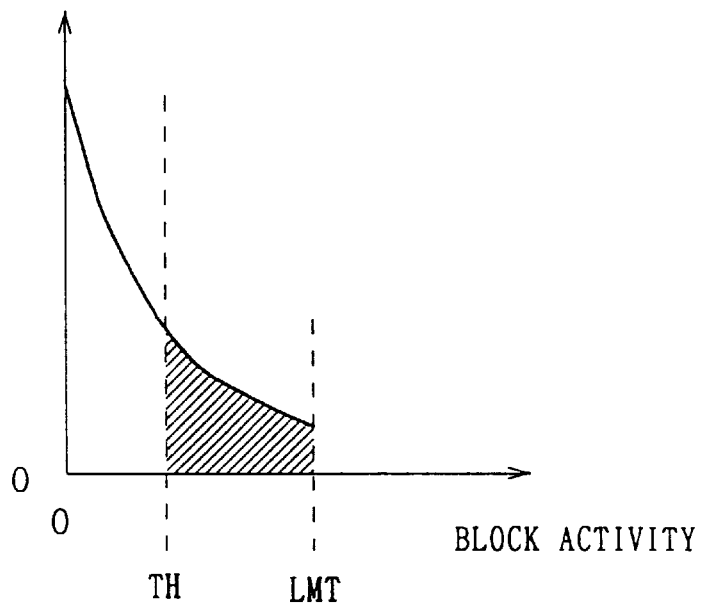
FIG. 46 is a characteristic curvilinear diagram illustrating the frequency table which uses the clipped value.

As shown in FIG. 46, on the condition that the block activity value is clipped at LMT, the block frequency which are larger than or equal to LMT are all registered as LMT to the frequency table.

As a result, the block frequency at LMT become large as indicated in the figure. The block frequency sum to be calculated is the hatched portion.

Figure 47:
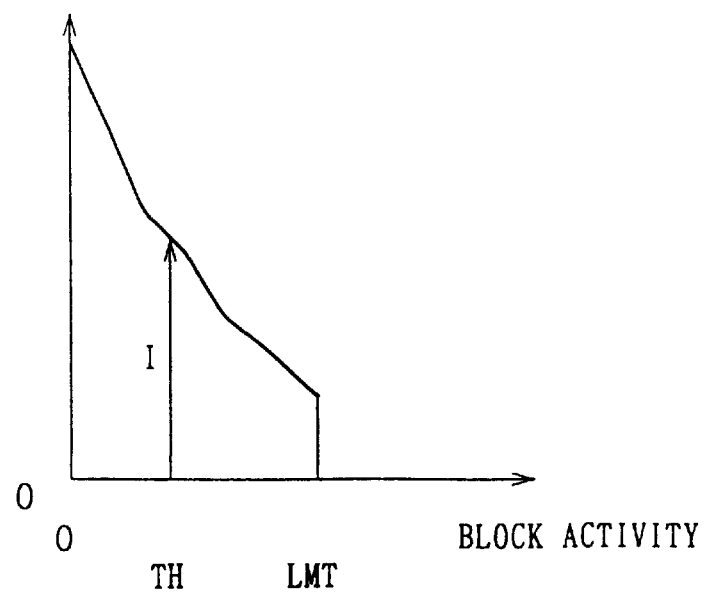
FIG. 47 is a characteristic curvilinear diagram illustrating the integrating frequency table which uses the clipped value.

The integrating frequency table toward this frequency table is shown in FIG. 47. The integrating calculations which are shown in Equations (21) to (24) are performed with respect to the interval, which extends from the block activity value LMT instead of the maximum value "n" of the block activity value, to "0".

The block frequency sum to be calculated is the integrated block frequency I of the coordinate of the threshold value TH. As shown in this example, the same result as that of FIG. 45 is obtained. By the introduction of clipping into the block activity value of the frequency table, a shortening of the integrating frequency table generating time and a miniaturization of the frequency table memory space can be realized.

As the frames to which this scheme is applied, two frames can be considered. One of these is the case where clipping value LMT is changed for each hierarchy, and the other is the case where clipping value LMT is fixed for all hierarchies.

The former is utilized when there are clear differences in the distribution of the inter-hierarchy difference values of each hierarchy, and the latter is utilized when there are little differences in the distribution of the inter-hierarchy difference values of each hierarchy.

Figure 48:
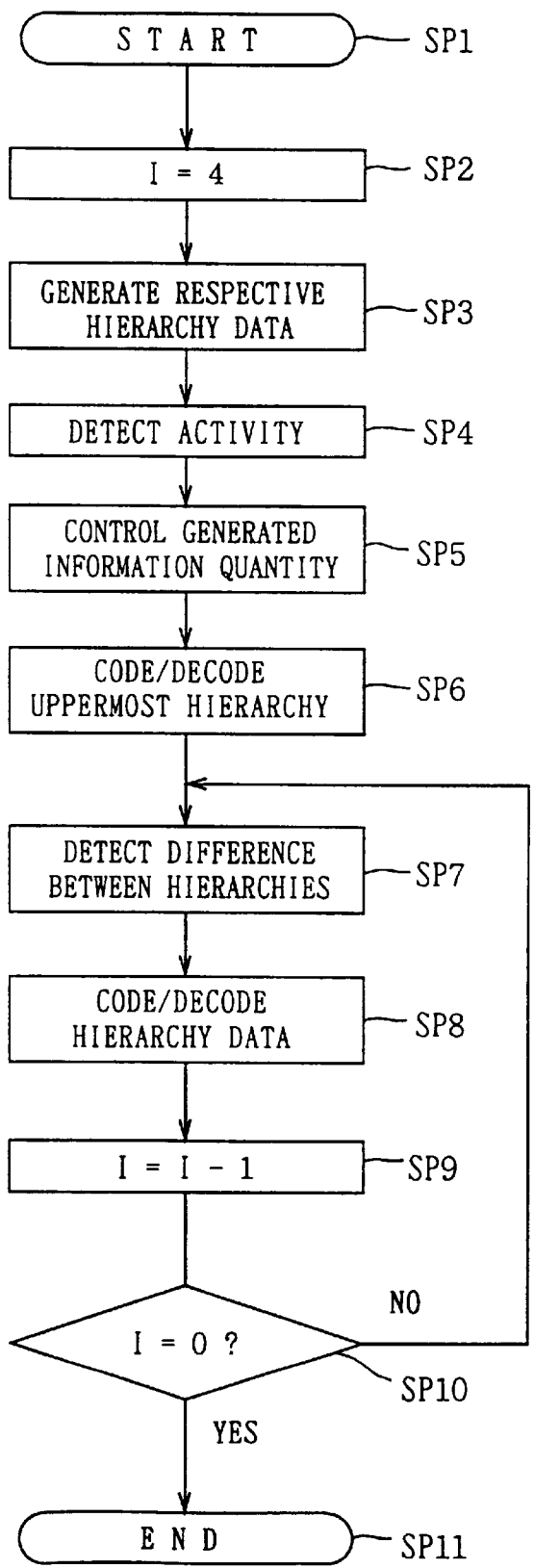
FIG. 48 is a flowchart showing a processing of the hierarchical coding.

Note that, FIG. 48 shows a flowchart of the hierarchical coding process. In the step SP2, "4" is registered in the hierarchy counter I for storing the hierarchy number, so that the frame of this hierarchization is determined.

Further, at step SP3, the hierarchical data is produced by the generated information quantity calculation, and at step SP4, each block activity value is detected. With respect to this activity value, at step SP5, the multi-dimensional frequency table which is abovementioned in relation to FIG. 42 is generated and registered, hereby the generated information quantity controlling is performed and the optimal control value is determined.

Further, at step SP6, the hierarchical coding is performed at the encoder side based on this control value. At first, the coding and the decoding are performed with respect to the data of the fifth hierarchy which is the uppermost hierarchy. The result of this process becomes to the initial value of the process at the lower hierarchy, and the inter-hierarchy difference value between this result and the lower hierarchy is produced at step SP7. Further, at step SP8, based on the generated information quantity control value which is determined at the upper stage, the division selecting and the coding at the lower hierarchy are performed.

After the processing of each hierarchy, the hierarchy counter I is decremented at step SP9. And then, at step SP10, a termination determination is performed with respect to the content of the hierarchy counter I. In the case where it is not to be terminated, the process of the lower hierarchy is further continued. In the case where the processes of all hierarchies have been terminated, the operation goes out the loop and then terminates at step SP11.

By virtue of the generated information quantity controlling stated above, the hierarchical coding which has little degradation of picture quality and high efficiency of compression can be performed.

(4) Other Embodiments of Fourth Embodiment (4-1) In the abovementioned embodiment, such a case is described that the block activity value P is determined based on the maximum value of the difference value between the lower hierarchy data and the decoded data obtained for each block with respect to the upper hierarchy data. However, the present invention is not only limited to this, but the determination can be performed based on an average error, an absolute value sum, a standard deviation, an n-th power sum, or a frequency of data which is larger than or equal to a threshold value in a block.

(4-2) In the abovementioned embodiment, such a case is described that the picture data is PCM coded at the coder. However, the present invention is not only limited to this, but other coding schemes, such as a quadrature coding scheme, can be applied.

(4-3) In the abovementioned embodiment, such a case is described that the plural combinations of the threshold value of the frequency table which has been obtained for each hierarchy are previously stored in a ROM, and then the combination of the threshold value by which the generated information quantity becomes nearest to the target value is obtained. However, the present invention is not only limited to this, but can be adapted to set it independently for each hierarchy.

(4-4) In the abovementioned embodiment, such a case is described that the lowermost hierarchy data is averaged for each 2 lines×2 pixels at a time so that the picture data of the upper hierarchy is obtained, however, the present invention is not only limited to this, but the average value can be obtained by other combinations.

(5) As stated above, according to the present invention, when the picture data is sequentially and recursively divided and coded into the data of the plural hierarchies composed of different plural resolutions, the block activity value is determined with respect to the predetermined block of the hierarchy data, and then the threshold value which is the determination standard of the division process to the lower hierarchy data is set from the frequency distribution of the block corresponding to the block activity value. Thereby, the method for hierarchically coding the picture data without the lowering of the efficiency of compression can be easily realized.

[7] Sixth Embodiment (1) Picture Coding Apparatus of Sixth Embodiment

Figure 49:
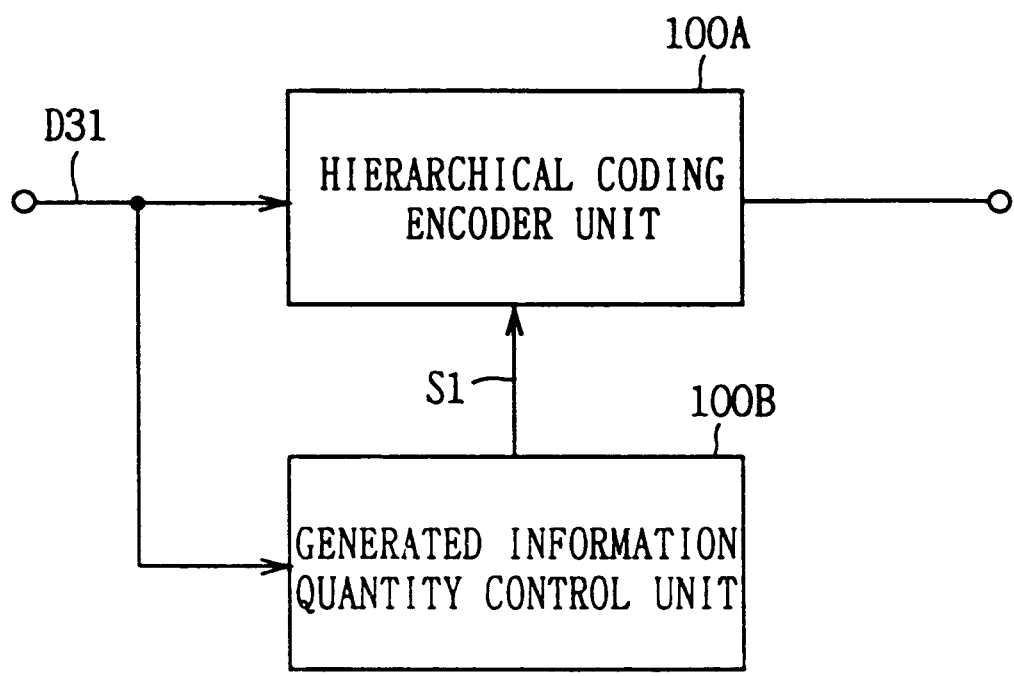
FIG. 49 is a block diagram showing the picture coding apparatus of the sixth embodiment according to the present invention.

The picture coding apparatus 100 of the sixth embodiment has the same schematic construction as the case of the third embodiment (FIG. 11) as shown in FIG. 49, and is composed of a hierarchical coding encoder unit 100A which hierarchically codes an inputted picture data D31 and outputs it, and a control unit 100B which controls the generated information quantity in the hierarchical coding encoder unit 100A so that it attains the target value.

The hierarchical coding encoder unit 100A is composed of a memory M1 for delaying data (FIG. 50) and an encoder. The memory M1 is provided in the inputting stage in order that the data can be delayed so that the encoding process will not be performed until an optimal control value is determined in the generated information quantity control unit 100B.

Meanwhile, the generated information quantity control unit 100B is adapted to be inputted the input picture data D31 and then sets an optimal control value S1 which is accommodated to the data to be processed, and also adapted to transmit this to the hierarchical coding encoder 40A, so that the coding can be efficiently performed in the hierarchical coding encoder unit 40A. It has a construction of a so-called feed-forward type buffering.

(2) Hierarchical Coding Encoder Unit

Figure 50:
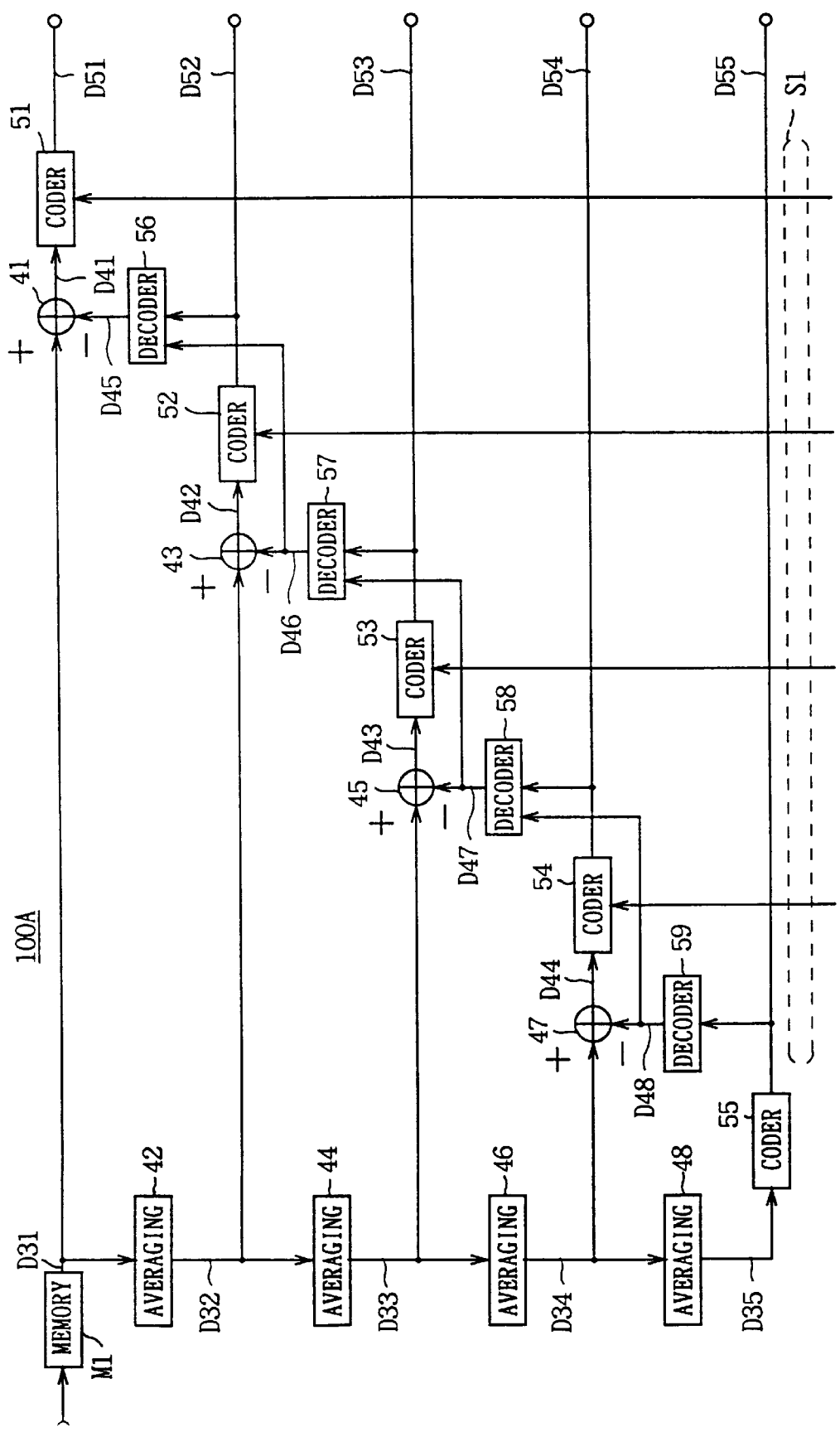
FIG. 50 is a block diagram showing the hierarchical coding encoder unit of FIG. 49.
Figure 51:
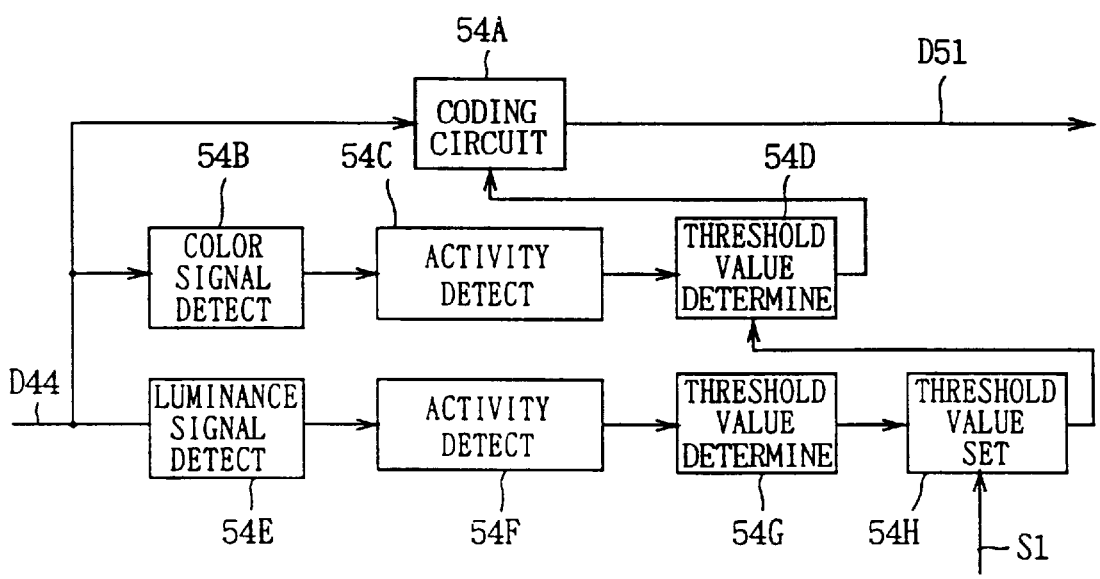
FIG. 51 is a block diagram showing the coder of FIG. 50.
Figure 52A:
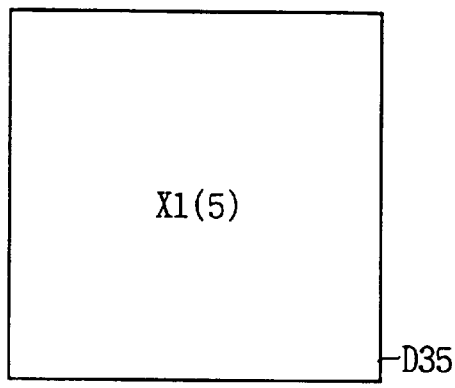
FIGS. 52(A) to 52(E) are schematic diagrams explaining a hierarchical structure.
Figure 52D:
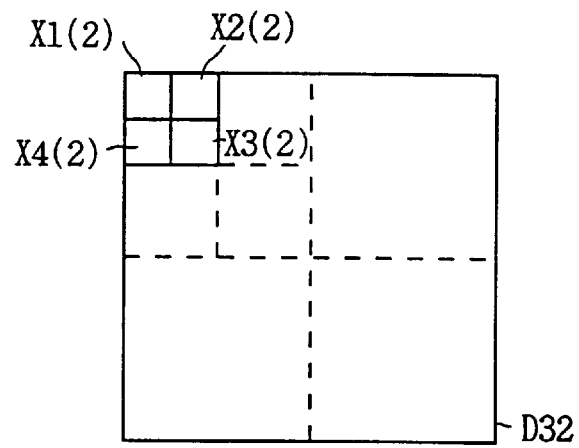
Figure 52B:
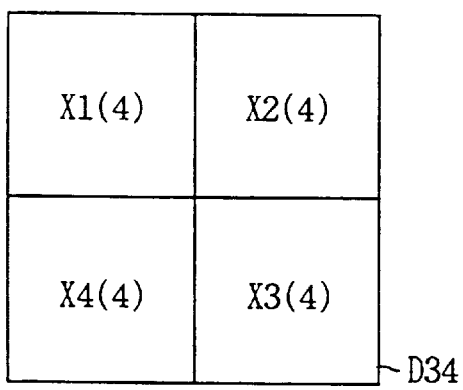
Figure 52E:
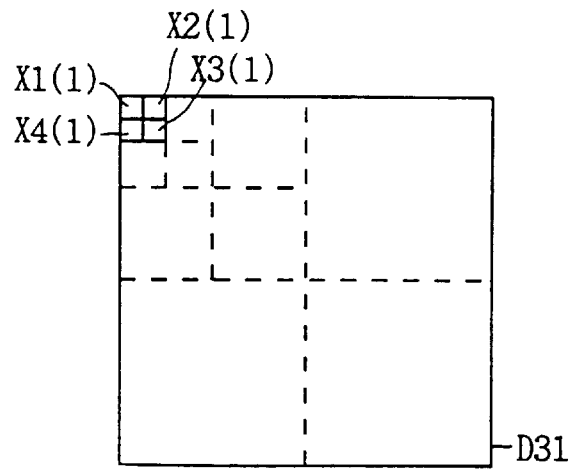
Figure 52C:
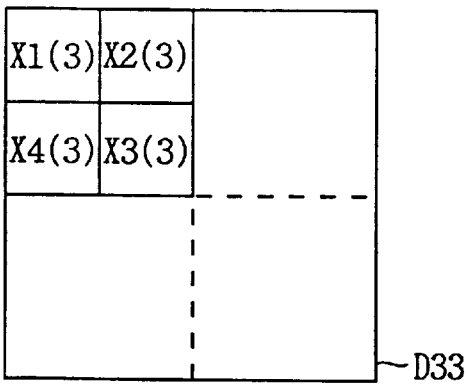

The hierarchical coding encoder unit 100A has the construction shown in FIG. 50, and has the same construction as that is described with respect to FIGS. 12 and 13, excepting the points that the compressed picture data of five hierarchies having different resolutions is generated and the input picture data D31 is inputted via the memory M1, and the coders 51 to 55 are structured as shown in FIG. 51.

The coders 51 to 55 of this case perform block division determination by utilizing the relation of signals existing in the same space. That is, in FIG. 51, the coder 54 inputs the difference data D44 to the coding circuit 54A, and at the same time inputs to the color signal detecting signal 54B and the luminance signal detecting circuit 54E. The luminance signal detecting circuit 54E extracts a luminance component which is included in the difference data D44, and detects an activity of the extracted luminance component for each block. The threshold value determining circuit 54G compares the detected luminance signal activity with a predetermined threshold value, and gives thus obtained determined result of the threshold value to the following threshold value setting circuit 54H. In the threshold value setting circuit 54H, when the determined result in the threshold value determining circuit 54G is that represents the luminance signal activity is larger than the predetermined threshold value, the threshold value is set comparatively low, and when said determined result is that represents the luminance signal activity is smaller than the predetermined threshold value, the threshold value is set comparatively high. At this time, the threshold value setting circuit 54H determines the size of the threshold value corresponding to the optimal control value S1. Thus set threshold value is given to the threshold value determining circuit 54D.

Besides, in the coder 54, an activity of each block of the color signal component which is extracted by the color signal detecting circuit 54B is detected by the activity detecting circuit 54C, and thus obtained color signal activity is given to the threshold value determining circuit 54D.

The threshold value determining circuit 54D determines the color signal activity by the threshold value set by the threshold value setting circuit 54H, and controls block division at the coding circuit 54A according to the determined result. That is to say, when the color signal activity is larger than or equal to the set threshold value, the block division is performed, on the contrary, when the color signal activity is less than the threshold value, the block division is not performed.

In this manner, in the coder 54 (the coders 51 to 53 are similar to that), the threshold value is temporary set based on the activity of the luminance signal, in order to determine the activity of the color signal using the set threshold value, and the division of block is controlled based on the determined result.

Here, defining an area of lower hierarchy data which corresponds to upper hierarchy data as "block", activity is represented by a correlation value, such as a maximum value, a mean value, an absolute value sum, a standard deviation, or an n-th power sum of the inter-hierarchy difference data D41 to D44 in a predetermined block. That is, when an activity is low, it can say that this block is a plane block.

At this time, when the block activity is higher than the predetermined threshold value, the coders 51 to 54 determine this block as a division block, and code and transmit the data of the block with adding a division determination flag that represents this block is division block thereto.

On the contrary, when the block activity is less than the predetermined threshold value, the coders 51 to 54 determine this block as a non-division block, and do not transmit the data of this block, then transmit a non-division determination flag that represents this block is non-division block. This non-division block is replaced to an upper hierarchy data at the side of decoding device.

(3) Division Processing

In the hierarchical coding method of this embodiment, a method is used that a determination flag is not reflected to determination in the following lower hierarchy (hereinafter this is called independent determining method). That is, in the independent determining method, a division selecting processing based on the determination of threshold value every time is performed independently for each hierarchy. For instance, as to the block that receives non-division determination once, in the following lower hierarchy, the determination of activity is performed again to select division or non-division again. Thereby, in the hierarchical coding method applied the independent determining method, in an upper hierarchy, there is no effects of the determination flag of a lower hierarchy, therefore, the hierarchical coding with little deterioration of picture quality can be realized.

In addition to the above structure, in the hierarchical coding encoder unit 100A, division determination of the color signal is not performed independently but it is performed considering the luminance signal in the same space which has a correlation to the color signal to each other.

In the hierarchical coding encoder 100A, a threshold value which is used to the block division determination of the color signal is changed in accordance with the block activity of the luminance signal.

More specifically, in the hierarchical coding encoder unit 100A, when a data value of the color signal upper hierarchy data is denoted by $X_{i+1}(0)$, a data value of the color signal lower hierarchy data is denoted by $X_i(j)$ [j=0 to 3], the color signal inter-hierarchy difference coded value is denoted by $\Delta X_i(j)=X_{i+1}(0)-X_i(j)$ [j=0 to 3], the color signal block activity determination function is denoted by G(.), the color signal block activity is denoted by $ACT_C=G(\Delta X_i(j))$ [j=0 to 3], and the luminance signal block activity in the same space is denoted by $ACT_Y$, then when the luminance signal block activity $ACT_Y$ is larger than or equal to the predetermined threshold value TH0, the division determination threshold value TH of the color signal is set to $TH0_C$. When the luminance signal block activity $ACT_Y$ is less than the threshold value TH0, the division determination threshold value TH of the color signal is set to $TH1_C$ ($>TH0_C$).

In the hierarchical coding encoder 100A, when the color signal block activity value $ACT_C$ is larger than or equal to the threshold value TH, the division in the lower hierarchy is performed, on the contrary, when the color signal block activity value $ACT_C$ is less than the threshold value TH, the division in the lower hierarchy is stopped.

Here, for instance, in the case where the luminance signal block activity value $ACT_Y$ is larger than or equal to the threshold value TH0, this represents that the case where the fluctuation of the luminance signal is large such as the edge of an object. In such a case, the hierarchical coding encoder 100A applies the division determination threshold value $TH0_C$ which is; comparative small as the division determination threshold value TH of the color signal, in order to control so that the division is performed same as the luminance signal.

On the contrary, when the luminance signal block activity value $ACT_Y$ is less than the threshold value TH0, this represents that the fluctuations of the luminance signal is not large, in such a case, the hierarchical coding encoder 100A applies the division determination threshold value $TH1_C$ which is larger than the division determination threshold value $TH0_C$ as the division determination threshold value TH of the color signal, in order to improve the compression efficiency.

Here, FIG. 53 shows a comparison of signal waveform between the case where the division of the color signal is controlled by changing the threshold value TH according to the luminance signal block activity value $ACT_Y$ as this embodiment, and the case where the division of the color signal is controlled by determining the block activity value under a constant threshold value.

FIG. 53 shows a waveform of one-dimensional signal for explanation, assuming a color picture as object to be coded. In this example, as shown in FIGS. 53(A) and 53(B), it shows the case of coding the signal whose luminance signal fluctuates remarkably such as that of the edge of object and whose fluctuation of the color signal is comparatively smaller than that of the luminance signal.

Figure 53A:
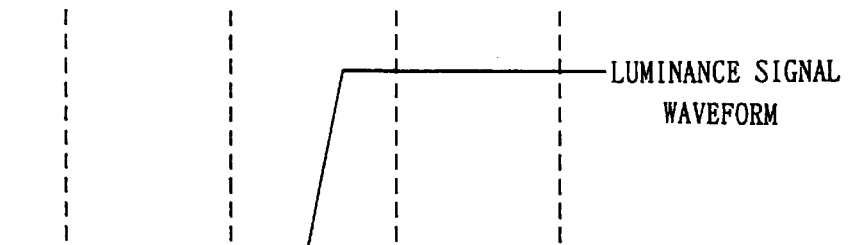
FIG. 53 is a signal waveform diagram illustrating the divided result of a color signal.
Figure 53B:
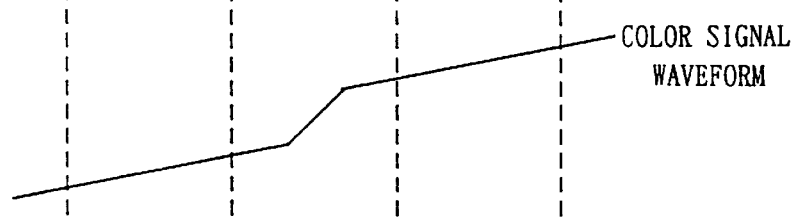
Figure 53C:
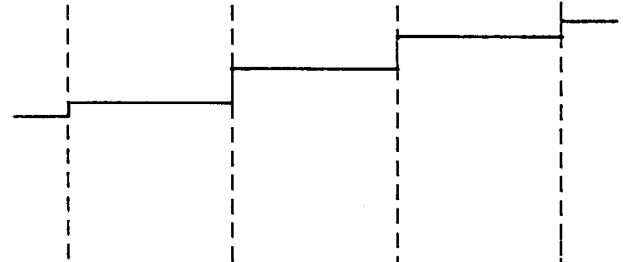
Figure 53D:
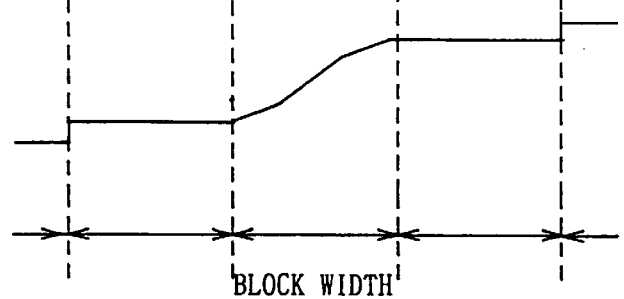

FIG. 53(C) shows the divided result of a color signal in the case where the division is controlled by determining the block activity for the color picture signal as the above under a constant threshold value. FIG. 53(C) represents that the non-division processing is selected in all of the blocks of the color signal.

It is obvious from FIG. 53(C), in the case where the division of color signal is controlled by determining the block activity under a constant threshold value, when a fluctuation of color signal is small comparatively, the non-division processing may be selected even in that of the edge of object, due to difference of the division determined result between luminance signal and color signal. As a result, an upper hierarchy data is utilized as a restored value of the non-division block data. Thereby, the signal waveform is to be step-like. It is not a noticeable step-like waveform in general, however, this step-like waveform is recognized at a plane portion neighboring to the position where the luminance signal fluctuates remarkably as deterioration of picture quality of the color signal.

More particularly, in the case where the block size of the luminance signal differs from that of the color signal, the difference of the picture quality is remarkable owing to the difference of the processing between the luminance signal and the color signal existing in the same space. In such a manner, the deterioration of picture quality based on the color signal occurs.

On the contrary, in the case where the division is controlled by changing the threshold value TH according to the luminance signal block activity value $ACT_Y$, division of the color signal in the block where the fluctuation of the luminance signal is large such as that of a portion of the edge of object.

Consequently, the division determined result of the luminance signal and that of the color signal coincide with each other, and therefore deterioration of the picture quality at the edge portion of object caused by a step-like waveform can be avoided.

That is, in the case where this hierarchical coding is utilized for the picture which is composed of plural signals as color picture, the division determination is performed considering a relation between signals existing in the same space, without performing the division determination of each block independently with respect to respective signals, thereby the picture quality can be improved.

In the above manner, in the hierarchical coding apparatus 100, the compression efficiency can be improved and deterioration of the picture quality can be reduced.

Figure 54:
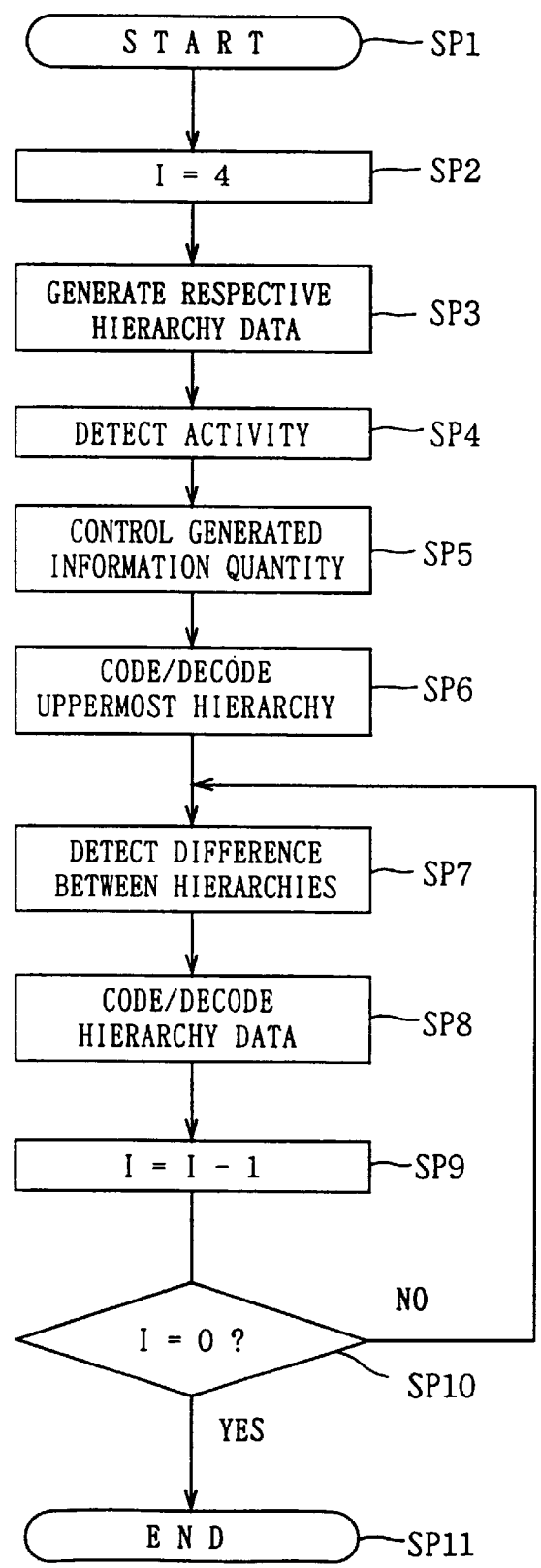
FIG. 54 is a flowchart showing a processing of the hierarchical coding.

In this connection, FIG. 54 shows a flowchart of the hierarchical coding process by the hierarchical coding apparatus. At step SP2, "4" is registered into the hierarchy counter I for storing the hierarchy number, so that the frame of this hierarchical coding is determined.

Further, at step SP3, the hierarchical data is generated by performing the generated information quantity calculation at the generated information quantity control unit 100B, and at the following step SP4, each block activity value is detected. At step SP5, the generated information quantity control unit 100B determines the optimal control value S1 based on this activity value.

Further, at step SP6, the hierarchical coding is performed by the hierarchical coding encoder unit 100A based on the optimal control value S1. That is, coding and decoding are performed for the fifth hierarchy data being the uppermost hierarchy first. This result is set to the initial value of the process in the lower hierarchy, and the inter-hierarchy difference value between this result and the lower hierarchy is produced at step SP7. Further, at step SP8, division selecting and coding in the lower hierarchy are performed based on the optimal control value S1 which is determined at the step SP5.

After processed the respective hierarchies, the hierarchy counter I is decremented at step SP9. Then, at step SP10, a termination determination is performed for the contents of the hierarchy counter I. In case of terminated the process of all of the hierarchies, the operation goes out the loop and terminates the above hierarchical coding processing at step SP11.

(4) Effects of the Embodiment

According to the above structure, when block division is performed from the upper hierarchy to the lower hierarchy, the division determination is performed considering a relation between signals existing in the same space, thereby the picture coding method in which compression can be performed efficiently and the deterioration of the picture quality can be reduced, can be realized.

(5) Other Embodiments (5-1) In the aforementioned embodiment, such a case is described that luminance signal and color signal are utilized as signals which form a picture and have a correlation to each other, and the division threshold value of the color signal is changed based on the block activity value of the luminance signal. However, the present invention is not only limited to this, but for instance, the three primary colors signals of RGB are used as signal that has a relation to each other and forms a color picture, so that the division threshold value of the another signals can be changed based on the signal characteristic of one of these. In short, the division threshold value can be selected based on the relation of signals which have a relation to each other.

(5-2) In the aforementioned embodiments, such a case is described that the picture coding method according to the present invention is applied to the independent determining method for determining threshold value independently to each hierarchy every time and performing the division processing. The present invention is not only limited to this, the same effect as the aforementioned embodiments can be obtained, also in the case of applying to the determining method that when the division of the lower hierarchy is temporarily stopped by the division determination in the upper hierarchy, the division of the following lower hierarchy is stopped, further in the case of applying to the determining method that when the determined result representing that the block activity value is smaller than the predetermined threshold value is obtained, the division stop flag for stopping the way of division of a plurality of lower blocks corresponding to this block is temporarily generated, and when the determined result representing that the block activity of at least one of a plurality of blocks is larger than or equal to the predetermined threshold value is obtained, the division stop flag is changed to the division continue flag.

Further, the present invention is not only limited to the above, but is widely applicable to the case where, in the hierarchical coding method, a plurality of blocks having different resolutions are existed in hierarchy data.

(6) As described above, according to the present invention, in a picture coding apparatus in which a picture data is sequentially and recursively divided into plural hierarchy data having different resolutions from each other and coded, the block activity value with respect to the predetermined block of the hierarchy data excepting the uppermost hierarchy data having a lowest resolution is determined, and when the block activity value is less than the predetermined threshold value, the block division of the lower hierarchy data corresponding to the block whose block activity is determined is stopped and the division stop flag is transmitted as a determination flag: the threshold value is selected based on the first signal out of a plurality of signals which have a relation to each other and form a picture; the above threshold value is compared to the block activity value of the second signal out of the signals having the relation so as to determine an activity of the second signal; and the block division is controlled based on the determined result, thereby when the picture data is hierarchical coded, the compression efficiency can be improved and the deterioration of the picture quality can be reduced.

[8] Seventh Embodiment (1) Picture Coding Apparatus of Seventh Embodiment

Figure 55:
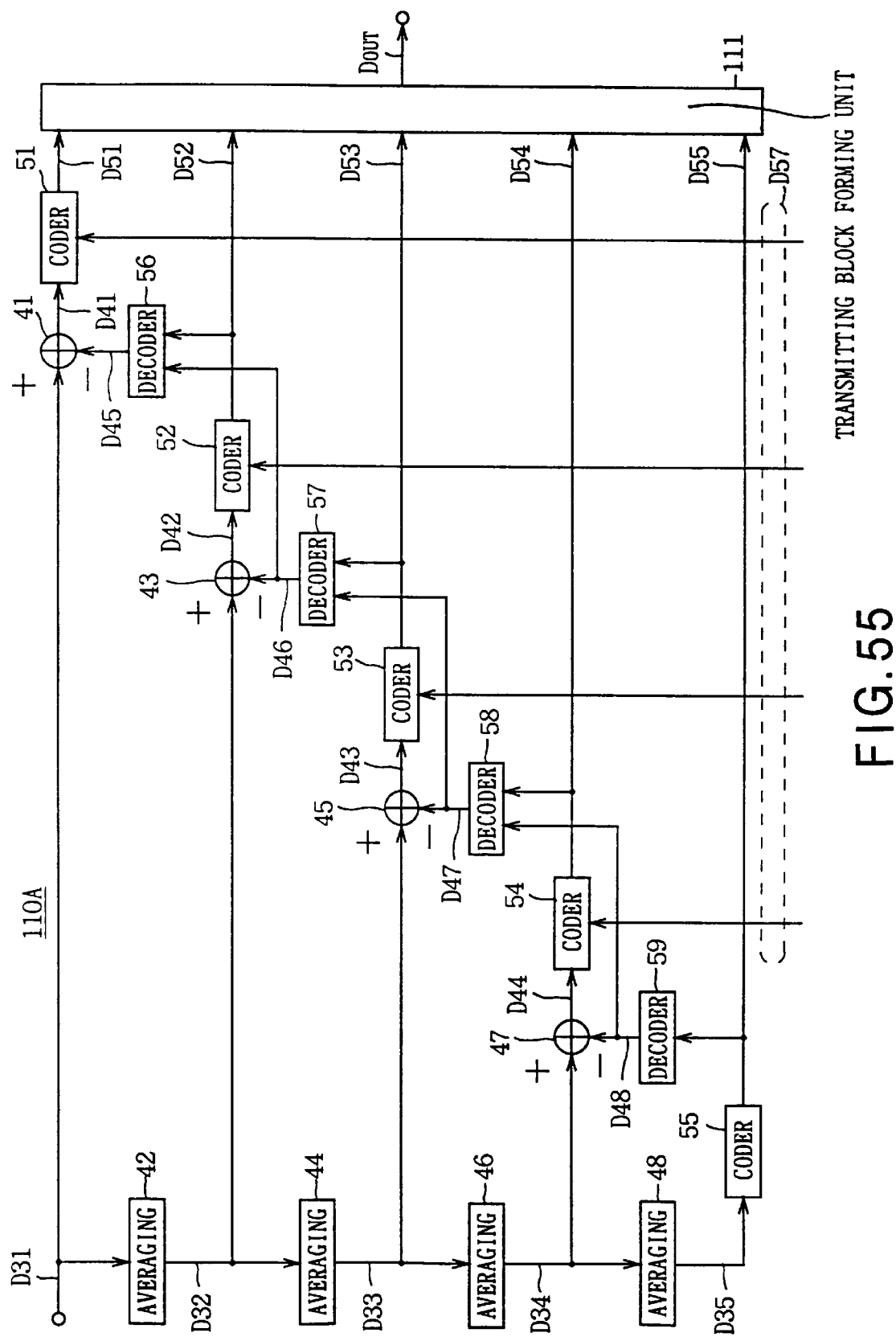
FIG. 55 is a block diagram showing the picture coding apparatus of the seventh embodiment according to the present invention.

The picture coding apparatus 110A of the seventh embodiment re-forms the hierarchical coded data D51 to D55, which are obtained from the hierarchical coding encoder unit 110A, to transmission blocks at the transmission block forming unit 111, and outputs it as the transmission data $D_{OUT}$, as shown in FIG. 55, in addition to the structure of the fourth embodiment which is described accompanying with FIGS. 11 to 18.

(2) Data Structure of Transmitting Block

Here, the data which is generated by the generated information quantity control method as described above at the hierarchical coding encoder unit 110A, can be classified into the fixed-length data such as the uppermost hierarchy coded data D55 which is outputted from the coder 55 (FIG. 55), and the variable-length data of the first to the fourth hierarchy difference values coded data D51 to D54 which are outputted from the coders 51 to 54.

Figure 56:
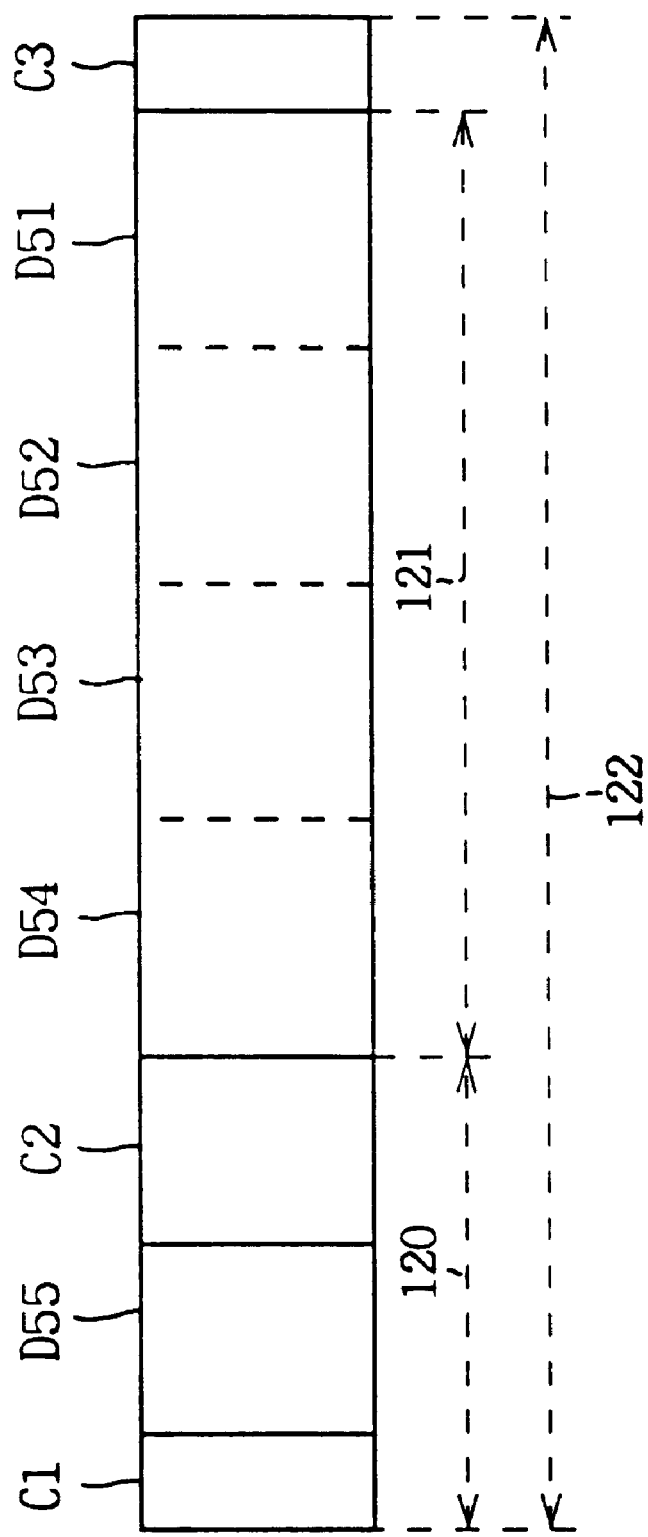
FIG. 56 is a conceptional plane view illustrating the data structure of transmitting block.

Therefore, in the hierarchical coding encoder unit 110A, as shown in FIG. 56, the fixed-length data block 120 is formed by collecting each fixed-length data into groups for each frame forming a picture, and the variable-length data block 121 is formed by collecting each variable-length data of the above frame into groups. This variable-length data block 121 is arranged after the fixed-length data block 120 in order to form the unit block 122 for transmission (hereinafter this is called transmission block 122). The transmission block 122 is sequentially outputted to the transmission line.

In practice, in the transmission block 122, the transmission block identification code C1 which is composed of the SYNC code designating the head position of the block 122, the information code showing the contents of the picture data, and the like (hereinafter, referred to as identification information code), is arranged at the head of the fixed-length data block 120 (that is the head of the transmission block 122).

Further, in the transmission block 122, the uppermost hierarchy coded data D55 is arranged immediately after the transmission block identification code C1, thereby when searching for the desired picture using the identification code, the picture can be sequentially restored at high speed by using the uppermost hierarchy coded data D55 which has less information quantity. Thereby, the high-speed data search function in reproducing can be realized.

Further, in the hierarchical coding system as described above, since the data length of the distinction code for forming a picture, which is composed of the above division determination flag outputted from the coders 51 to 55 of the hierarchical coding encoder unit 110A respectively, (hereinafter these are called collectively inter-hierarchy data division determination code) at the decoding side, equals to the number of all of the blocks in each hierarchy data, the data length is to be fixed-length data respectively.

For this reason, in the transmission block 122, the inter-hierarchy data division determination code C2 being the distinction code for forming a picture for each hierarchy at the decoding side is arranged immediately after the uppermost hierarchy coded data D55. Thereby, even after the above generated information quantity control has been performed, the data, which exists in the section of the uppermost hierarchical coded data D55 and the inter-hierarchy data division determination code C2, is able to be fixed-length as a whole.

In the variable-length data block 121, the fourth to the first hierarchy difference value coded data D54, D53, D52, D51 are sequentially arranged and formed in this order, and the transmission block end code C3 for indicating the end of the transmission block 122 is added immediately after the above variable-length data 121.

In the above structure, in this picture coding apparatus, with respect to the data which is generated at the hierarchical coding encoder unit 110A, variable-length data is arranged for each frame after fixed-length data, so that the transmission block 122 is formed and outputted to the transmission line.

Accordingly, the decoding can be performed without making an error of the definition of the data in the fixed-length data block 120 at the decoding side, even if an error is generated in any variable-length data. Thereby, in this picture coding apparatus, the transmission data can have robust characteristic for error.

Further, in the picture coding apparatus 110, when transmitting the data generated by the information quantity control method described the above, the uppermost hierarchical coded data D55 is arranged immediately after the transmission block identification code C1 and outputted, so that in the case where the high-speed data search function is added at the decoding side, it can access to the uppermost hierarchical coded data D55 in short time after the transmission block identification code C1 is detected.

According to the above structure, the coding of hierarchies having a plural of resolutions can be easily realized. Further, the total generated information quantity of the transmission picture data which is coded and outputted from the hierarchical coding encoder 110A, can be almost equaled to the target value, thereby the coding in which the compression efficiency does not lower can be realized. Further, the hierarchical coding in which the deterioration of picture quality is little can be realized. Furthermore, the management of the generated information quantity in the hierarchical coding can be simplified comparing with the conventional one.

Further, the optimum threshold value can be set considering the characteristic of the picture signal data for each hierarchy and the visual characteristics of human being, so that the subjective picture quality at the receiving side can be more improved comparing with the case of setting a constant threshold value.

(3) Other Embodiments of Seventh Embodiment (3-1) In the embodiment described above, such a case is described that the block activity value is determined based on the maximum value of the difference value between the decoded data obtained for each block with respect to the upper hierarchy data and the lower hierarchy data. However, the present invention is not to be limited to this, but the determination can be performed based on an average error, an absolute value sum, a standard deviation, an n-th power sum, or a data frequency which is larger than or equal to the threshold value.

(3-2) In the embodiments described above, such a case is described that the table frequency obtained for each hierarchy is utilized as it is. However, the present invention is not only limited to this, but the integrating frequency table can be produced from the frequency table to use for calculation of the generated information quantity.

That is, after the frequency table is generated for each hierarchy, the accumulative added value is obtained with respect to the block frequencies from the block activity value of higher order bit to each block activity values, and the respective accumulative added values is written to the address corresponding to each block activity value to produce the integrating frequency table. Thereby, the frequency corresponding to each block activity value becomes the integrated value of the block frequency which has the value larger than or equal to the block activity value.

By the integrating frequency table is produced previously in this manner, it is not needed to calculate the block frequency integrated value corresponding to each threshold value, and the calculation of the block frequency integrated value can be performed by merely reading out the threshold value address of the memory, thereby a time for calculation can be widely shortened.

(3-3) In the embodiments described above, such a case is described that the division/non-division of the block is determined by comparing the threshold value which is set to the different value for each hierarchy with the block activity value. However, the present invention is not only limited to this, but can be determined based on the comparison result that is compared the threshold value set to the different value for each hierarchy with the difference value of data between hierarchies.

(3-4) In the embodiments described above, such a case is described that the picture data is PCM coded at the coder. However, the present invention is not only limited to this, butbut can be applied the other coding schemes, such as a orthogonal coding scheme.

(3-5) In the embodiments described above, such a case is described that a plurality of combinations of the threshold value of the frequency table which is obtained for each hierarchy, are previously stored in the ROM, and then the combination of the threshold value which is nearest to the target value is obtained. However, the present invention is not only limited to this, but can set the combination independently for each hierarchy.

(3-6) In the embodiments described above, such a case is described that as to the lowermost hierarchy data, the mean value is obtained for each unit of 2 lines×2 pixels, so that the picture data of the upper hierarchy is obtained. However, the present invention is not only limited to this, but the mean value can be obtained by the another combinations.

(4) As described above, according to the present invention, in a picture coding apparatus for sequentially and recursively dividing a picture data into plural hierarchy data having different resolution each other and coding it, when the transmission data including respective coded hierarchy data is outputted to the specified transmission line, the variable-length data is outputted to the transmission line after the fixed-length data by dividing the transmission data into the fixed-length data and the variable-length data for each specified unit forming a picture. Thereby, the contents of the fixed-length data can be detected correctly when decoding it, even if error is generated in the variable-length data, thereby a picture coding apparatus and data transmitting method in which the transmission data can include the robust characteristic for error can be realized.

Industrial Applicability

A picture coding apparatus and a picture coding method of the present invention are applicable to a transmitter of the system which has a monitor having different resolutions at the receiving side, such as the television conference system and the video on demand system.

What is claimed is:

1. A hierarchical picture coding apparatus for coding a plurality of hierarchical data consisting of a plurality of different resolutions, comprising:
   a circuit for generating a plurality of hierarchical data having a plurality of different resolutions from a lowest resolution to a highest resolution;
   a circuit for detecting an activity of a block of each hierarchical data corresponding to a predetermined block of a hierarchical data, controlling the total division of a block of each hierarchical data corresponding to said predetermined block based on the total activity in each hierarchical data, and generating a flag showing said control of the division; and
   a circuit for coding said each hierarchical data.

2. The hierarchical picture coding apparatus according to claim 1, wherein out of said plurality of hierarchical data, each hierarchical data except for a hierarchical data having the lowest resolution is a hierarchy difference data which is the difference from a data having lower resolution.

3. The hierarchical picture coding apparatus according to claim 2, wherein said hierarchical data generating circuit generates a hierarchical data having low resolution by averaging the pixel value of a plurality of pixels in the block.

4. The hierarchical picture coding apparatus according to claim 3, wherein each hierarchy difference data consists of the difference between (n−1)-number of hierarchical data and a hierarchical data having lower resolution than said (n−1)-number of hierarchical data.

5. The hierarchical picture coding apparatus according to claim 1, wherein said division controlling circuit controls the division of a block of a hierarchical data having low resolution and corresponding to the block of a hierarchical data having high resolution in accordance with an activity of the hierarchical data having higher resolution.

6. The hierarchical picture coding apparatus according to claim 1, wherein said division controlling circuit executes the division of a block of hierarchical data having lower resolution and corresponding to said predetermined block when said activity is larger than a threshold value and wherein the division control is executed from the hierarchical data having the lower resolution to the hierarchical data having the higher resolution on a step by step basis.

7. The hierarchical picture coding apparatus according to claim 1, wherein said division controlling circuit stops the division of said predetermined block and then executes the division of said predetermined block when an activity of a block having higher resolution than said predetermined block is bigger than a threshold value.

8. The hierarchical picture coding apparatus according to claim 1, wherein said division controlling circuit detects an activity of said each hierarchical data except for the hierarchical data having the lowest resolution.

9. The hierarchical picture coding apparatus according to claim 1, wherein transmission of the data of said block to which the division is stopped is stopped.

10. The hierarchical picture coding apparatus according to claim 1, wherein said activity is a maximum value, an average value, an absolute value sum, a standard deviation, or n-th power sum of the pixels in the block.

11. The hierarchical picture coding apparatus according to claim 1, wherein a threshold value of each hierarchy is set to a different value.

12. The hierarchical picture coding apparatus according to claim 1, further comprising a circuit for detecting a threshold value, determination standard of said activity, in order to control the amount of generation information to a target value.

13. The hierarchical picture coding apparatus according to claim 12, wherein said threshold value detecting circuit determines said threshold value in accordance with the amount of characteristics of each hierarchical data.

14. A hierarchical picture coding method for coding a plurality of hierarchical data consisting of a plurality of different resolutions, comprising the steps of:
  generating a plurality of hierarchical data having a plurality of different resolutions from a lowest resolution to a highest resolution;
  detecting an activity of a block of each hierarchical data corresponding to a predetermined block of a hierarchical data, controlling the total division of a block of each hierarchical data corresponding to said predetermined block based on the total activity in each hierarchical data, and generating a flag showing said control of the division; and
  coding said each hierarchical data.

15. The hierarchical picture coding method according to claim 14, wherein out of said plurality of hierarchical data, each hierarchical data except for a hierarchical data having the lowest resolution is a hierarchy difference data which is the difference from a data having lower resolution.

16. The hierarchical picture coding method according to claim 15, wherein the generating step generates a hierarchical data having low resolution by averaging the pixel value of a plurality of pixels in the block.

17. The hierarchical picture coding method according to claim 16, wherein each hierarchy difference data consists of the difference between (n−1)-number of hierarchical data and a hierarchical data having lower resolution than said (n−1) -number of hierarchical data.

18. The hierarchical picture coding method according to claim 14, wherein the controlling step controls the division of a block of a hierarchical data having low resolution and corresponding to the block of a hierarchical data having high resolution in accordance with an activity of the hierarchical data having higher resolution.

19. The hierarchical picture coding method according to claim 14, wherein the controlling step executes the division of a block of a hierarchical data having lower resolution and corresponding to said predetermined block when said activity is bigger than a threshold value.

20. The hierarchical picture coding method according to claim 14, wherein the controlling step stops the division of said predetermined block and then executes the division of said predetermined block when an activity of a block having higher resolution than said predetermined block is bigger than a threshold value.

21. The hierarchical picture coding method according to claim 14, wherein the controlling step detects an activity of said each hierarchical data except for the hierarchical data having the lowest resolution.

22. The hierarchical picture coding method according to claim 14, wherein transmission of the data of said block to which the division is stopped is stopped.

23. The hierarchical picture coding method according to claim 14, wherein said activity is a maximum value, an average value, an absolute value sum, a standard deviation, or n-th power sum of the pixels in the block.

24. The hierarchical picture coding method according to claim 14, wherein a threshold value of each hierarchy is set to a different value.

25. The hierarchical picture coding method according to claim 18, further comprising detecting a threshold value, determination standard of said activity, in order to control the amount of generation information to a target value.

26. The hierarchical picture coding method according to claim 25, wherein the threshold value detecting step determines said threshold value in accordance with the amount of characteristics of each hierarchical data.

27. A hierarchical picture coding method for coding a plurality of hierarchical data consisting of a plurality of different resolutions, comprising the steps of:
  generating a plurality of hierarchical data having a plurality of different resolutions from a lowest resolution to a highest resolution;
  detecting an activity of a block of each hierarchical data corresponding to a predetermined block of a hierarchical data, controlling the total division of a block of each hierarchical data corresponding to said predetermined block based on the total activity in each hierarchical data, and generating a flag showing said control of the division;
  coding said each hierarchical data so as to generate a coded data; and
  transmitting said coded data and said flag.

28. The hierarchical picture coding method according to claim 27, wherein out of said plurality of hierarchical data, each hierarchical data except for a hierarchical data having the lowest resolution is a hierarchy difference data which is the difference from a data having lower resolution.

29. The hierarchical picture coding method according to claim 28, wherein the generating step generates a hierarchical data having low resolution by averaging the pixel value of a plurality of pixels in the block.

30. The hierarchical picture coding method according to claim 29, wherein each hierarchy difference data consists of the difference between (n−1)-number of hierarchical data and a hierarchical data having lower resolution than said (n−1)-number of hierarchical data.

31. The hierarchical picture coding method according to claim 27, wherein the controlling step controls the division of a block of a hierarchical data having low resolution and corresponding to the block of a hierarchical data having high resolution in accordance with an activity of the hierarchical data having higher resolution.

32. The hierarchical picture coding method according to claim 27, wherein the controlling step executes the division of a block of a hierarchical data having lower resolution and corresponding to said predetermined block when said activity is bigger than a threshold value.

33. The hierarchical picture coding method according to claim 27, wherein the controlling step stops the division of said predetermined block and then executes the division of said predetermined block when an activity of a block having higher resolution than said predetermined block is bigger than a threshold value.

34. The hierarchical picture coding method according to claim 27, wherein the controlling step detects an activity of said each hierarchical data except for the hierarchical data having the lowest resolution.

35. The hierarchical picture coding method according to claim 27, wherein transmission of the data of said block to which the division is stopped is stopped.

36. The hierarchical picture coding method according to claim 27, wherein said activity is a maximum value, an average value, an absolute value sum, a standard deviation, or n-th power sum of the pixels in the block.

37. The hierarchical picture coding method according to claim 27, wherein a threshold value of each hierarchy is set to a different value.

38. The hierarchical picture coding method according to claim 31, further comprising detecting a threshold value, determination standard of said activity, in order to control the amount of generation information to a target value.

39. The hierarchical picture coding method according to claim 38, wherein the threshold value detecting step determines said threshold value in accordance with the amount of characteristics of each hierarchical data.

40. A hierarchical picture decoding apparatus for decoding a coded hierarchical data, wherein said coded hierarchical data is obtained by coding a plurality of hierarchical data having a plurality of different resolutions from a lowest resolution to a highest resolution, said hierarchical picture decoding apparatus comprising:
 a circuit for receiving said coded hierarchical data and a flag showing the total control of the division of a block of each hierarchical data corresponding to said predetermined block;
 a circuit for decoding said coded hierarchical data; and
 a circuit for generating a hierarchical data decoded based on the information on said flag.

41. The hierarchical picture decoding apparatus according to claim 40, wherein out of said plurality of hierarchical data, each hierarchical data except for the hierarchical data having the lowest resolution is a hierarchy difference data which is the difference with a data having lower resolution, and said hierarchical picture decoding apparatus further comprises a circuit for generating a decoded hierarchical data and a hierarchical data restored from a decoded hierarchical data which has lower resolution.

42. The hierarchical picture decoding apparatus according to claim 41, wherein said hierarchical data is generated by averaging the pixel value of a plurality of pixels in a block of a hierarchical data having higher resolution.

43. The hierarchical picture decoding apparatus according to claim 42, wherein each hierarchy difference data includes the difference between said (n−1)-number of hierarchical data and a hierarchical data having lower resolution than said (n−1)-number of hierarchical data, and residual hierarchical data are generated from the arithmetic operations by said (n−1)-number of hierarchical data and said hierarchical data having lower resolution than said (n−1)-number of hierarchical data.

44. A hierarchical picture decoding method for decoding a coded hierarchical data, wherein said coded hierarchical data is obtained by coding a plurality of hierarchical data having a plurality of different resolutions from a lowest resolution to a highest resolution, said hierarchical picture decoding method comprising the steps of:
 receiving said coded hierarchical data and a flag showing the total control of the division of a block of each hierarchical data corresponding to said predetermined block;
 decoding said coded hierarchical data; and
 generating a hierarchical data decoded based on the information on said flag.

45. The hierarchical picture decoding method according to claim 44, wherein out of said plurality of hierarchical data, each hierarchical data except for the hierarchical data having the lowest resolution is a hierarchy difference data which is the difference with a data having lower resolution, and said hierarchical picture decoding method further comprises generating a decoded hierarchical data and a hierarchical data restored from a decoded hierarchical data which has lower resolution.

46. The hierarchical picture decoding method according to claim 45, wherein said hierarchical data is generated by averaging the pixel value of a plurality of pixels in a block of a hierarchical data having higher resolution.

47. The hierarchical picture decoding method according to claim 46, wherein each hierarchy difference data includes the difference between said (n−1)-number of hierarchical data and a hierarchical data having lower resolution than said (n−1)-number of hierarchical data, and residual hierarchical data are generated from the arithmetic operations by said (n−1)-number of hierarchical data and said hierarchical data having lower resolution than said (n−1)-number of hierarchical data.

48. A picture coding apparatus for coding plural hierarchy picture data each having a different resolution, upper hierarchy picture data of said plural hierarchy picture data being generated by lower hierarchy picture data which has higher resolution than that of said higher hierarchy picture data, comprising:
 means for detecting an activity of a block of each hierarchical data corresponding to a predetermined block of hierarchical data; and
 means for controlling the total division of a block of each hierarchical data corresponding to said predetermined block based on the total activity in each hierarchical data.

49. A picture coding apparatus according to claim 48, further comprising means for generating a flag showing said control of the division.

50. The picture coding apparatus according to claim 48, further comprising means for coding said each hierarchical data.

51. A picture coding method for coding plural hierarchy picture data each having a different resolution, upper hierarchy picture data of said plural hierarchy picture data being generated by lower hierarchy picture data which has higher resolution than that of said higher hierarchy picture data, comprising the steps of:

detecting an activity of a block of each hierarchical data corresponding to a predetermined block of hierarchical data; and controlling the total division of a block of each hierarchical data corresponding to said predetermined block based on the total activity in each hierarchical data.

52. The picture coding method according to claim 51, further comprising the step of generating a flag showing said control of the division.

53. The picture coding method according to claim 51, further comprising the step of coding said each hierarchical data.

\* \* \* \* \*